United States Patent
Katsuyama

(10) Patent No.: US 9,462,159 B2
(45) Date of Patent: Oct. 4, 2016

(54) IMAGE PROCESSING DEVICE, METHOD AND INKJET RECORDING DEVICE

(71) Applicant: FUJIFILM Corporation, Tokyo (JP)

(72) Inventor: Kimito Katsuyama, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/977,299

(22) Filed: Dec. 21, 2015

(65) Prior Publication Data

US 2016/0191747 A1    Jun. 30, 2016

(30) Foreign Application Priority Data

Dec. 25, 2014 (JP) ................. 2014-262310

(51) Int. Cl.
| | |
|---|---|
| *H04N 1/52* | (2006.01) |
| *B41J 2/21* | (2006.01) |
| *H04N 1/034* | (2006.01) |
| *H04N 1/60* | (2006.01) |
| *H04N 1/04* | (2006.01) |
| *H04N 1/405* | (2006.01) |

(52) U.S. Cl.
CPC ............. *H04N 1/52* (2013.01); *B41J 2/2132* (2013.01); *H04N 1/034* (2013.01); *H04N 1/04* (2013.01); *H04N 1/6027* (2013.01)

(58) Field of Classification Search
CPC ...... H04N 1/52; H04N 1/034; H04N 1/6027; H04N 1/04; B41J 2/2132
See application file for complete search history.

(56) References Cited

U.S. PATENT DOCUMENTS

| | | |
|---|---|---|
| 6,874,864 B1 | 4/2005 | Maeda et al. |
| 7,585,040 B2 * | 9/2009 | Ochiai et al. ........ B41J 2/04541 347/15 |
| 2010/0177137 A1 * | 7/2010 | Kakutani ............... B41J 2/2132 347/15 |

FOREIGN PATENT DOCUMENTS

| | | |
|---|---|---|
| JP | 2002-096455 A | 4/2002 |
| JP | 2010-162770 A | 7/2010 |

* cited by examiner

*Primary Examiner* — Quang N Vo
(74) *Attorney, Agent, or Firm* — Studebaker & Brackett PC

(57) ABSTRACT

A image processing device includes a nozzle ejection rate determination unit that determines a first nozzle ejection rate for each nozzle, a nozzle pattern determination unit that determines a nozzle pattern indicating by which of the plurality of nozzles individual pixels are to be recorded, a conversion unit that converts gradation values reflecting the first nozzle ejection rate on the gradation values of the individual pixels, and a halftone processing unit that performs halftone processing to an image converted by the conversion unit. The halftone processing unit performs the halftone processing using a second dither mask generated by threshold conversion reflecting a second nozzle ejection rate on a threshold of a first dither mask.

12 Claims, 45 Drawing Sheets

FIG.10

| 0 | 0 | 0 | 0 | 0 |
|---|---|---|---|---|
| 22 | 22 | 22 | 22 | 22 |
| 15 | 15 | 15 | 15 | 15 |
| 8 | 8 | 8 | 8 | 8 |
| 1 | 1 | 1 | 1 | 1 |

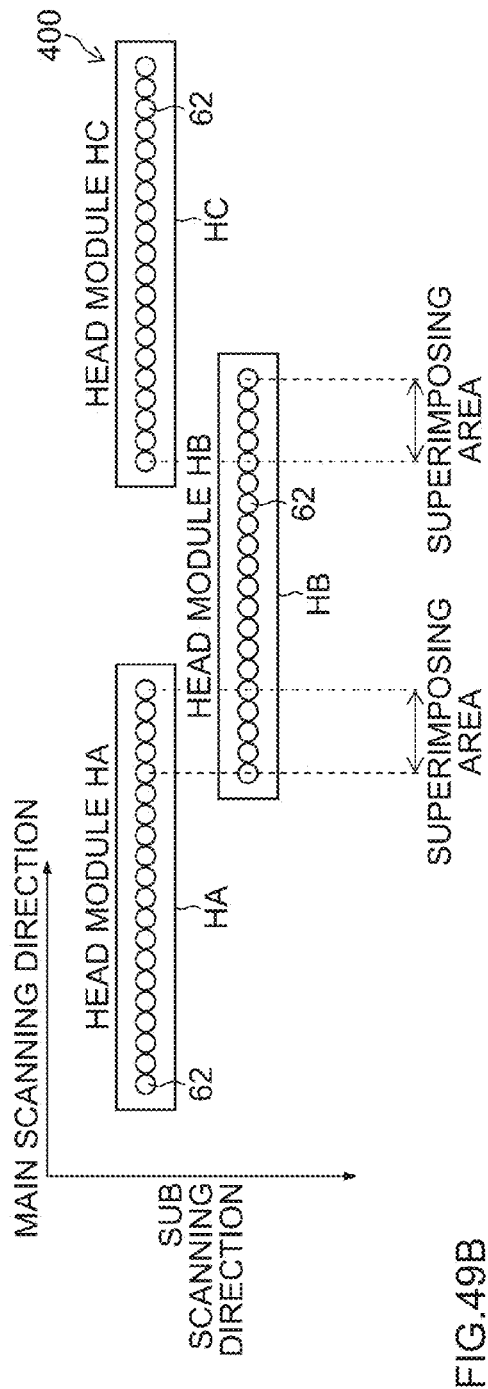
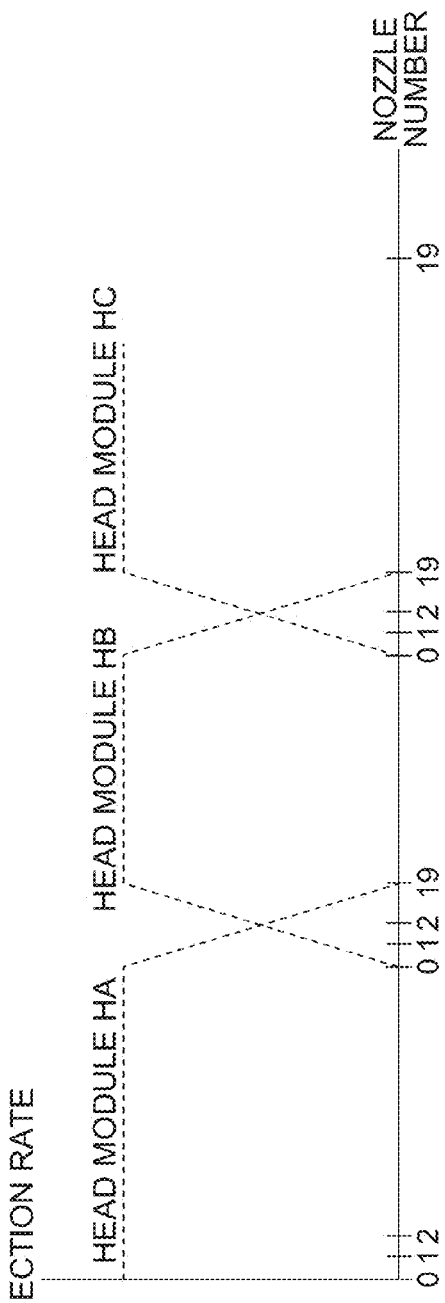
FIG.49A
FIG.49B

IMAGE PROCESSING DEVICE, METHOD AND INKJET RECORDING DEVICE

CROSS-REFERENCE TO RELATED APPLICATIONS

The patent application claims priority under 35 U.S.C. §119 to Japanese Patent Application No. 2014-262310 filed on Dec. 25, 2014. Each of the above application is hereby expressly incorporated by reference, in its entirety, into the present application.

BACKGROUND OF THE INVENTION

1. Field of the Invention

The presently disclosed subject matter relates to an image processing device, method, and an inkjet recording device, and in particular relates to a halftone processing technology utilized in ink ejection control of the inkjet recording device.

2. Description of the Related Art

Conventionally, a serial type inkjet recording device that controls ejection of each nozzle of a recording head on the basis of dot data obtained by halftone processing is known (see Japanese Patent Application Laid-Open No. 2002-096455 and Japanese Patent Application Laid-Open No. 2010-162770). The serial type inkjet recording device records images on a recording medium by repeating a scan operation of ejecting ink from a nozzle of a recording head while moving the recording head along a main scanning direction and a medium conveying operation which is sub scanning feed of intermittently conveying the recording medium in a sub scanning direction.

In such a recording method, behavior of impacted droplets on a recording medium, that is, dot behavior, is changed by recording position errors of individual dots to the recording medium by individual nozzles of a recording head, ejection amount errors of the individual nozzles, or a recording order or recording timing of dots or the like. Due to the change of the dot behavior on the recording medium, density irregularity called "banding" in which a recording density changes in a repetition cycle of individual print paths or a boundary of the individual print paths is conspicuous or the like is generated. When banding is generated, print image quality declines.

For such a problem, Japanese Patent Application Laid-Open No. 2002-096455 discloses an inkjet recording device that controls ejection of individual nozzles by thinning image data after halftone processing using a mask pattern corresponding to the individual nozzles when ejecting ink from the individual nozzles of a recording head. The inkjet recording device described in Japanese Patent Application Laid-Open No. 2002-096455 suppresses banding by setting the mask pattern such that a ratio of recording pixels (that is, a nozzle ejection rate) is lower for the nozzle near an end than the nozzle near a center part of a nozzle array of the recording head.

Also, Japanese Patent Application Laid-Open No. 2010-162770 discloses an inkjet recording device that controls ejection of individual nozzles of a recording head by performing halftone processing by ordered dither using a dither mask. In the inkjet recording device described in Japanese Patent Application Laid-Open No. 2010-162770, banding is suppressed by setting a threshold of the dither mask such that a nozzle using rate of at least one of nozzle groups (including most distal end nozzles arranged at both individual ends) arranged at each of both ends of a nozzle array of the recording head becomes lower than a nozzle using rate of an intermediate nozzle group arranged between the nozzle groups at both ends.

In a method of generating the dither mask used in Japanese Patent Application Laid-Open No. 2010-162770, first, a dot suppression threshold for suppressing recording of dots is set to specific pixels of the dither mask. Then, positions of the specific pixels to which the dot suppression threshold is applied are excluded, that is, a mask that excludes the specific pixels is applied, and a threshold of the dither mask is optimally arranged regarding remaining pixels (paragraph 0045 in Japanese Patent Application Laid-Open No. 2010-162770). Thereafter, by optimally arranging the dot suppression threshold to the excluded specific pixels, a target dither mask is obtained.

In Japanese Patent Application Laid-Open No. 2010-162770, as a term corresponding to "recording head" in the present specification, the term "print head" is used. Also, it is understood that "inkjet printer" in Japanese Patent Application Laid-Open No. 2010-162770 is a term corresponding to "inkjet recording device" in the present specification. It is understood that "nozzle using rate" in Japanese Patent Application Laid-Open No. 2010-162770 is a term corresponding to "nozzle ejection rate" in the present specification.

SUMMARY OF THE INVENTION

The inkjet recording device described in Japanese Patent Application Laid-Open No. 2002-096455, on the premise that there are a plurality of nozzles capable of recording dots to individual pixels of image data, controls which nozzle among them is to perform ejection to record dots by a mask pattern. However, the fact that there are many nozzles capable of recording dots to individual pixels means that excessive scanning is needed that much, and productivity declines. Then, in the case that there is one nozzle capable of recording dots to individual pixels, ejection of the nozzle cannot be controlled by the method described in Japanese Patent Application Laid-Open No. 2002-096455.

On the other hand, the inkjet recording device described in Japanese Patent Application Laid-Open No. 2010-162770, on the premise that there is one nozzle capable of recording dots to individual pixels of image data and that one nozzle corresponds to individual pixels of the dither mask (that is, correspondence relation between the individual pixels and the nozzle is fixedly determined), controls ejection of the individual nozzles by threshold setting of the individual pixels of the dither mask. Specifically, a nozzle using rate of nozzle groups arranged at both ends of the nozzle array is controlled so as to be lower than a nozzle using rate of an intermediate nozzle group arranged between the nozzle groups at both ends.

However, in the method described in Japanese Patent Application Laid-Open No. 2010-162770, since a threshold of specific pixels among the pixels corresponding to the nozzle groups arranged at both ends of the nozzle array is turned to a dot suppression threshold (that is, since recording of the specific pixels is suppressed), dots are densely generated at the pixels around the specific pixels, and a dot distribution is distorted.

Further, in the case that the specific pixels are sparse in the individual pixels of an image to be recorded on a recording medium, at a low recording duty, an effect of suppressing the nozzle ejection rate of the nozzle group corresponding to the specific pixels is not obtained. A recording duty is a ratio of pixels to be dot-on in the individual pixels of an image to be recorded on a recording medium. The recording duty is sometimes called by a term such as a printing duty, a print duty, or a recording rate.

The above-described problem is related not only to the serial type inkjet recording device but also to a single path type inkjet recording device that uses a line head. The line head is often configured by connecting a plurality of head modules in a main scanning direction. In the case of using the line head having such a structure, on an end of the head module corresponding to a part of a joint of the individual head modules, a superimposing area of a nozzle group that overlaps with a recording area of a nozzle array of the other head module is provided.

Due to a difference in characteristics of the individual head modules configuring the line head, there are cases that stripes or irregularity is generated in the superimposing area at a joint part or density irregularity is generated in a cycle of a main scanning direction length of the head module. The problem like this is similar to "banding" explained for a serial type inkjet printer at a point that stripe or belt-like density irregularity is generated. The term "banding" in the present specification is used for an inclusive meaning including not only the density irregularity by the serial type inkjet printer but also the density irregularity by a single path type inkjet printer.

The presently disclosed subject matter is implemented in consideration of such a situation, and an object is to provide an image processing device, method, and an inkjet recording device capable of suppressing generation of density irregularity such as banding without lowering productivity, without inviting image quality decline, and regardless of a recording duty.

To achieve the object, the following invention aspects are provided.

An image processing device relating to a first aspect is an image processing device including: a nozzle ejection rate determination unit that determines a first nozzle ejection rate for each nozzle, in the case of calling information indicating a ratio of recording pixels for which each nozzle ejects ink to record a dot a nozzle ejection rate, in recording attending pixels allocated to each nozzle as pixels for which each of a plurality of nozzles in a recording head having the plurality of nozzles that eject ink is in charge of recording; a nozzle pattern determination unit that determines a nozzle pattern indicating by which of the plurality of nozzles the individual pixels of an image to be recorded on a recording medium by the recording head are to be recorded; a conversion unit that converts gradation values of the individual pixels, reflecting the first nozzle ejection rate of the nozzle that records the individual pixels respectively on the gradation values of the individual pixels of the image, on the basis of the first nozzle ejection rate determined by the nozzle ejection rate determination unit and the nozzle pattern determined by the nozzle pattern determination unit; and a halftone processing unit that generates dot data by executing halftone processing to the gradation values of the individual pixels of the image converted by the conversion unit, in which the halftone processing unit is configured to perform the halftone processing using a second dither mask generated by reflecting a second nozzle ejection rate corresponding to at least one nozzle in charge of recording at individual pixel positions on thresholds of the individual pixel positions in a first dither mask and converting the thresholds of the individual pixel positions of the first dither mask, the first dither mask is a dither mask that outputs a dot arrangement of a non-uniform dot density reflecting the second nozzle ejection rate according to the pixel position of the first dither mask for a uniform input value, and the second dither mask is a dither mask that outputs a dot arrangement of the same dot density for the same input value, regardless of the pixel position.

According to the first aspect, when the halftone processing is performed, the respectively corresponding first nozzle ejection rates are reflected on input values of the individual pixels of the second dither mask, and a target nozzle ejection rate of each nozzle can be controlled by the input value. Also, for a non-uniform input value reflecting the first nozzle ejection rate, dot data of a dot arrangement with excellent graininess can be obtained.

The first nozzle ejection rate can be appropriately set from a viewpoint of obtaining a banding suppressing effect. The nozzle ejection rate that indicates the banding suppressing effect can be determined according to characteristics of the recording head such as a nozzle array form and image drawing conditions or the like.

As a second aspect, in the image processing device of the first aspect, when each threshold of the first dither mask is set, an evaluation index that evaluates graininess of a state of the non-uniform dot density reflecting the second nozzle ejection rate is used for a non-uniform input value reflecting the second nozzle ejection rate, and the first dither mask is configured such that the thresholds of the individual pixel positions in the first dither mask are determined on the basis of the evaluation index reflecting the second nozzle ejection rate.

According to the second aspect, when the individual thresholds of the first dither mask are set, the pixel to set the threshold can be determined on the basis of the evaluation index reflecting the second nozzle ejection rate. According to the second aspect, there is no restriction of a threshold arrangement to be a problem in the method described in Japanese Patent Application Laid-Open No. 2010-162770, and the dither mask capable of achieving the dot arrangement of the non-uniform dot density and excellent dispersibility can be obtained.

As a third aspect, in the image processing device of the first aspect or the second aspect, a configuration can be such that the plurality of nozzles corresponding to the individual pixels of the second dither mask are present.

As a fourth aspect, in the image processing device of any one aspect of the first aspect to the third aspect, the configuration can be such that the first nozzle ejection rate to be reflected on the gradation values of the individual pixels of the image corresponding to the individual pixel positions of the second dither mask is different depending on a position where the second dither mask is arranged on the image after conversion converted by the conversion unit.

As a fifth aspect, in the image processing device of any one aspect of the first aspect to the fourth aspect, the configuration can be such that the first nozzle ejection rate to be reflected on the gradation values of the individual pixels of the image is changed according to at least one of a printing mode, a banding degree and a graininess degree, and the second nozzle ejection rate to be reflected on the second dither mask is the same regardless of at least one of the printing mode, the banding degree and the graininess degree.

As a sixth aspect, in the image processing device of any one aspect of the first aspect to the fifth aspect, the configuration can be such that, when the second dither mask is applied to the image after conversion converted by the conversion unit and the halftone processing is performed, the second dither mask is position-shifted in a sub scanning direction and arranged, on the image after the conversion, and the configuration can be such that, in the case that m is an integer equal to or larger than 2 and p is an integer equal to or larger than 1 and is smaller than m, a size in the sub scanning direction of the dither mask is m, a shift amount in the sub scanning direction of the dither mask is p, and p and m-p are different from a nozzle pitch in the sub scanning direction and a divisor of the nozzle pitch.

Also, "p and m-p are different from a nozzle pitch in the sub scanning direction and a divisor of the nozzle pitch" means that p is different from the nozzle pitch and is also different from the divisor of the nozzle pitch, and further, m-p is different from the nozzle pitch and is also different from the divisor of the nozzle pitch. The term "nozzle pitch" has the same meaning as a term "nozzle interval" or "inter-nozzle distance".

"The nozzle pitch in the sub scanning direction" means a nozzle interval in the sub scanning direction in the nozzle array configured by an array of the plurality of nozzles. It is possible to express m, p and the nozzle pitch with the size in the sub scanning direction of the pixel defined from a recording resolution (that is, a pixel pitch in the sub scanning direction) as a unit.

As a seventh aspect, in the image processing device of any one aspect of the first aspect to the sixth aspect, the configuration can be such that the recording head has a nozzle array formed by arraying the nozzles in a sub scanning direction that is parallel to a conveying direction of a recording medium, and is a serial type recording head that records an image on the recording medium while moving in a main scanning direction that is a width direction of the recording medium which intersects with the sub scanning direction.

As an eighth aspect, in the image processing device of the seventh aspect, the configuration can be such that the nozzle ejection rate determination unit makes the first nozzle ejection rate of the nozzle arranged at an end of the nozzle array lower than the first nozzle ejection rate of the nozzle arranged at a center part of the nozzle array.

As a ninth aspect, in the image processing device of the seventh aspect or the eighth aspect, the configuration can be such that the nozzle pattern determination unit determines the nozzle pattern on the basis of a scanning pattern when moving the recording head relatively to the recording medium.

An inkjet recording device relating to a tenth aspect is an inkjet recording device including: a recording head including a plurality of nozzles that eject ink; a moving unit that relatively moves a recording medium and the recording head: the image processing device of any one aspect of the first aspect to the ninth aspect; and an ejection control unit that controls ejection of the ink from the nozzles of the recording head, on the basis of the dot data generated in the halftone processing unit.

An image processing method relating to an eleventh aspect is an image processing method including: a nozzle ejection rate determination process of determining a first nozzle ejection rate for each nozzle, in the case of calling information indicating a ratio of recording pixels for which each nozzle ejects ink to record a dot a nozzle ejection rate, in recording attending pixels allocated to each nozzle as pixels for which each of a plurality of nozzles in a recording head having the plurality of nozzles that eject ink is in charge of recording; a nozzle pattern determination process of determining a nozzle pattern indicating by which of the plurality of nozzles the individual pixels of an image to be recorded on a recording medium by the recording head are to be recorded; a conversion process of converting gradation values of the individual pixels, reflecting the first nozzle ejection rate of the nozzle that records the individual pixels respectively on the gradation values of the individual pixels of the image, on the basis of the first nozzle ejection rate determined by the nozzle ejection rate determination process and the nozzle pattern determined by the nozzle pattern determination process; and a halftone processing process of generating dot data by executing halftone processing to the gradation values of the individual pixels of the image converted by the conversion process, in which the halftone processing process is a process of performing the halftone processing using a second dither mask generated by reflecting a second nozzle ejection rate corresponding to at least one nozzle in charge of recording at the individual pixel positions on each of the thresholds of the individual pixel positions in a first dither mask and thereby converting the threshold of the first dither mask, the first dither mask is a dither mask that outputs a dot arrangement of a non-uniform dot density reflecting the second nozzle ejection rate according to the pixel position of the first dither mask for a uniform input value, and the second dither mask is a dither mask that outputs a dot arrangement of the same dot density for the same input value, regardless of the pixel position.

In the image processing method of the eleventh aspect, matters similar to specific matters of the image processing device specified in the second aspect to the tenth aspect can be appropriately combined. In that case, an element of a processing unit or a functional unit specified in the image processing device can be recognized as an element of a process (step) of processing or an operation corresponding thereto.

A twelfth aspect is a non-transitory computer-readable tangible recording medium including instructions stored thereon, such that when the instructions are read and executed by a computer, the computer realize: a nozzle ejection rate determination function of determining a first nozzle ejection rate for each nozzle, in the case of calling information indicating a ratio of recording pixels for which each nozzle ejects ink to record a dot a nozzle ejection rate, in recording attending pixels allocated to each nozzle as pixels for which each of a plurality of nozzles in a recording head having the plurality of nozzles that eject ink is in charge of recording; a nozzle pattern determination function of determining a nozzle pattern indicating by which of the plurality of nozzles the individual pixels of an image to be recorded on a recording medium by the recording head are to be recorded; a conversion function of converting gradation values of the individual pixels, reflecting the first nozzle ejection rate of the nozzle that records the individual pixels respectively on the gradation values of the individual pixels of the image, on the basis of the first nozzle ejection rate determined by the nozzle ejection rate determination function and the nozzle pattern determined by the nozzle pattern determination function; and a halftone processing function of generating dot data by executing halftone processing to the gradation values of the individual pixels of the image converted by the conversion function, and in the program, the halftone processing function is a function of performing the halftone processing using a second dither mask generated by reflecting a second nozzle ejection rate corresponding to at least one nozzle in charge of recording at individual pixel positions on each of the thresholds of the individual pixel positions in a first dither mask and thereby converting the threshold of the first dither mask, the first dither mask is a dither mask that outputs a dot arrangement of a non-uniform dot density reflecting the second nozzle ejection rate according to the pixel position of the first dither mask for a uniform input value, and the second dither mask is a dither mask that outputs a dot arrangement of the same dot density for the same input value, regardless of the pixel position.

In the twelfth aspect, matters similar to the specific matters of the image processing device specified in the second aspect to the tenth aspect can be appropriately combined. In that case, an element of a processing unit or a functional unit specified in the image processing device can be recognized as an element of "function" that performs processing or an operation corresponding thereto.

According to the presently disclosed subject matter, generation of density irregularity such as banding can be suppressed without lowering productivity, without inviting image quality decline, and regardless of a recording duty.

BRIEF DESCRIPTION OF THE DRAWINGS

FIG. 10 is an explanatory diagram illustrating one example of a nozzle pattern;

FIG. 38 is an explanatory diagram of nozzle numbers corresponding to individual pixels of the dither mask in the case of mask shifting processing;

FIG. 44 is an explanatory diagram illustrating an example in the case of satisfying a condition that all the nozzle numbers are circulated;

FIG. 45 is an explanatory diagram illustrating another example in the case of satisfying the condition that all the nozzle numbers are circulated;

FIG. 49A is a schematic diagram of a single path type recording head; and

FIG. 49B is a graph illustrating the nozzle ejection rate of each nozzle of the recording head.

DETAILED DESCRIPTION OF THE EMBODIMENTS

Hereinafter, a mode for carrying out the presently disclosed subject matter is described in detail according to the accompanying drawings.

<Configuration Example of Inkjet Recording Device>

Figure 1:
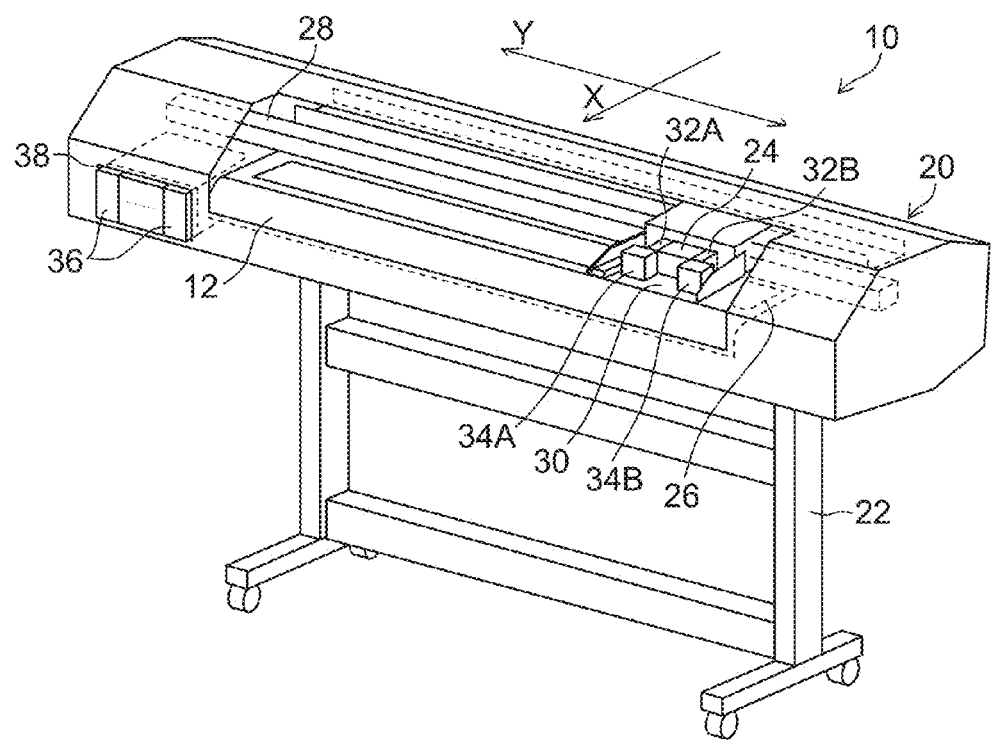
FIG. 1 is an external perspective view illustrating a configuration example of an inkjet recording device.

FIG. 1 is an external perspective view illustrating a configuration example of an inkjet recording device. An inkjet recording device 10 is one example of a serial type inkjet printer, and is a wide format printer that records a color image onto a recording medium 12 using ultraviolet curing type ink. However, in application of the invention, a form of the inkjet recording device is not limited to this example.

The inkjet recording device 10 includes a device body 20, and a support leg 22 that supports the device body 20. The device body 20 is provided with a recording head 24, a platen 26, a guide mechanism 28, and a carriage 30.

The recording head 24 is a drop-on-demand type inkjet head that ejects ink toward the recording medium 12. The term "recording head" has the same meaning as terms such as a print head, a printing head, a drawing head, an ink ejecting head, a liquid ejecting head, a droplet ejecting head, or a droplet jetting head or the like. Also, the term "inkjet recording device" has the same meaning as terms such as an inkjet printing device, an inkjet printing machine, an inkjet printer, or an inkjet type image forming apparatus or the like. "Recording" is used as a term that includes the meaning of print, printing, drawing or image formation.

For the recording medium 12, various media can be used regardless of a material such as paper, nonwoven fabric, vinyl chloride, synthetic chemical fibers, polyethylene, polyester, or tarpaulin. The recording medium 12 may be a permeable medium or may be an impermeable medium. The term "recording medium" is a general term of a medium to which ink is deposited, and includes the ones called by various terms such as a printing medium, a recording target medium, an image formation target medium, an image receiving medium, an ejection target medium, a print medium, recording paper or print paper. The term "paper" in the present specification is used for the same meaning as "recording medium".

The platen 26 is a member that supports the recording medium 12. The guide mechanism 28 and the carriage 30 function as a head moving device that movably supports the recording head 24. The guide mechanism 28 is arranged extending along a head scanning direction which is a direction that intersects with a conveyance direction of the recording medium 12 and is a direction parallel to a medium support surface of the platen 26 at an upper part of the platen 26. The upper part of the platen 26 means a high position on an upper side of the platen 26 with a gravity direction as "lower part". The conveyance direction of the recording medium 12 is sometimes called "paper feed direction". Also, a direction which is orthogonal to the paper feed direction and the direction parallel to a recording surface of the recording medium 12 is sometimes called "paper width direction".

The carriage 30 is supported movably back and forth in the paper width direction along the guide mechanism 28. The direction parallel to the reciprocating moving direction of the carriage 30 corresponds to "main scanning direction". Also, the direction parallel to the conveyance direction of the recording medium 12 corresponds to "sub scanning direction". That is, the paper width direction is the main scanning direction, and the paper feed direction is the sub scanning direction. In FIG. 1, the sub scanning direction is noted as an X direction, and the main scanning direction is noted as a Y direction.

The carriage 30 is loaded with the recording head 24, temporarily curing light sources 32A and 32B, and full curing light sources 34A and 34B. The recording head 24, the temporarily curing light sources 32A and 32B, and the full curing light sources 34A and 34B are integrally moved together with the carriage 30 along the guide mechanism 28. By moving the carriage 30 back and forth in the main scanning direction along the guide mechanism 28, the recording head 24 can be relatively moved in the main scanning direction to the recording medium 12. The guide mechanism 28 and the carriage 30 correspond to one form of a moving unit that relatively moves the recording head 24 and the recording medium 12.

The temporarily curing light sources 32A and 32B emit ultraviolet rays for temporarily curing ink impacted onto the recording medium 12. Temporary curing means partial curing of the ink so as to prevent movement and deformation of ink droplets immediately after deposition. A process of the temporary curing is sometimes called "partial curing", "semi-curing", "pinning" or "set" or the like. In the present specification, the term "temporary curing" is used.

On the other hand, a process of further emitting ultraviolet rays and sufficiently curing the ink after the temporary curing is called "full curing" or "curing". In the present specification, the term "full curing" is used. The full curing light sources 34A and 34B are light sources that perform additional exposure after the temporary curing and emit ultraviolet rays for completely curing (that is, fully curing) the ink finally.

The device body 20 is provided with an attaching unit 38 for attaching an ink cartridge 36. The ink cartridge 36 is a freely exchangeable ink tank that stores the ultraviolet curing type ink. The ink cartridge 36 is provided corresponding to the ink of each color used in the inkjet recording device 10. The inkjet recording device 10 of this example is configured to use the ink of four colors that are cyan (C), magenta (M), yellow (Y), and black (K). The individual ink cartridges 36 for the respective colors are connected to the recording head 24 by respectively independently formed ink supply routes not illustrated in the figure. When an ink residual amount of each color becomes small, the ink cartridge 36 is exchanged.

Though omitted in the figure, on a right side facing the front of the device body 20, a maintenance unit of the recording head 24 is provided. The maintenance unit includes a cap for moisture retention and nozzle suction of the recording head 24 when printing is not performed, and a wiping member for cleaning a nozzle surface which is an ink ejection surface of the recording head 24. For the wiping member, a blade and/or a web can be used.

[Configuration of Recording Medium Conveyance Path]

Figure 2:
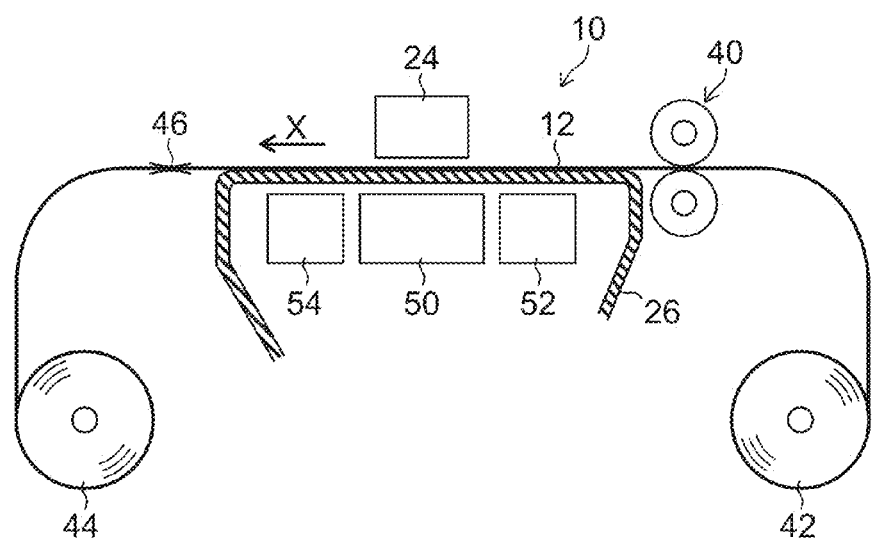
FIG. 2 is a schematic diagram schematically illustrating a recording medium conveyance path of the inkjet recording device.

FIG. 2 is a schematic diagram schematically illustrating a recording medium conveyance path of the inkjet recording device 10. As illustrated in FIG. 2, an upper surface of the platen 26 becomes a support surface of the recording medium 12. A nip roller 40 is disposed on an upstream side of the paper feed direction relative to a position of the platen 26.

The recording medium 12 of this example is supplied in a form of continuous paper (also called web paper) wound in a roll shape. The recording medium 12 sent out from a roll 42 on a supply side is conveyed by the nip roller 40. To the recording medium 12 which arrives at a part right below the recording head 24, an image is recorded by the recording head 24. On a downstream side of the paper feed direction relative to the position of the recording head 24, a winding roll 44 that winds the recording medium 12 after the image is recorded is provided. Also, in the conveyance path of the recording medium 12 between the platen 26 and the winding roll 44, a guide 46 is provided.

In the inkjet recording device 10 of the present embodiment, a roll-to-roll type paper conveyance device by which the recording medium 12 sent out from the roll 42 on the supply side is wound to the winding roll 44 through the platen 26 is adopted. However, in implementing the invention, the configuration of the paper conveyance device is not limited to this example. For example, a form that the winding roll 44 is omitted and a form that has a cutter which cuts the recording medium 12 into a desired size or the like are also possible. Also, the recording medium 12 is not limited to the continuous paper, and may be a form of cut paper that is separated sheet by sheet (that is, sheet paper).

On a back surface side of the platen 26, that is, on an opposite side of the medium support surface that supports the recording medium 12 on the platen 26, a temperature control unit 50 that adjusts a temperature of the recording medium 12 while recording images is provided. By temperature adjustment by the temperature control unit 50, a physical property value such as viscosity or surface tension of the ink impacted on the recording medium 12 is turned to a desired value, and a desired dot diameter can be obtained. Also, a pre-temperature-control unit 52 is provided on the upstream side in the paper feed direction of the temperature control unit 50, and an after-temperature-control unit 54 is provided on the downstream side in the paper feed direction of the temperature control unit 50. The configuration of omitting the pre-temperature-control unit 52 and/or the after-temperature-control unit 54 is also possible.

[Configuration Example of Recording Head]

Figure 3:
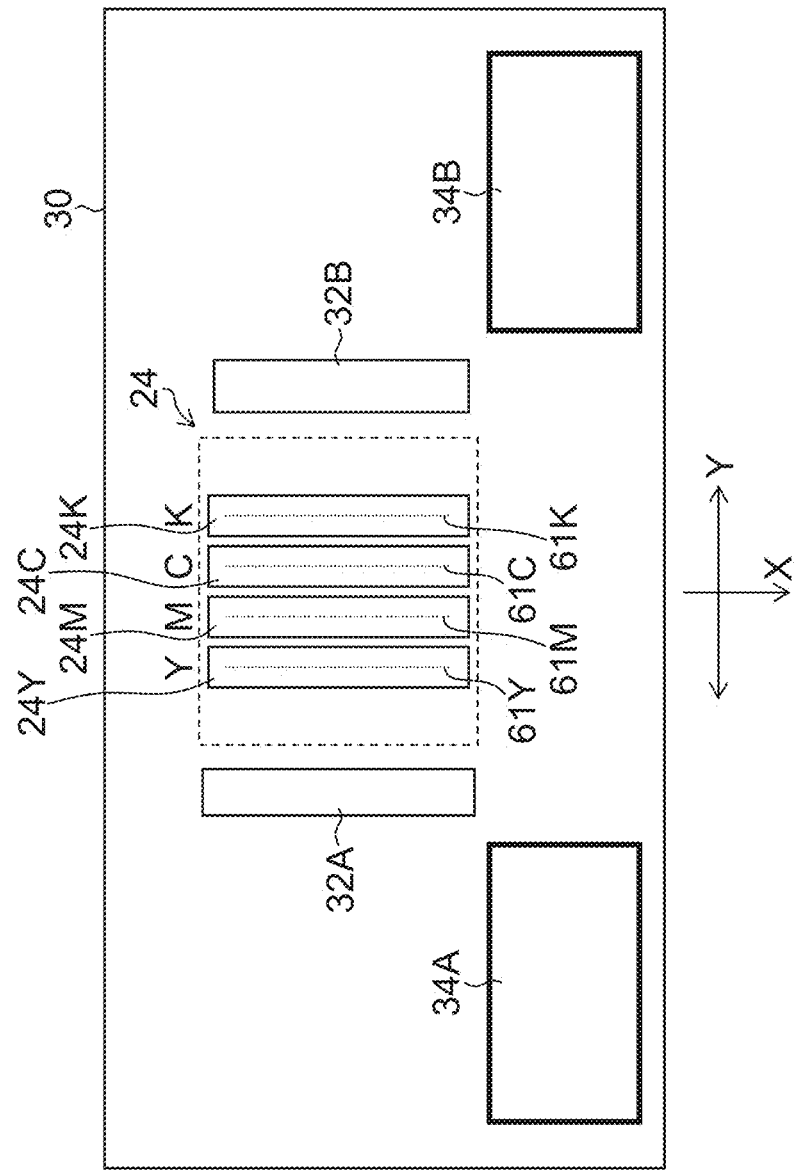
FIG. 3 is a plane perspective view illustrating an example of an arrangement form of a recording head arranged on a carriage.
Figure 4:
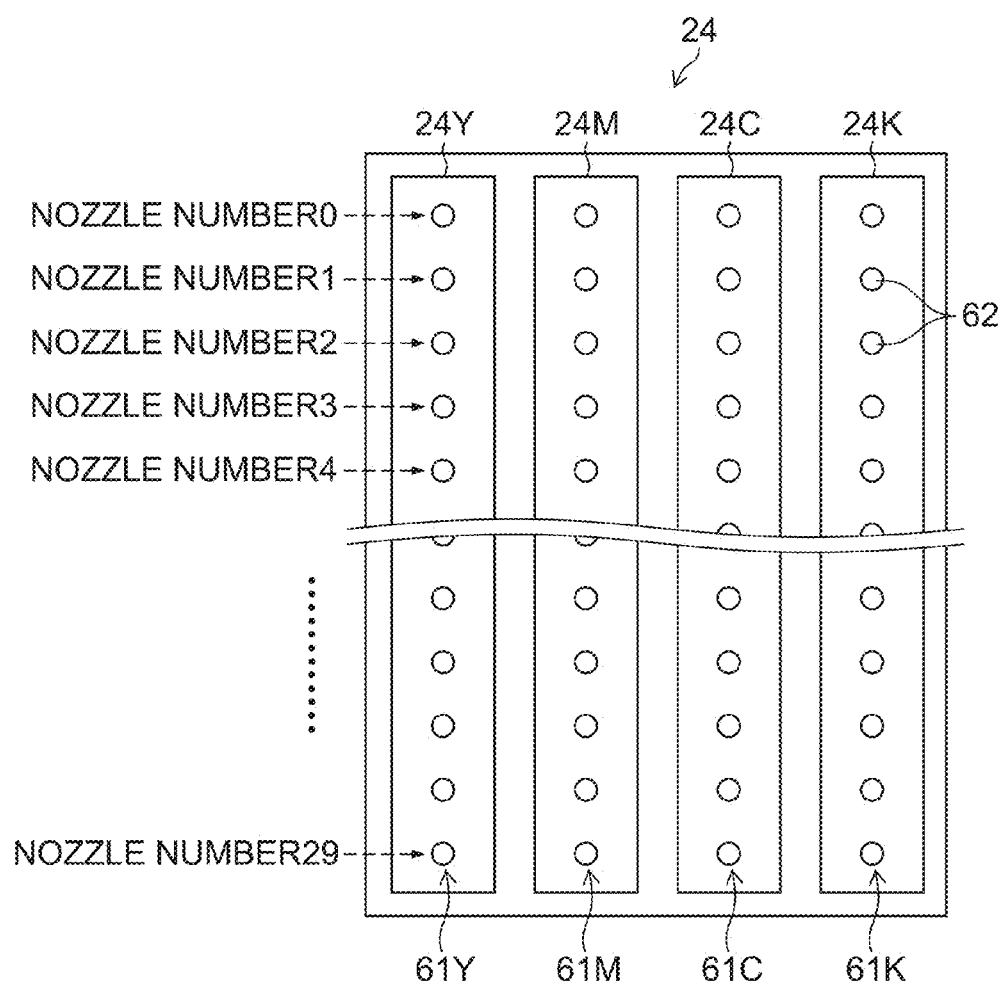
FIG. 4 is an enlarged view of the recording head in FIG. 3.

FIG. 3 is a plane perspective view illustrating an example of an arrangement form of the recording head 24, the temporarily curing light sources 32A and 32B and the full curing light sources 34A and 34B arranged on the carriage 30. FIG. 4 is an enlarged view of the recording head 24 in FIG. 3.

As illustrated in FIG. 3 and FIG. 4, the recording head 24 is provided with nozzle arrays 61C, 61M, 61Y and 61K formed by arraying nozzles 62 (see FIG. 4) for ejecting the ink of the respective colors in the sub scanning direction, for each of the ink of the respective colors that are cyan (C), magenta (M), yellow (Y) and black (K).

In FIG. 3, the nozzle arrays are illustrated by dotted lines, and individual illustrations of the nozzles are omitted. In the recording head 24 illustrated in FIG. 3 and FIG. 4, an example that the individual nozzle arrays are arranged in an order of the nozzle array 61Y for yellow, the nozzle array 61M for magenta, the nozzle array 61C for cyan, and the nozzle array 61K for black from the left of the figure is illustrated, however, kinds (the number of the colors) of the ink colors and color combinations are not limited by the present embodiment.

For example, in addition to four colors of CMYK, the configuration of using light shade ink such as light cyan or light magenta, or the configuration of using the ink of other special colors further instead of the light shade ink or in combination with the light shade ink is also possible. A form of adding a nozzle array that ejects pertinent ink corresponding to the kind of the ink color to be used is possible. Also, an arranging order of the nozzle arrays for the respective colors is not limited in particular. However, it is preferable to arrange the nozzle array of the ink whose curing sensitivity to ultraviolet rays is relatively low among a plurality of ink kinds on a side close to the temporarily curing light source 32A or 32B.

In the present embodiment, a head module is configured for each of the nozzle arrays 61C, 61M, 61Y and 61K for the respective colors, and the recording head 24 is configured by lining the head modules. Specifically, a head module 24Y having the nozzle array 61Y that ejects yellow ink, a head module 24M having the nozzle array 61M that ejects magenta ink, a head module 24C having the nozzle array 61C that ejects cyan ink, and a head module 24K having the nozzle array 61K that ejects black ink are arranged at equal intervals so as to be lined along the reciprocating moving direction (that is, the main scanning direction) of the carriage 30.

The entire module group of the head modules 24Y, 24M, 24C and 24K for the respective colors may be interpreted as "recording head", or it is also possible to interpret each head module as "recording head" respectively. Also, instead of the configuration of combining the head modules 24Y, 24M, 24C and 24K for the respective colors, the configuration of forming ink flow paths separately for the respective colors inside one recording head and having the nozzle array that ejects the ink of the plurality of colors by one head is also possible.

As illustrated in FIG. 4, for each of the nozzle arrays 61C, 61M, 61Y and 61K, the plurality of nozzles 62 are lined and arrayed at fixed intervals in the sub scanning direction. FIG. 4 illustrates an example that 30 pieces of the nozzles 62 are arrayed respectively in the nozzle arrays 61C, 61M, 61Y and 61K for the respective colors. To the individual nozzles 62, nozzle numbers 0-29 are imparted.

The nozzle numbers in this example are imparted to the individual nozzles 62 by consecutive numbers in an order from one end side to the other end side in the sub scanning direction in the nozzle array. In this example, the nozzle numbers start from the number 0, however, a leading number of the nozzle numbers may be the number 1. The leading number can be an arbitrary integer equal to or larger than 0. The nozzle numbers can be used as identification numbers indicating positions of the individual nozzles 62.

Also, the nozzle array in which 30 pieces of the nozzles 62 are arranged in one line along the sub scanning direction is illustrated, however, the number of the nozzles configuring the nozzle array and an arrangement form of the nozzles are not limited to this example. For example, it is possible to form the nozzle array in which the nozzles are lined at equal intervals in the sub scanning direction by a two-dimensional nozzle array for which the plurality of nozzle arrays are combined.

As an ink ejection system of the recording head 24, a piezojet system of jetting the ink by deformation of a piezoelectric element is adopted. The configuration of using an electrostatic actuator instead of the piezoelectric element as an ejection energy generating element is also possible. Also, it is possible to adopt a thermal jet system of generating air bubbles by using a heat generating body (heating element) such as a heater and heating the ink, and jetting ink droplets by the pressure. However, since generally the ultraviolet curing type ink is highly viscous compared to solvent ink, in the case of using the ultraviolet curing type ink, it is preferable to adopt the piezojet system of relatively great ejection power.

The recording head 24 ejects the ink to the recording medium 12 while moving in the main scanning direction, and performs image recording in an area having a fixed length in the sub scanning direction of the recording medium 12. Then, when the recording medium 12 is moved by a fixed amount in the sub scanning direction after the image recording, the recording head 24 performs the similar image recording in the next area, and thereafter, repeatedly performs the similar image recording every time the recording medium 12 is moved by the fixed amount in the sub scanning direction, and can perform the image recording over the entire surface of a recording area of the recording medium 12.

In this way, the recording head 24 is a serial type recording head. The inkjet recording device 10 (see FIG. 1) of the present embodiment adopts a multipath system that achieves a predetermined recording resolution by a plurality of times of scanning by the recording head 24 in the main scanning direction.

[Configuration of Control System of Inkjet Recording Device]

Figure 5:
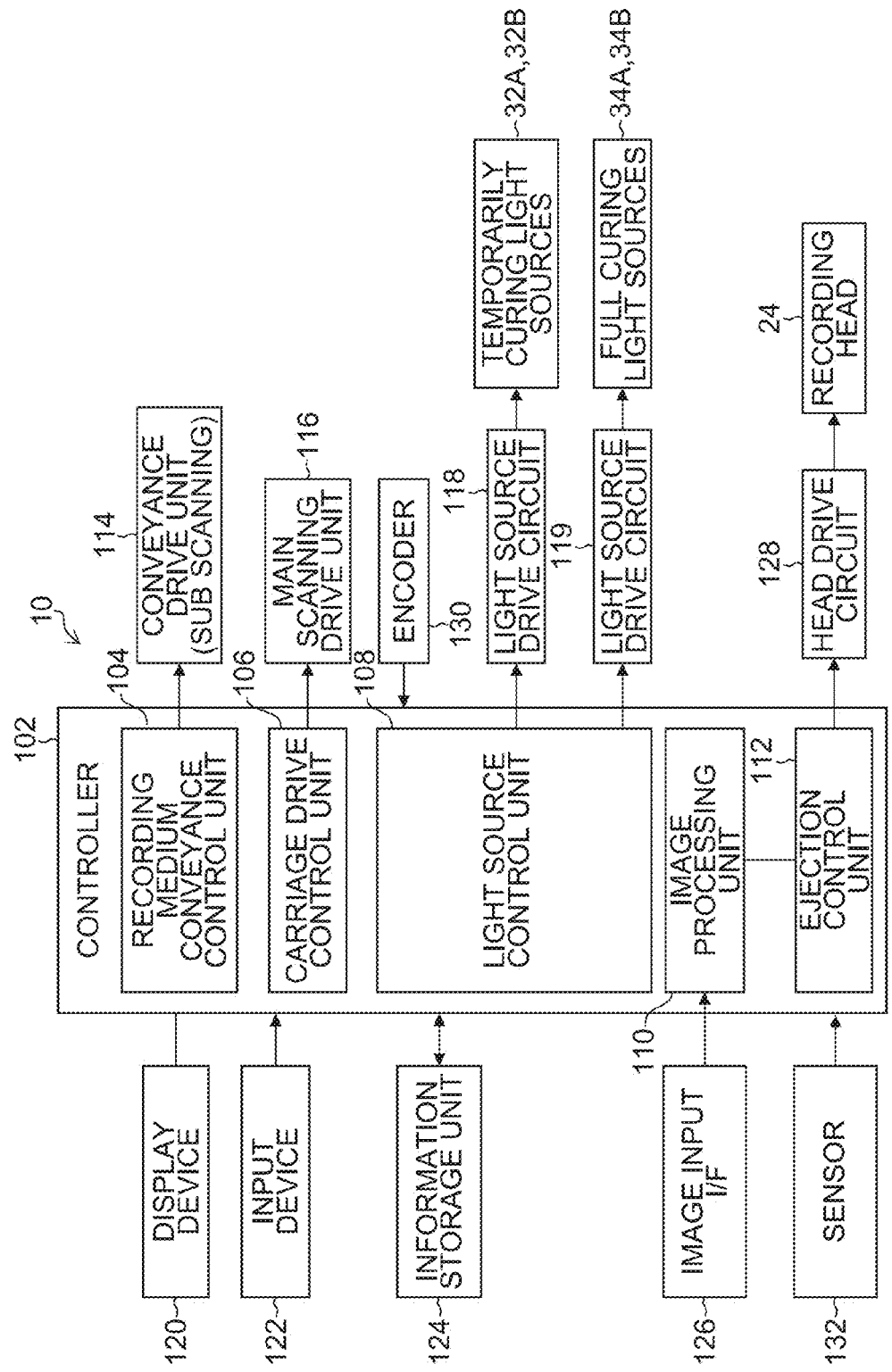
FIG. 5 is a block diagram illustrating a configuration of the inkjet recording device.

FIG. 5 is a block diagram illustrating the configuration of the inkjet recording device 10. As illustrated in FIG. 5, the inkjet recording device 10 includes a controller 102. As the controller 102, for example, a computer including a central processing unit (CPU) can be used. The controller 102 generally controls the entire inkjet recording device 10 by executing various kinds of programs read from an information storage unit 124.

The controller 102 includes a recording medium conveyance control unit 104, a carriage drive control unit 106, a light source control unit 108, an image processing unit 110, and an ejection control unit 112. These respective units can be realized by hardware or software, or the combination thereof. "Software" has the same meaning as "program" or "application".

The recording medium conveyance control unit 104 controls a conveyance drive unit 114 that conveys the recording medium 12. The conveyance drive unit 114 includes a drive motor that drives the nip roller 40 (see FIG. 2), and a drive circuit thereof. The recording medium 12 conveyed onto the platen 26 is intermittently fed in the sub scanning direction by a swath width unit, matched with scanning (movement of a print path) in the main scanning direction by the recording head 24. A swath width is a length in the sub scanning direction determined by a repetition cycle of a scan by the reciprocating movement of the carriage 30, and is obtained by dividing a nozzle array length which is the length in the sub scanning direction of the nozzle array by the number of paths which is the number of times of repeating the scan. The number of the paths which is the number of times of repeating the scan is the number of times of the scanning required for completing drawing by a set recording resolution, and is determined by an image drawing mode. Details of the image drawing mode are described later.

The carriage drive control unit 106 controls a main scanning drive unit 116 that moves the carriage 30 in the main scanning direction. The main scanning drive unit 116 includes a drive motor connected to a moving mechanism of the carriage 30, and a control circuit thereof. The conveyance drive unit 114 and the main scanning drive unit 116 play a role as the moving unit that relatively moves the recording head 24 and the recording medium 12.

To the drive motor of the main scanning drive unit 116 and the drive motor of the conveyance drive unit 114, an encoder 130 is attached. The encoder 130 inputs pulse signals according to a rotation amount and a rotation speed of each drive motor to the controller 102. Thus, the controller 102 can recognize a position of the carriage 30 and a position of the recording medium 12 on the basis of the pulse signals inputted from the encoder 130.

The light source control unit 108 controls light emission of the temporarily curing light sources 32A and 32B through a light source drive circuit 118, and controls light emission of the full curing light sources 34A and 34B through a light source drive circuit 119.

The image processing unit 110 executes image processing to image data inputted through an image input interface 126, and converts the image data to dot data for print. In FIG. 5, for simplification of notation, a notation "IF" is used as a substituting notation substituting a description of an interface. IF is an abbreviation notation of "interface".

The image processing unit 110 functions as a halftone processing unit that executes halftone processing by a dither method. That is, the image processing unit 110 performs quantization processing of a pixel value using a dither mask to a continuous gradation image which is the inputted image data, and generates a halftone image corresponding to the dot data for print. The image processing unit 110 corresponds to one form of "image processing device".

The ejection control unit 112 controls ejection of the ink from the individual nozzles 62 of the recording head 24, by controlling a head drive circuit 128 that drives the recording head 24 on the basis of the dot data generated in the image processing unit 110.

For the information storage unit 124, a nonvolatile memory is used for example, and various kinds of programs required for control of the controller 102 and various kinds of data are stored. For example, the information storage unit 124 stores, as the programs, a control program to be executed by the individual units of the controller 102, and a scanning pattern program, or the like. The scanning pattern program is a program for multipath type image recording, and defines reciprocating scanning (the movement of the print path) in the main scanning direction by the recording head 24 to the recording medium 12 intermittently conveyed in the sub scanning direction, and the number of the paths (the number of times of repeating the scan). The movement of the print path accompanied by the movement of the recording head 24 in the main scanning direction includes at least one of a moving direction of the recording head 24 when forming dots, selection of the nozzle to eject the ink, and an ejection timing. A pattern of the scanning determined by a combination of the movement of the print path and the number of the paths is called "scanning pattern".

To the controller 102, an input device 122 and a display device 120 are connected. For the input device 122, for example, various kinds of devices such as a keyboard, a mouse, a touch panel or an operation button can be adopted, and it may be an appropriate combination thereof. The input device 122 inputs external operation signals by a manual operation of an operator who is a user to the controller 102.

For the display device 120, a liquid crystal display or the like is used. An operator can input various kinds of information using the input device 122. Also, an operator can confirm various kinds of information such as input contents and a state of a system or the like through display at the display device 120.

A sensor 132 is attached to the carriage 30. The controller 102 can recognize a width of the recording medium 12 on the basis of sensor signals inputted from the sensor 132.

[Explanation of Multipath Type Image Recording Method]

Figure 6:
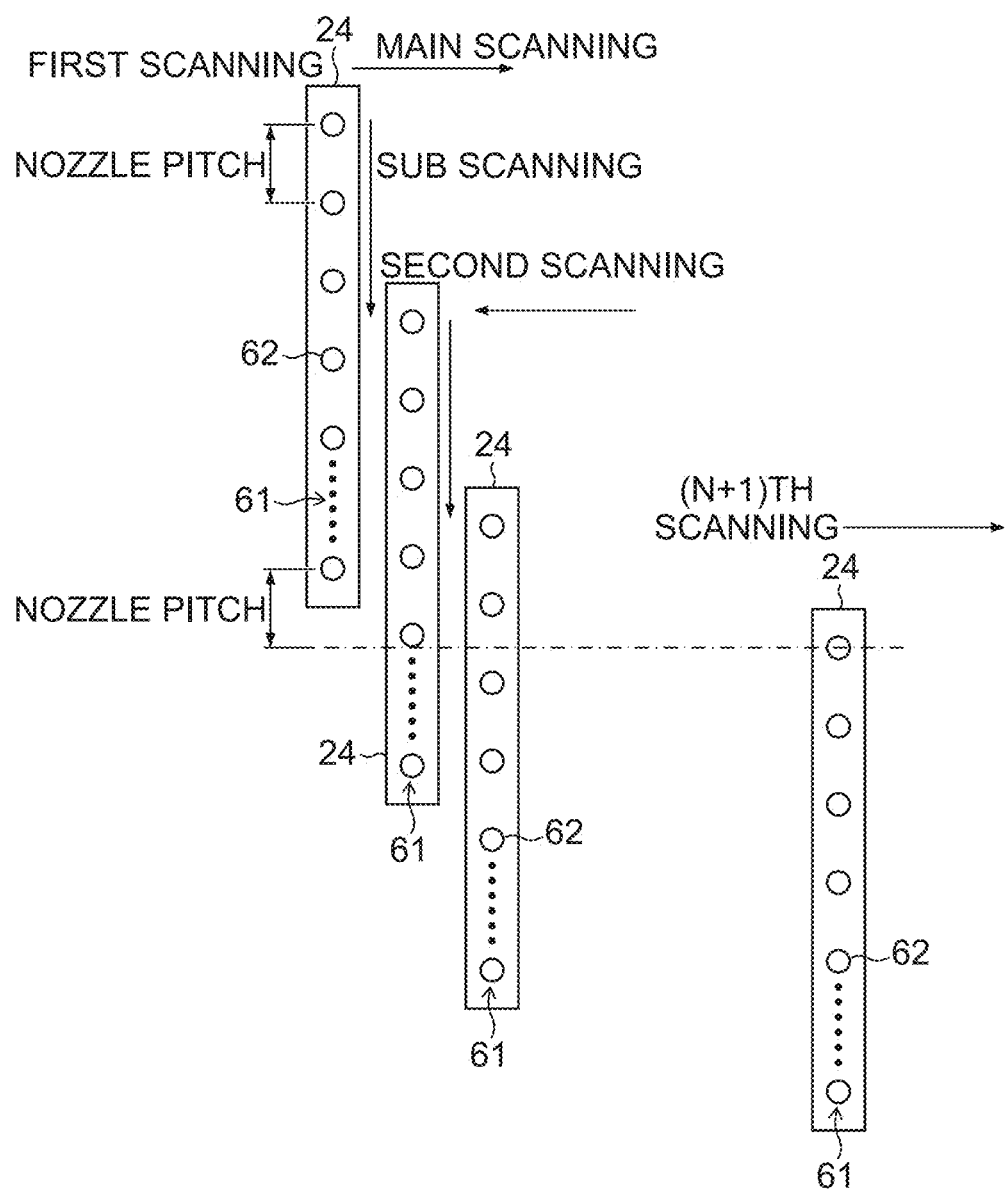
FIG. 6 is an explanatory diagram for explaining one example of a multipath type image recording method.

FIG. 6 is an explanatory diagram for explaining one example of a multipath type image recording method. Here, in order to simplify an explanation, the configuration of the recording head 24 is simplified, and the case that there is only one nozzle array of the recording head 24 and recording is performed by one nozzle array 61 is described as an example. It can be understood that the nozzle array 61 is indicated representing any one array of the nozzle arrays 61C, 61M, 61Y and 61K described in FIG. 4.

Also, for the configuration of intermittently feeding the recording medium in the sub scanning direction, for convenience of the illustration, in FIG. 6, the illustration is such that the recording medium is stopped and the recording head 24 is intermittently moved in the sub scanning direction. In FIG. 6, the illustration of the recording medium is omitted, and only the movement of the recording head 24 is illustrated.

As illustrated in FIG. 6, the ink is ejected from the nozzles 62 when the recording head 24 is moved in the main scanning direction (a crosswise direction in FIG. 6). By the combination of the reciprocating movement of the recording head 24 along the main scanning direction and intermittent feed of the recording medium in the sub scanning direction (a longitudinal direction in FIG. 6), two-dimensional image recording is performed on the recording medium. The term "image recording" may be replaced with the term of drawing, image drawing, print, printing or image formation.

An operation that the recording head 24 ejects the ink from the nozzles 62 and records dots while moving in the main scanning direction is called "scan" or "scanning". For the scan, there may be the scan performed in an outward path in the main scanning direction and the scan performed in a homeward path. The image may be recorded by the scan in both directions of the outward path and the homeward path, and the image may be recorded by the scan in only one direction of the outward path or the homeward path. In the case of performing the scan in both directions of the outward path and the homeward path, the scan of reciprocating once is counted as execution of two times of the scan for the outward path scan and the homeward path scan.

In the case of defining N as a natural number and completing the image of a desired recording resolution by N times of the scan, relative positional relation (here, the positional relation in the sub scanning direction) between the recording medium of the (N+1)th scanning and the recording head 24 becomes the relation illustrated in FIG. 6. That is, in order to perform the image recording of the desired recording resolution by N times of writing, the positional relation is such that the recording medium is intermittently fed in the sub scanning direction for the first time, the second time, the third time, . . . and is connected to a position corresponding to the length of the nozzle array just at the (N+1)th time. In order to seamlessly connect the operation of writing N times, movement is made in the sub scanning direction by a portion of "the nozzle array length+one nozzle pitch" from the sub scanning direction position of the first scanning and the (N+1)th scanning is performed. "Nozzle array length" is the length in the sub scanning direction of the nozzle array 61 in which the nozzles 62 are lined and arrayed in the sub scanning direction, and corresponds to an inter-nozzle distance of the nozzles positioned at both ends of the nozzle array. "Nozzle pitch" is a nozzle interval in the sub scanning direction in the nozzle array.

As one example, the case of using the recording head 24 having the nozzle array 61 in which the nozzles 62 are lined at a nozzle array density 100 npi, and achieving the recording resolution of main scanning direction 600 dpi×sub scanning direction 400 dpi by eight paths (eight times of writing) of two paths in the main scanning direction and four paths in the sub scanning direction (main scanning direction 2×sub scanning direction 4) is considered. A unit npi (nozzle per inch) is a unit indicating the number of nozzles per inch. A unit dpi (dot per inch) is a unit indicating the number of dots per inch. One inch is about 25.4 millimeters.

Here, an interval of deposition points determined from the recording resolution is called "deposition point interval", and a lattice indicating positions of recordable deposition points is called "deposition point lattice". "Deposition point" has the same meaning as "pixel" for which recording or non-recording of the dot can be controlled. "Deposition point interval" has the same meaning as "pixel interval", and corresponds to the minimum dot interval at the recording resolution. "Deposition point lattice" has the same meaning as "pixel lattice". "Lattice" has the same meaning as cells of a matrix expressed by rows and columns.

In the case of the recording resolution of main scanning direction 600 dpi×sub scanning direction 400 dpi, the deposition point interval in the main scanning direction is 25.4 (millimeters)/600≈42.3 micrometers, and the deposition point interval in the sub scanning direction is 25.4 (millimeters)/400=63.5 micrometers. This indicates a size "42.3 micrometers×63.5 micrometers" of one cell (corresponding to one pixel) of the deposition point lattice. For feed control of the recording medium 12 and control of a deposition position (that is, a deposition timing) from the recording head 24, a feed amount and the position are controlled with the deposition point interval determined from the recording resolution as a unit. The deposition point interval determined from the recording resolution is sometimes called "resolution pitch" or "pixel pitch". Also, while the nozzle pitch can be indicated by a unit of the length, instead, it can be indicated with the deposition point interval (pixel pitch) in the sub scanning direction as a unit. For example, in the case that the nozzle array density is 100 npi for the recording resolution of sub scanning direction 400 dpi, since the nozzle pitch is four times the pixel pitch in the sub scanning direction, with the pixel pitch in the sub scanning direction as the unit, the nozzle pitch can be expressed as "4".

In the case of N=8 by two paths in the main scanning direction and four paths in the sub scanning direction, to fill a deposition point line in the main scanning direction by two times of the scanning and to fill a deposition point line in the sub scanning direction by four times of the scanning, recording of 2×4 pieces of deposition point lattices is performed by eight times of the scanning (that is, eight paths). "Deposition point line" means a scanning line and has the same meaning as a raster line.

Figure 7:
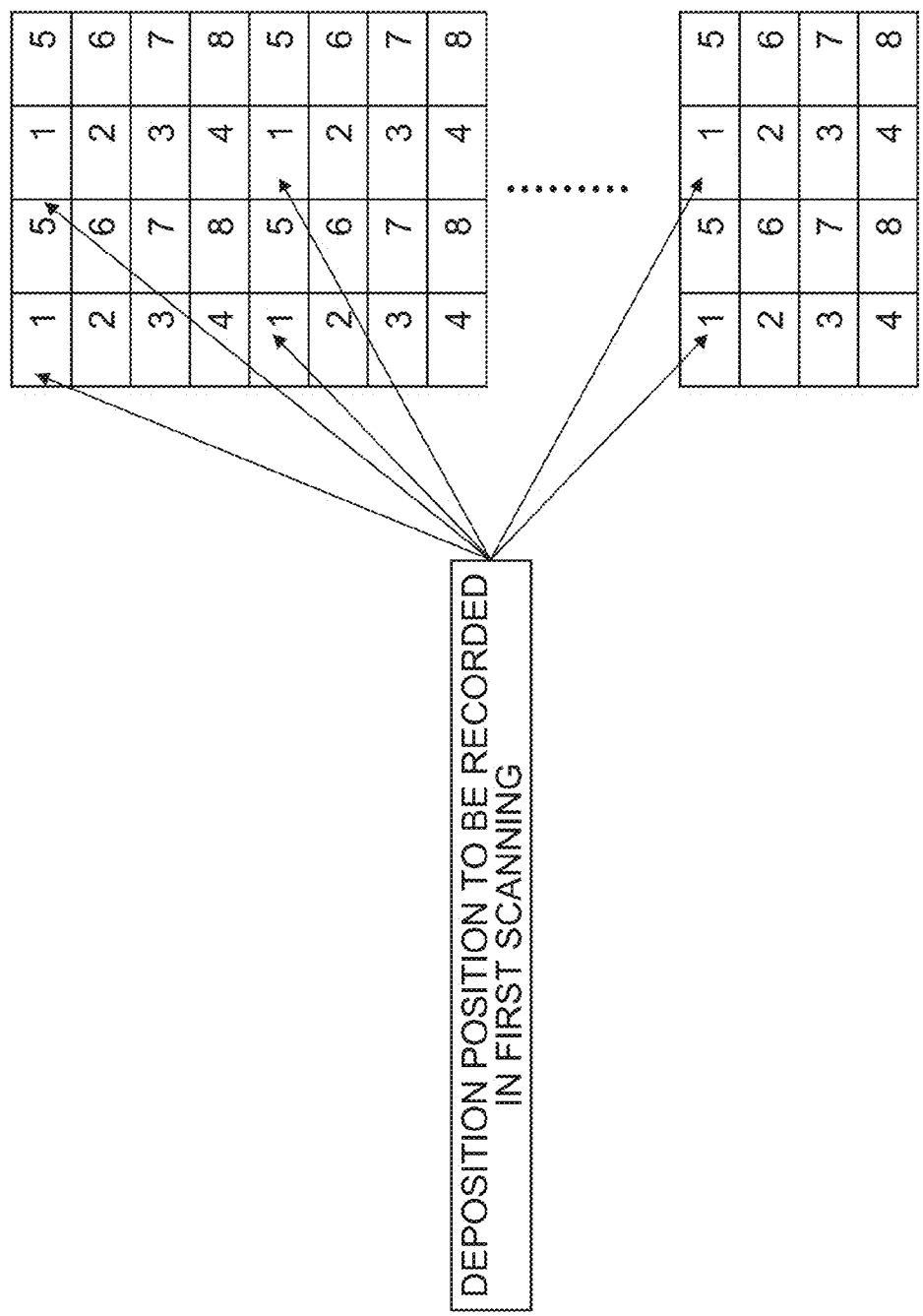
FIG. 7 is a schematic diagram schematically illustrating relation between a number of each scanning by a drawing operation of writing eight times and a deposition position recorded by the scanning.

FIG. 7 is a schematic diagram schematically illustrating relation between a number (1 to 8) of each scanning by a drawing operation of writing eight times and a deposition position recorded by the scanning. In FIG. 7, the individual cells to which numbers of 1 to 8 are attached indicate the deposition positions (pixel positions) to be recorded by the nozzles 62, and the numbers 1-8 indicate the number of the scanning indicating in the scanning of what order the pixel position is to be recorded. For example, the cell (pixel) to which the number "1" is attached indicates the deposition position to be recorded in the first scanning.

As is clear from FIG. 7, for an arrangement distribution of the numbers 1 to 8 indicating a scanning order to record the individual deposition positions, the lattice of "2×4" of main scanning direction 2×sub scanning direction 4 is a basic unit of repetition. The lattice of 2×4 is called "basic unit lattice" or "2×4 lattice". A method of filling the 2×4 lattice (a deposition order) can be variously assumed without being limited to the example illustrated in FIG. 7.

According to the image drawing mode, the recording resolution and the scanning pattern are determined, and the number of the cells of the basic unit lattice, an array form of the cells, and the numbers (scanning orders) of the scanning of the individual cells are determined.

[Example of Image Drawing Mode]

As already described, for the inkjet recording device 10, multipath type drawing control is applied, and the recording resolution can be changed by changing the number of the print paths. For example, three kinds of modes that are a high production mode, a standard mode, and a high image quality mode are prepared, and the recording resolution is different respectively in the individual modes. The recording resolution has the same meaning as "printing resolution". The image drawing mode can be selected according to print purposes or uses. The term "image drawing mode" may be replaced with "print mode" or "printing mode". The print mode and the printing mode have the same meaning.

A specific description is given with a simple numerical example. It is assumed that the nozzle array density in the sub scanning direction of the nozzle array 61 in the recording head 24 is 100 npi.

In the case of the high production mode, recording is performed by the recording resolution of main scanning direction 600 dpi×sub scanning direction 400 dpi, and the recording by the recording resolution of 600 dpi is achieved by two paths (two times of the scanning) in the main scanning direction. That is, dots are formed by the resolution of 300 dpi in the first scanning (outward path of the carriage 30). In the second scanning (homeward path), dots are formed so as to complement the middle of the dots formed by the first scanning (outward path) by 300 dpi, and the resolution of 600 dpi is obtained for the main scanning direction.

On the other hand, for the sub scanning direction, the nozzle pitch is 100 npi, and dots are formed by the resolution of 100 dpi in the sub scanning direction by one time of main scanning (one path). Therefore, the recording resolution of 400 dpi is achieved by performing complementary printing by four-path printing (four times of the scanning).

In the standard mode, recording is executed by the recording resolution of 600 dpi×800 dpi, and the resolution of 600 dpi×800 dpi is obtained by two-path printing in the main scanning direction, and eight-path printing in the sub scanning direction.

In the high image quality mode, printing is executed by the resolution of 1200 dpi×1200 dpi, and the recording resolution of 1200 dpi×1200 dpi is obtained by four paths in the main scanning direction and 12 paths in the sub scanning direction.

[About Nozzle Ejection Rate]

Here, the nozzle ejection rate is described. The nozzle ejection rate is a value indicating a ratio of recording pixels for which each nozzle 62 ejects ink to record a dot, to the recording pixels when recording of a certain gradation is performed, in recording attending pixels allocated to each nozzle as pixels for which each of the plurality of nozzles 62 in the recording head 24 is in charge of recording.

The nozzle ejection rate is determined for each nozzle. The nozzle ejection rate is indicated by the quotient of division, whose denominator is the number of the recording pixels when recording of a certain gradation is performed, in the recording attending pixels allocated to each nozzle, and whose numerator is the number of the recording pixels for which each nozzle ejects ink to record a dot, and can be indicated by a numerical value equal to or larger than 0 and is equal to or smaller than 1. Also, the nozzle ejection rate can be also indicated by a percentage.

In short, the nozzle ejection rate indicates a ratio of ejecting ink for each nozzle 62. The ratio of ejecting ink for each nozzle 62 is equal to the ratio of the recording pixels for each nozzle 62. The nozzle ejection rate can be understood as the ratio of using the nozzles, and can be considered as a nozzle using rate or a nozzle operation rate.

Specifically, the nozzle ejection rate indicates a using rate for each nozzle 62 when recording of a solid pattern which is a uniform gradation image of a certain fixed density reflecting the nozzle ejection rate is performed, in the case that the using rate for each nozzle 62 when recording of the same solid pattern without reflecting the nozzle ejection rate is performed is defined as "1.0" or "100%" which is a reference value. The using rate for each nozzle 62 may be replaced with an ink ejection amount for each nozzle 62 or may be replaced with the number of pixels of the recording pixels for each nozzle 62.

In the present embodiment, the nozzle ejection rate is fixedly determined regardless of tones, however, the nozzle ejection rate may be changed depending on the tones. As the meaning including both of the nozzle ejection rate for each nozzle in the case of determining the nozzle ejection rate in common to the individual tones regardless of the tones and the nozzle ejection rate for each nozzle in the case of determining the nozzle ejection rate that differs depending on the tones, the nozzle ejection rate for each nozzle can be "information indicating the ratio of the recording pixels for which each nozzle ejects ink to record a dot, in the recording attending pixels allocated to each nozzle as pixels for which each of the plurality of nozzles in the recording head having the plurality of nozzles that eject ink is in charge of recording".

Figure 8:
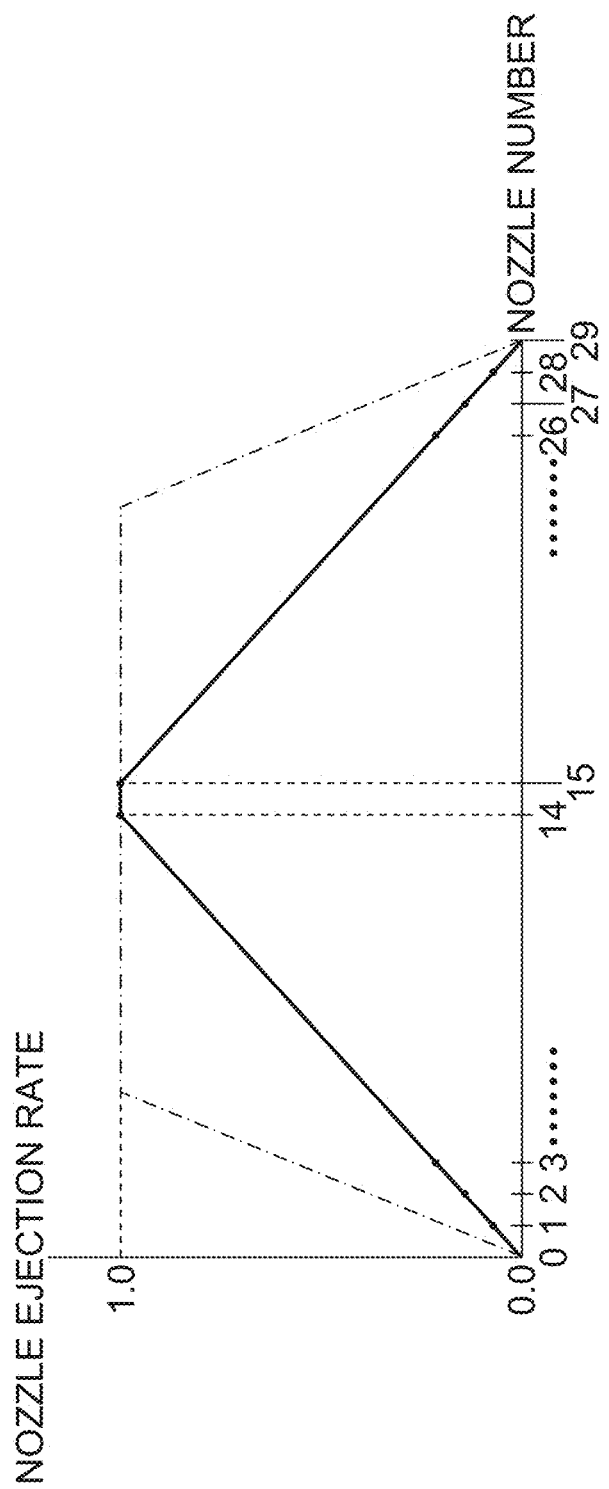
FIG. 8 is a diagram illustrating one example of data of a nozzle ejection rate determined for each nozzle.

FIG. 8 is a diagram illustrating one example of data of the nozzle ejection rate determined for each nozzle. In FIG. 8, a horizontal axis indicates the nozzle number, and a vertical axis indicates the nozzle ejection rate corresponding to each nozzle number. In FIG. 8, the nozzle ejection rate of the nozzle arranged at the center part of the nozzle array is set at "1.0" of the reference value. That is, it means that the using rate of the nozzle arranged at the center part of the nozzle array (or the ink ejection amount by the nozzle or the number of pixels of the recording pixels) coincides with the using rate (or the ink ejection amount by the nozzle or the number of pixels of the recording pixels) in the case of not reflecting the nozzle ejection rate.

Also, in the example illustrated in FIG. 8, to suppress banding the nozzle ejection rate of the nozzle arranged at the end of the nozzle array is set to be lower than the nozzle ejection rate of the nozzle arranged at the center part of the nozzle array. For example, as illustrated by a solid line in FIG. 8, the nozzle ejection rate is set to be gradually high from the individual nozzles at both ends of the nozzle number 0 and the nozzle number 29 positioned at both ends of the nozzle array to the nozzles of the nozzle number 14 and the nozzle number 15 positioned at the center part of the nozzle array respectively.

Or, as illustrated by a dashed line in FIG. 8, the nozzle ejection rate of the nozzle groups positioned at both ends of the nozzle array (for example, the nozzle group of the nozzle numbers 0 to 5 and the nozzle group of the nozzle numbers 24 to 29) may be set relatively low, and the nozzle ejection rate of the nozzles positioned between both ends may be set at "1.0", and regarding setting of the nozzle ejection rate, not only the example illustrated in FIG. 8 but also various setting forms can be assumed.

The nozzle ejection rate for each nozzle can be arbitrarily set by a user in addition to the configuration programmed beforehand. For example, a user can input the nozzle ejection rate for each nozzle by utilizing an appropriate user interface, or select a desired pattern from two or more kinds of prepared nozzle ejection rate data candidate patterns.

In the present specification, the nozzle ejection rate to be reflected on image data inputted to the halftone processing is called "first nozzle ejection rate", and the nozzle ejection rate to be used when a dither mask used in the halftone processing is generated is called "second nozzle ejection rate". The first nozzle ejection rate and the second nozzle ejection rate may be the same or may be different. Details are described later.

[Configuration Example of Image Processing Unit]

Figure 9:
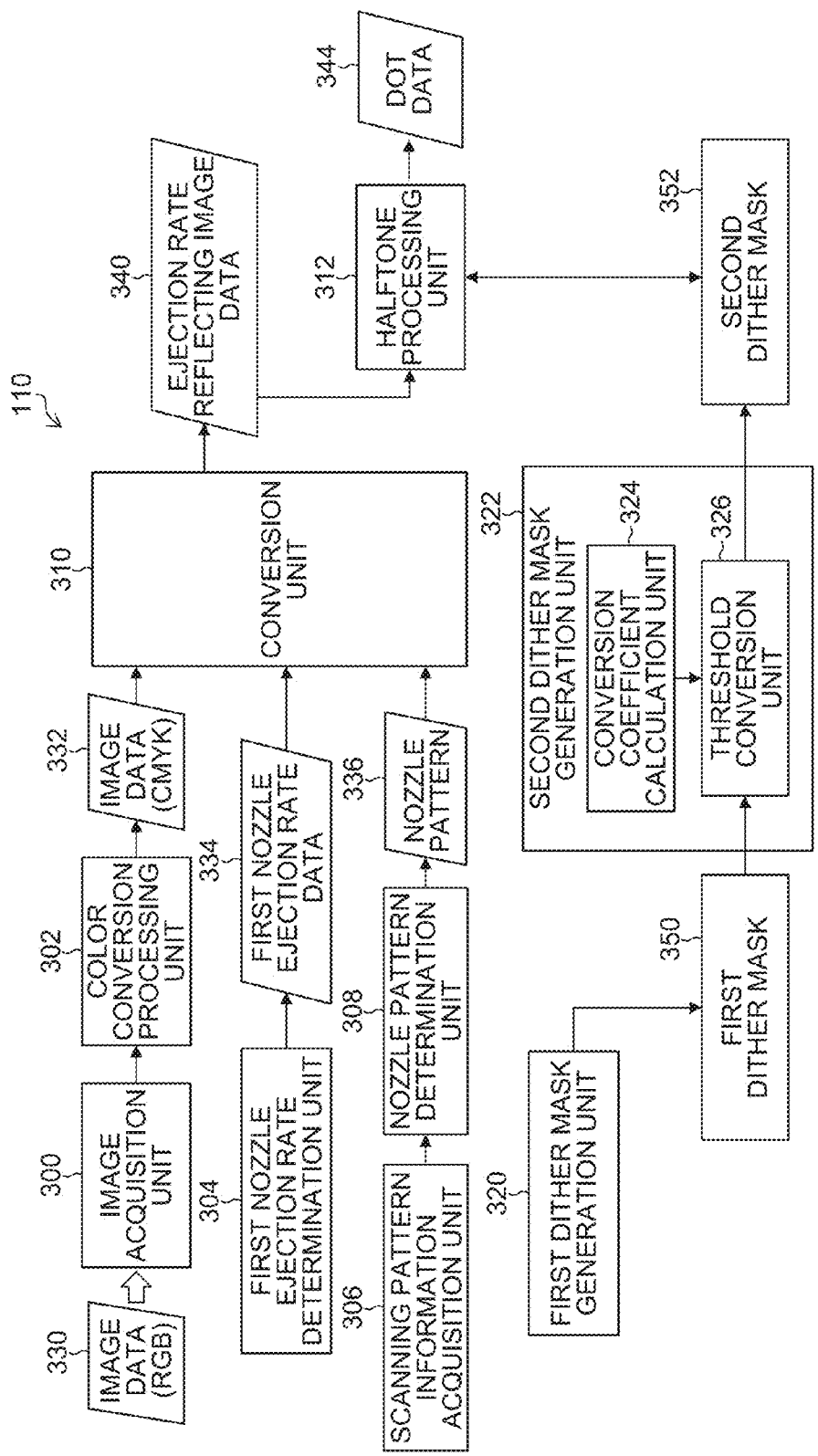
FIG. 9 is a block diagram illustrating a configuration example of an image processing unit.

FIG. 9 is a block diagram illustrating a configuration example of the image processing unit 110. The image processing unit 110 includes an image acquisition unit 300, a color conversion processing unit 302, a first nozzle ejection rate determination unit 304, a scanning pattern information acquisition unit 306, a nozzle pattern determination unit 308, a conversion unit 310, and a halftone processing unit 312. Also, the image processing unit 110 includes a first dither mask generation unit 320 and a second dither mask generation unit 322 as devices that generate the dither mask used in the halftone processing unit 312. The second dither mask generation unit 322 includes a conversion coefficient calculation unit 324 and a threshold conversion unit 326. These individual units can be realized by a hardware circuit such as an integrated circuit, or hardware and software of a computer, or an appropriate combination thereof.

The image acquisition unit 300 is an interface unit that fetches image data 330 to be a print target. The image acquisition unit 300 can be configured by a data input terminal that fetches the image data 330 from another signal processing unit outside or inside the device. As the image acquisition unit 300, a cable or wireless communication interface unit may be adopted, a medium interface unit that reads and writes a portable external storage medium such as a memory card may be adopted, or these modes may be appropriately combined. A part or all of the image acquisition unit 300 may be configured by the image input interface 126 described in FIG. 5.

A data format of the image data 330 is not limited in particular. In this example, as the image data 330, image data of eight bits (256 tones) respectively for the individual colors of RGB (red, green, and blue) is used, but it is not limited to a format of RGB signals and may be a format of CMYK signals or may be a format of the combination of the CMYK signals and characteristic signals or the like. Also, the number of tones (the number of bits) of the signals is also not limited to this example.

The color conversion processing unit 302 performs color conversion processing of the image data using a color profile based on a format of an ICC profile by International Color Consortium (ICC), and generates color image signals suitable for output by the inkjet recording device 10 (see FIG. 1). In the case that the inkjet recording device 10 is configured to perform print using the ink of four colors of CMYK, the image signals of CMYK are generated by the color conversion processing by the color conversion processing unit 302. Also, in the case that the inkjet recording device 10 uses the ink of six colors including light magenta (LM) and light cyan (LC) in addition to the ink of four colors of CMYK, the image signals including individual color components of CMYK and LM and LC are generated by the color conversion processing unit 302.

In this example, the image data 330 of eight bits for the individual colors of RGB inputted from the image acquisition unit 300 is converted to image data 332 of eight bits for the individual colors of CMYK. Then, the color conversion processing unit 302 outputs the image data 332 after color conversion to the conversion unit 310.

In the case that the image data 330 inputted from the image acquisition unit 300 is the image data of CMYK adapted to output colors of the inkjet recording device 10, the color conversion processing unit 302 may be omitted. Also, though omitted in the figure, to the image data 332 after the color conversion processing, gradation conversion processing may be executed so as to be coloring characteristics defined in the inkjet recording device 10.

Further, in the case of printing the image data specified by a format of a resolution different from the recording resolution by the inkjet recording device 10, in a preceding stage or succeeding stage of the image acquisition unit 300, resolution conversion processing is performed by a resolution conversion unit not illustrated in the figure, and conversion to the image data of the resolution to be used in the inkjet recording device 10 is performed.

The first nozzle ejection rate determination unit 304 determines first nozzle ejection rate data 334 that indicates the nozzle ejection rate for each nozzle in the recording head 24 (see FIG. 4). The first nozzle ejection rate data 334 is, for example, the one described in FIG. 8. A processing function of the first nozzle ejection rate determination unit 304 corresponds to one form of "nozzle ejection rate determination function".

The first nozzle ejection rate determination unit 304 can generate the first nozzle ejection rate data 334 by determining the nozzle ejection rate for each nozzle 62, according to a program, or according to an instruction from a user inputted through the input device 122 (see FIG. 6). The first nozzle ejection rate data 334 determined by the first nozzle ejection rate determination unit 304 is sent to the conversion unit 310.

The scanning pattern information acquisition unit 306 acquires information of the scanning pattern according to the image drawing mode from the scanning pattern program or the like. As described above, since the scanning pattern program defines the reciprocating scanning in the main scanning direction by the recording head 24 to the recording medium 12 intermittently conveyed in the sub scanning direction and the number of the paths, the scanning pattern of the recording head 24 can be discriminated from the scanning pattern program.

The nozzle pattern determination unit 308 determines by which nozzle 62 of the recording head 24 the individual pixels of the image data 330 are to be recorded onto the recording medium 12, based on the information of the scanning pattern obtained from the scanning pattern information acquisition unit 306. That is, the nozzle pattern determination unit 308 determines a nozzle pattern 336 indicating by which one of the individual nozzles 62 of the recording head 24 the individual pixels of the image to be recorded onto the recording medium 12 by the recording head 24 are to be recorded. A processing function of the nozzle pattern determination unit 308 corresponds to one form of "nozzle pattern determination function". The data of the nozzle pattern 336 determined in the nozzle pattern determination unit 308 is sent to the conversion unit 310.

FIG. 10 is an explanatory diagram illustrating one example of the nozzle pattern 336. As illustrated in FIG. 10, the nozzle pattern 336 determines the nozzle numbers of the nozzles 62 in charge of recording of the individual pixels, for each pixel of the image data 330. In FIG. 10, individual cells to which numbers are attached indicate the individual pixels of the image, and the numbers inside the individual cells indicate the nozzle numbers of the nozzles 62 in charge of the recording of the pixels. When the scanning pattern is determined, the nozzle numbers in charge of the recording of the individual pixels of the image data 330, that is, the nozzle numbers of the nozzles 62 corresponding to the individual pixels, are specified, and the nozzle pattern 336 is obtained. The nozzle pattern 336 indicates an array pattern of the nozzle numbers of the nozzles 62 corresponding to the individual pixels. The data of the nozzle pattern 336 is called nozzle pattern data.

A method of determining the nozzle pattern 336 is not limited to the method of determining it based on the scanning pattern program, and various kinds of known methods are used. Also, the nozzle pattern 336 may be determined every time of image recording processing, however, it may be determined when the inkjet recording device 10 is operated for the first time and held in the information storage unit 124 together with the scanning pattern program, or may be stored in the information storage unit 124 beforehand. That is, since the nozzle pattern can be determined by the scanning pattern regardless of the image, the scanning pattern and the nozzle pattern can be associated beforehand, and stored in the information storage unit 124 together with the scanning pattern program.

The conversion unit 310 illustrated in FIG. 9 generates ejection rate reflecting image data 340 of the individual colors by converting gradation values of the individual pixels, reflecting the nozzle ejection rates of the nozzles 62 that record the individual pixels respectively, for each of the gradation values of the individual pixels of the image data 332 for the individual colors of CMYK inputted from the color conversion processing unit 302. The conversion unit 310 generates the ejection rate reflecting image data 340 by converting the gradation values of the individual pixels of the image data 332, based on the first nozzle ejection rate data 334 obtained from the first nozzle ejection rate determination unit 304, and the nozzle pattern 336 obtained from the nozzle pattern determination unit 308. "Gradation value of pixel" means a signal value indicating the gradation given to the pixel, and has the same meaning as "pixel value". A processing function of the conversion unit 310 corresponds to one form of "conversion function".

Figure 11:
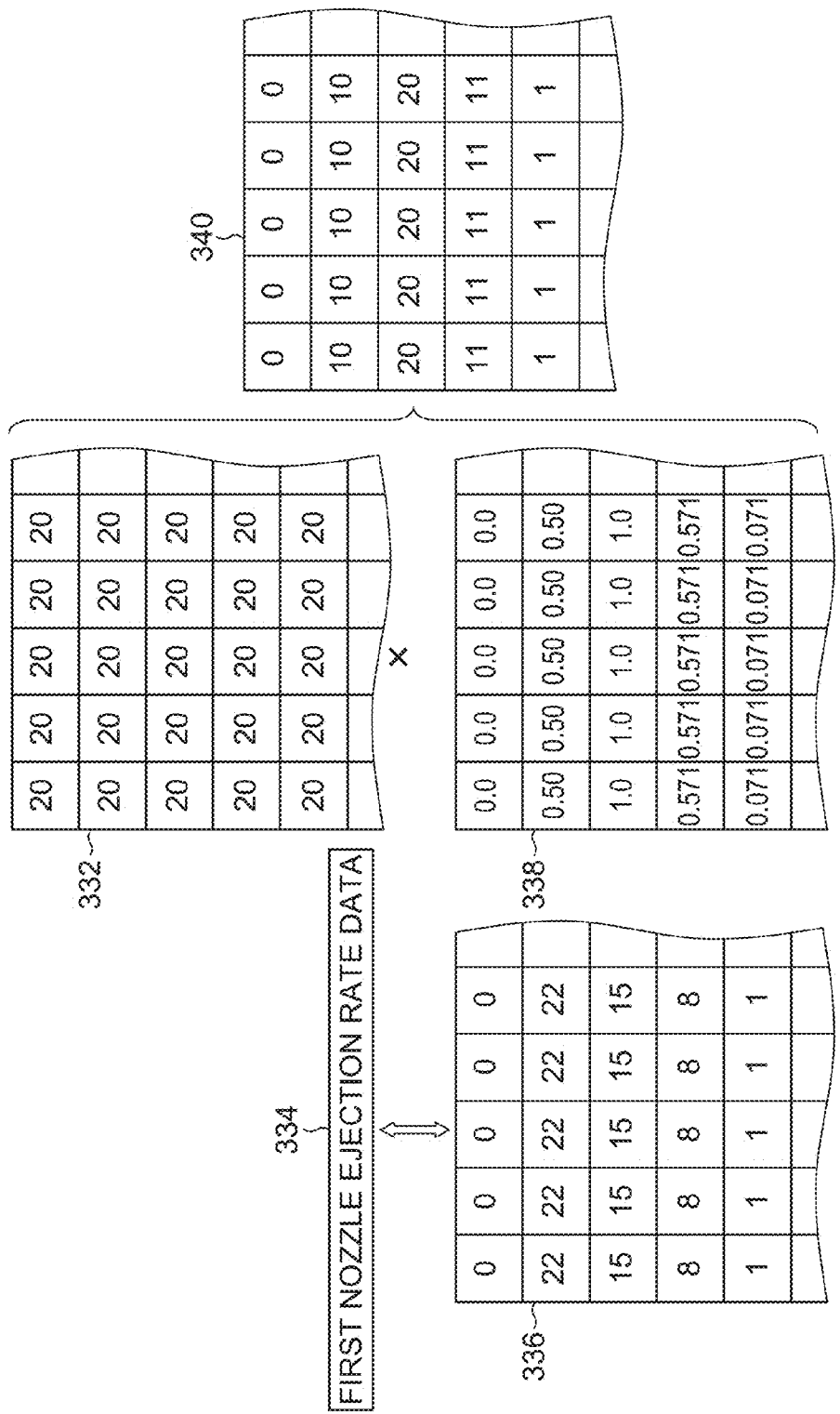
FIG. 11 is a conceptual diagram schematically illustrating content of generation processing of an ejection rate reflecting input image.

FIG. 11 is an explanatory diagram for explaining generation processing of the ejection rate reflecting image data 340 by the conversion unit 310. The conversion unit 310 (see FIG. 9) first compares the nozzle pattern 336 with the first nozzle ejection rate data 334, and obtains an ejection rate pattern 338 indicating relation between the individual pixels of the image data 332 and the nozzle ejection rates of the nozzles 62 that respectively record the individual pixels.

In the description in FIG. 11, in the first nozzle ejection rate data 334 (for example, see FIG. 8), the nozzle ejection rate of the nozzle number 0 is defined as "0.0", the nozzle ejection rate of the nozzle number 1 is defined as about "0.071", . . . the nozzle ejection rate of the nozzle number 8 is defined as "0.571", . . . the nozzle ejection rate of the nozzle number 15 is defined as "1.0", . . . and the nozzle ejection rate of the nozzle number 22 is defined as "0.50". Then, in FIG. 11, the individual cells to which the numbers are attached in the ejection rate pattern 338 indicate the individual pixels of the image, and the numbers inside the individual cells indicate the nozzle ejection rates of the nozzles 62 that record the pixels. On the basis of the ejection rate pattern 338, the nozzle ejection rate of each pixel of the image data 332 is determined.

Next, the conversion unit 310 generates the ejection rate reflecting image data 340 by multiplying each of the gradation values of the individual pixels of the image data 332 with the nozzle ejection rates of the ejection rate pattern 338 respectively corresponding to the individual pixels and converting the gradation values of the individual pixels of the image data 332.

In the description in FIG. 11, in order to easily understand conversion processing of the gradation value, the gradation values of the individual pixels of the image data 332 are all "20". In FIG. 11, in the ejection rate reflecting image data 340, the individual cells to which the numbers are attached indicate the individual pixels of the image, and the numbers inside the individual cells indicate the gradation values of the pixels after conversion.

For example, since the nozzle ejection rate of the nozzle 62 of the nozzle number 0 is "0.0", the conversion unit 310 converts the gradation value of the pixel recorded by the nozzle 62 of the nozzle number 0 from "20" to "0" (=20× 0.0). Also, since the nozzle ejection rate of the nozzle 62 of the nozzle number 1 is about "0.071", the conversion unit 310 converts the gradation value of the pixel recorded by the nozzle 62 of the nozzle number 1 from "20" to "1". When the gradation value "20" of the pixel before the conversion is multiplied with 0.071 of the nozzle ejection rate, it is 20×0.071=1.42, however, since an integer value of eight bits for the individual colors is assumed for the CMYK image as the image data in the present embodiment, it is made into the integer value and turned to "1" by rounding off or rounding down decimal places.

Further, the conversion unit 310 converts the gradation value of the pixel recorded by the nozzle 62 of the nozzle number 8 from "20" to "11", the gradation value of the pixel recorded by the nozzle 62 of the nozzle number 15 from "20" to "20" (=20×1.0), and the gradation value of the pixel recorded by the nozzle 62 of the nozzle number 22 from "20" to "10" (=20×0.50), respectively. For the conversion of the gradation value of the pixel recorded by the nozzle 62 of the nozzle number 8, when the gradation value "20" of the pixel before the conversion is multiplied with 0.571 of the nozzle ejection rate of the nozzle number 8, it is 20×0.571=11.42, however, it is made into the integer value and turned to "11" by rounding off or rounding down decimal places, as already described.

Similarly for the gradation values of the pixels recorded by the nozzles 62 of the other nozzle numbers, the pixel values are converted according to the ejection rate pattern 338.

In this way, the conversion unit 310 multiplies the gradation values of the individual pixels of the image data 332 of CMYK with the nozzle ejection rates of the respectively corresponding nozzles 62, reflects the nozzle ejection rates on the gradation values of the individual pixels, and performs the conversion to the pixel values reflecting the nozzle ejection rates. Thus, the ejection rate reflecting image data 340 for each of the colors of CMYK is generated.

Here, in order to reflect the nozzle ejection rate on the image data 332, the gradation values of the individual pixels of the image data 332 are multiplied with the nozzle ejection rates, however, there are various methods for a reflecting method. For example, it may be integrated with the gradation conversion processing to be the coloring characteristics defined in the inkjet recording device 10. That is, only the conversion from the image data 330 of RGB to the image data 332 of CMYK may be performed in the color conversion processing unit 302 (see FIG. 9), and to the converted image data 332 of CMYK, the conversion unit 310 may perform the gradation conversion processing to be the coloring characteristics defined in the inkjet recording device 10 first, and thereafter, may perform the processing corresponding to multiplication of the gradation values of the individual pixels of the image data of CMYK after the gradation conversion processing with the nozzle ejection rate. For nozzle ejection rate reflecting processing in this case, nonlinear conversion for which the gradation conversion and the multiplication of the nozzle ejection rate are integrated is to be performed. In this way, in the case of reflecting the nozzle ejection rate as the nonlinear conversion, it may be performed by a function for which the gradation values of the individual pixels of the image data before the conversion and the nozzle ejection rates of the individual pixels of the ejection rate pattern as arguments or the gradation values of the individual pixels of the image data before the conversion, the nozzle numbers of the individual pixels of the nozzle pattern 336 and the first nozzle ejection rate data 334 as arguments, and the gradation value reflecting the nozzle ejection rate as output, or it may be performed using a conversion table.

Also, in the case of storing the nozzle pattern 336 beforehand in the information storage unit 124 together with the scanning pattern program, the ejection rate pattern 338 may be determined beforehand based on it and the first nozzle ejection rate data 334 and stored in the information storage unit 124.

For example, the ejection rate pattern 338 may be determined and stored for each of the combinations of the scanning pattern program and the plurality of kinds of the first nozzle ejection rate data 334 for each of the nozzles 62, or as soon as a user determines arbitrary first nozzle ejection rate data 334, the ejection rate pattern 338 for the combination of it and the scanning pattern program may be determined and stored.

The conversion unit 310 outputs the generated ejection rate reflecting image data 340 of the individual colors of CMYK to the halftone processing unit 312 (see FIG. 9).

The halftone processing unit 312 generates dot data 344 to be used in ejection control of the ink for each nozzle 62 by executing the halftone processing to the ejection rate reflecting image data 340 for the individual colors of CMYK inputted from the conversion unit 310. The term "dot data" has the same meaning as data indicating a dot image or a dot arrangement, a dot image, a halftone image or a dot arrangement image or the like. The dot data 344 is binary data indicating ON/OFF of dots in the present embodiment. However, as the dot data 344, multi-value data corresponding to kinds of a dot size may be used. For example, in the case that three kinds of dot sizes that are a large dot, a middle dot and a small dot can be controlled as the kinds of the dot size, it becomes the dot data of four values including these three kinds of dot kinds and discrimination of dot-off (dot absence).

In the case of tentatively converting the image data for the individual colors of CMYK having the plurality (multiple values) of the kinds of the dot size to the image data for the individual colors of CMYK corresponding to the individual dot sizes and executing the halftone processing, after it is converted to the image data for the individual colors of CMYK corresponding to the individual dot sizes, the gradation values of the individual pixels of the CMYK image data corresponding to the individual dot sizes may be converted to the gradation values reflecting the nozzle ejection rate, and the ejection rate reflecting image data 340 for the individual colors of CMYK corresponding to the individual dot sizes may be generated.

The halftone processing unit 312 performs the halftone processing using a dither method. In the dither method, a threshold of a dither mask and the gradation values of the individual pixels of a processing target image are compared, and ON/OFF of dots is determined. The dither mask used in the halftone processing in the halftone processing unit 312 is a second dither mask 352 generated by converting the threshold of a first dither mask 350 generated by the first dither mask generation unit 320. A processing function of the halftone processing unit 312 corresponds to one form of "halftone processing function".

The first dither mask generation unit 320 performs processing of generating the first dither mask 350. The first dither mask 350 is a dither mask that outputs a dot arrangement of a non-uniform dot density reflecting the second nozzle ejection rate according to the pixel position of the first dither mask 350 for a uniform input value. For the first dither mask 350, the threshold is determined so that graininess becomes excellent in a state of the non-uniform dot density reflecting the second nozzle ejection rate. A specific example of a method of generating the first dither mask 350 is described later.

The second dither mask generation unit 322 performs processing of threshold conversion of generating the second dither mask 352 from the first dither mask 350 by performing processing of converting the thresholds of the individual pixels in the first dither mask 350. The second dither mask generation unit 322 generates the second dither mask 352 by converting the thresholds reflecting the second nozzle ejection rate on the thresholds of the individual pixel positions of the first dither mask 350. A specific example of generation processing of the second dither mask 352 including the processing of converting the threshold of the first dither mask 350 is described later.

The conversion coefficient calculation unit 324 performs arithmetic processing of calculating a conversion coefficient for converting the thresholds of the individual pixels of the first dither mask 350. The conversion coefficient is determined for each pixel of the first dither mask 350.

The threshold conversion unit 326 converts the threshold values of the individual pixels of the first dither mask 350 using the conversion coefficient for each pixel calculated by the conversion coefficient calculation unit 324. In this example, by multiplying the threshold values of the individual pixels of the first dither mask 350 with the corresponding conversion coefficients and turning multiplication results into integer values, the thresholds after the conversion are obtained. However, when implementing the invention, an operation method of the threshold conversion is not limited to this example.

By converting the thresholds of the individual pixels of the first dither mask 350 by the threshold conversion unit 326, the second dither mask 352 is obtained. The second dither mask 352 is the dither mask that outputs a dot arrangement of the same dot density for the same input value, regardless of the pixel position.

[Outline of Image Processing Method of Generating Dot Data from Continuous Gradation Image Data]

Figure 12:
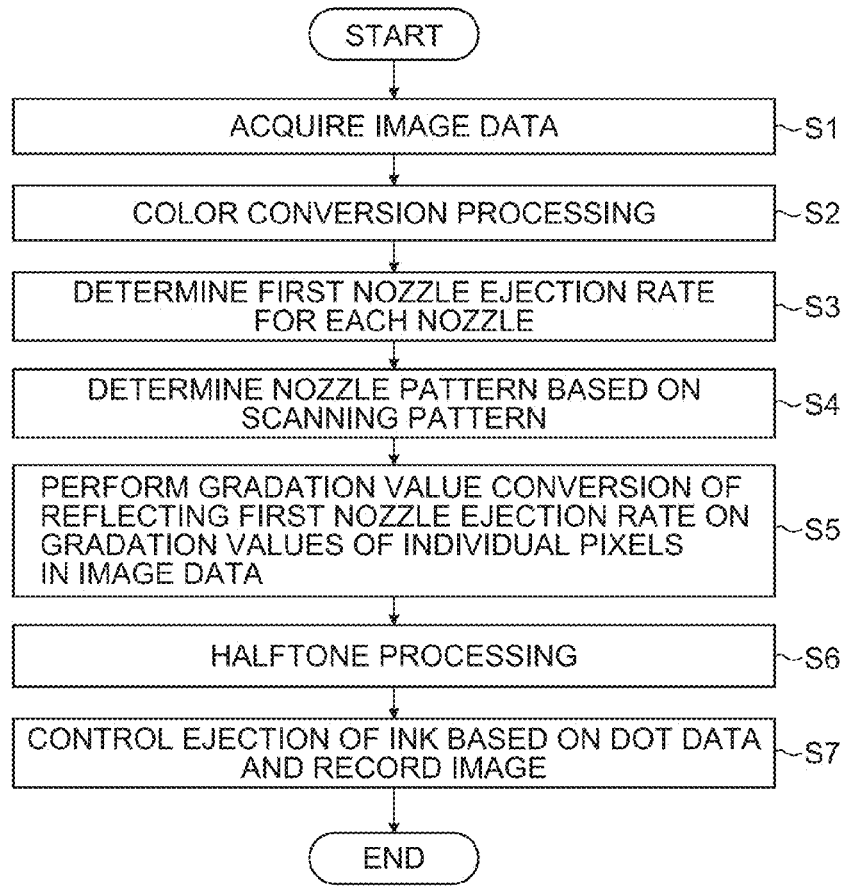
FIG. 12 is a flowchart illustrating a flow of image recording processing in the inkjet recording device.

FIG. 12 is a flowchart illustrating a flow of image recording processing in the inkjet recording device 10.

When a power source of the inkjet recording device 10 is turned ON, based on the control program stored in the information storage unit 124 (see FIG. 5), the individual units of the controller 102 are operated. At the time, by executing the control program, the image processing unit 110 of the controller 102 functions as the color conversion processing unit 302, the first nozzle ejection rate determination unit 304, the nozzle pattern determination unit 308, the conversion unit 310, and the halftone processing unit 312.

First, print target image data is acquired (step S1 in FIG. 12). As described in FIG. 9, the image data 330 is inputted through the image acquisition unit 300. Here, the case of acquiring the data of color images by eight bits for the individual colors of RGB is illustrated. The image data 330 is inputted, various kinds of setting for a print condition or the like are performed in the input device 122 (FIG. 5), and when a recording start operation is performed, the image recording processing by the inkjet recording device 10 is started.

Next, the image data 330 is subjected to the color conversion processing (step S2). The image data 330 of RGB is converted to the image data 332 of CMYK by the color conversion processing. The color conversion processing is, for example, performed using an input profile and an output profile based on the format of ICC (International Color Consortium) color profile.

Next, the image processing unit 110 determines the first nozzle ejection rate for each nozzle (step S3). Step S3 corresponds to one form of "nozzle ejection rate determination process". The first nozzle ejection rate determination unit 304 (see FIG. 9), as described in FIG. 8, determines the nozzle ejection rates of the individual nozzles 62 so that the nozzle ejection rates of the nozzles 62 at both ends of the nozzle array 61 are lower than the nozzle ejection rate of the nozzle 62 at the center part, and generates the first nozzle ejection rate data 334.

In the case that a user sets the nozzle ejection rates of the individual nozzles 62 using the input device 122 beforehand, the first nozzle ejection rate determination unit 304 determines the nozzle ejection rates of the individual nozzles 62 and generates the first nozzle ejection rate data 334 according to the setting by the user.

Also, in the case that the nozzle pattern 336 is stored inside the information storage unit 124 together with the scanning pattern program beforehand and further the ejection rate pattern 338 for each of the combinations of the information and the plurality of kinds of nozzle ejection rate data is stored inside the information storage unit 124, the first nozzle ejection rate determination unit 304 inputs an instruction including ejection rate pattern selection information indicating which ejection rate pattern 338 of the plurality of kinds of the ejection rate pattern 338 stored beforehand is to be used, to the nozzle pattern determination unit 308.

Next, the image processing unit 110 determines the nozzle pattern based on the scanning pattern (step S4 in FIG. 12). Step S4 corresponds to one form of "nozzle pattern determination process". The nozzle pattern determination unit 308 (see FIG. 9) discriminates the scanning pattern of the recording head 24 based on the information obtained from the scanning pattern information acquisition unit 306. Then, the nozzle pattern determination unit 308 determines by which nozzle 62 of the recording head 24 the individual pixels of the image indicated by the image data 332 are to be recorded on the basis of the scanning pattern. Thus, the nozzle pattern 336 (see FIG. 10) is determined by the nozzle pattern determination unit 308.

Also, in the case that the corresponding nozzle pattern 336 is stored inside the information storage unit 124 together with the scanning pattern program beforehand, when the above-described recording start operation is performed, the nozzle pattern determination unit 308 refers to the nozzle pattern 336 corresponding to the scanning pattern program inside the information storage unit 124, determines the pertinent nozzle pattern 336, and inputs it to the conversion unit 310.

An order of executing a process of the color conversion processing (step S2), a process of determining the first nozzle ejection rate (step S3), and a process of determining the nozzle pattern (step S4) is not limited to the order illustrated in FIG. 12 and may be appropriately changed, or these processes may be executed in parallel. Also, depending on the format of the image data acquired in step S1, the process of the color conversion processing (step S2) can be omitted.

Next, the image processing unit 110 performs gradation value conversion of reflecting the first nozzle ejection rate on the gradation values of the individual pixels in the image data 332 (step S5). Step S5 corresponds to one form of "conversion process". The processing of the gradation value conversion in step S5 is carried out by the conversion unit 310 described in FIG. 9. The conversion unit 310 (see FIG. 9) receives input of the image data 332 for the individual colors of CMYK from the color conversion processing unit 302, input of the first nozzle ejection rate data 334 from the first nozzle ejection rate determination unit 304, and input of the nozzle pattern 336 from the nozzle pattern determination unit 308, and starts generation of the ejection rate reflecting image data 340.

First, the conversion unit 310 compares the first nozzle ejection rate data 334 with the nozzle pattern 336, and obtains the first nozzle ejection rates of the nozzles 62 that respectively record the individual pixels of the image data 332. Thus, the ejection rate pattern 338 (see FIG. 11) is generated by the conversion unit 310.

In the case that the nozzle pattern 336 is stored inside the information storage unit 124 together with the scanning pattern program beforehand and the ejection rate pattern 338 for each of the combinations of this and the plurality of kinds of the first nozzle ejection rate data 334 is stored inside the information storage unit 124 further, according to an instruction including the above-described ejection rate pattern selection information given to the nozzle pattern determination unit 308 from the first nozzle ejection rate determination unit 304, the nozzle pattern determination unit 308 refers to the ejection rate pattern 338 corresponding to the pertinent first nozzle ejection rate data 334 inside the information storage unit 124, and determines the ejection rate pattern 338. Then, the nozzle pattern determination unit 308 inputs the determined ejection rate pattern 338 to the conversion unit 310. The conversion unit 310 adopts the ejection rate pattern 338 as it is.

Next, the conversion unit 310 converts the gradation values of the individual pixels of the image data 332 by multiplying the nozzle ejection rates of the ejection rate pattern 338 respectively corresponding to the individual pixels or reflecting the nozzle ejection rates using the function or the conversion table, for each of the gradation values of the individual pixels of the image data 332 for the individual colors of CMYK (step S5). Thus, the gradation values of the individual pixels of the image data 332 for the individual colors are converted to the gradation values reflecting the first nozzle ejection rate respectively, and the ejection rate reflecting image data 340 for the individual colors is generated. The ejection rate reflecting image data 340 for the individual colors is inputted from the conversion unit 310 to the halftone processing unit 312.

Next, the halftone processing is performed in the halftone processing unit 312 (step S6).

The ejection rate reflecting image data 340 inputted to the halftone processing unit 312 is subjected to the halftone processing using the second dither mask 352 in the halftone processing unit 312, and converted to the dot data 344 for the individual colors (step S6). Step S6 corresponds to one form of "halftone processing process". Then, the dot data 344 for the individual colors is inputted from the halftone processing unit 312 to the ejection control unit 112. In the case that there are the plurality (multiple values) of kinds of the dot size, the dot data 344 for the individual colors become the multiple values according to the kinds of the dot size.

Subsequently, on the basis of the dot data 344, the ejection control of the ink is performed, and the image is recorded (step S7). The ejection control unit 112 controls the ejection of the ink from the individual nozzles 62 of the recording head 24 by controlling the head drive circuit 128 that drives the recording head 24 on the basis of the dot data 344 for the individual colors of CMYK inputted from the halftone processing unit 312. Also, the recording medium conveyance control unit 104 controls the conveyance drive unit 114 to intermittently convey the recording medium 12 in the sub scanning direction, and the carriage drive control unit 106 makes the recording head 24 perform the scanning in the main scanning direction by controlling the main scanning drive unit 116 according to the scanning pattern program.

Thus, while the recording head 24 in the main scanning direction and the sub scanning direction is relatively moved to the recording medium 12, the image based on the image data 332 is recorded on the recording medium 12 by the recording head 24 (step S7).

Thereafter, in the case of continuing the image recording, the above-described processing from step S1 to step S7 is repeatedly executed. Even in the case that print target image content is changed, in the case that the first nozzle ejection rate data 334 and the nozzle pattern 336 can be the same as the ones for the time of the previous image recording, the first nozzle ejection rate data 334, the nozzle pattern 336 and the ejection rate pattern 338 or the like that are previously obtained can be used as they are. In such a case, part of the process of determining the first nozzle ejection rate (step S3), the process of determining the nozzle pattern (step S4) and the process of the gradation value conversion (step S5) may be omitted. A process of the processing by the processes from step S1 to step S6 in FIG. 12 corresponds to one form of "image processing method".

According to the image recording processing of the inkjet recording device 10 relating to the present embodiment, by converting the gradation values of the individual pixels of the image data 332 to the gradation values reflecting the nozzle ejection rate, the desired nozzle ejection rate (here, making the nozzle ejection rate of the nozzles 62 at both ends of the nozzle array 61 be lower than the nozzle ejection rate of the nozzle 62 at the center part) is achieved when the image is recorded, and banding can be suppressed.

As illustrated in FIG. 8, generally, the nozzle ejection rate of each nozzle is the value equal to or smaller than "1" so that the ejection rate reflecting image data 340 reflecting the nozzle ejection rate on the gradation values of the individual pixels of the image data 332 becomes the pixel value equal to or smaller than the gradation values of the individual pixels of the original image data 332. Therefore, as in the present embodiment, in the case of generating the dot data by subjecting the ejection rate reflecting image data 340 reflecting the nozzle ejection rate on the gradation values of the individual pixels of the image data image data 332 to the halftone processing, the number of the dots recorded by the recording head 24 declines compared to the case of generating the dot data by subjecting the image data 332 not reflecting the nozzle ejection rate to the halftone processing.

As a result, even when the image data 332 is the data corresponding to a solid pattern of the highest density, the dots are not formed at all the pixels, and the dots are not formed at some pixels. This seems at a glance that the highest density cannot be outputted, however, a practical problem is not caused because of the following reason.

Figure 13:
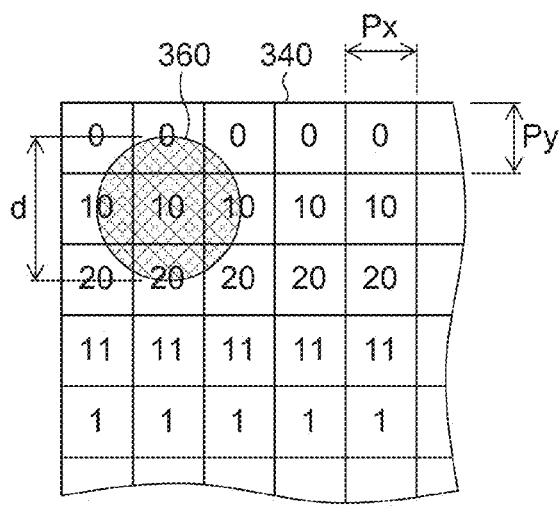
FIG. 13 is an explanatory diagram for explaining a size of a dot diameter of a dot to a pixel of image data.

FIG. 13 is an explanatory diagram for comparing and explaining the size of the pixel of the image data and the size of the dot. Here, the ejection rate reflecting image data 340 is illustrated as the image data, however, it is similar for the image data 332 described in FIG. 11. The resolution of the image data 332 and the resolution of the ejection rate reflecting image data 340 are equal.

In the inkjet recording device, normally, the size of a dot 360 recorded by each nozzle is sufficiently larger than the size of one pixel of image data. When a diameter of the dot 360 is defined as d, a main scanning direction size of one pixel in the image data is defined as Px, and a sub scanning direction size is defined as Py, the dot diameter d satisfies $d > (Px^2 + Py^2)^{1/2}$.

Therefore, a recorded image reaches the highest density without forming the dots at all the pixels. Thus, since the highest density can be achieved even if the dots are not formed at some pixels, a particular problem is not caused.

[About Correction of Nozzle Ejection Rate]

As described in FIG. 13, the dot diameter is sufficiently larger than the size of one pixel determined from the resolution of the image data (ejection rate reflecting image data), and one dot 360 can cover an area of the surrounding pixels. Therefore, even when the number of the dots recorded by the recording head 24 slightly declines, the highest density can be achieved as a whole, and a problem is not caused in particular.

However, the value of the nozzle ejection rate may be corrected so that the number of the dots obtained by subjecting the ejection rate reflecting image data to the halftone processing becomes the same as the number of the dots in the case of assuming that the nozzle ejection rate is not to be reflected. For example, the nozzle ejection rate can be corrected as follows.

[Specific Example of Correction of Nozzle Ejection Rate]

By performing correction by multiplying a correction value α with the individual nozzle ejection rates (L0, L1, L2, . . . described later) of the individual nozzles in the first nozzle ejection rate data 334, the number of the dots can be matched before and after reflecting the first nozzle ejection rate on the pixel values of the individual pixels of the image data. The correction value α is determined as follows.

First, with the repetition cycle in the main scanning direction and the sub scanning direction of the individual nozzles 62 as a unit area, the number of the dots to be arranged in the area is defined as Q (pieces). Reference character Q designates an integer equal to or larger than 0. Also, area ratios of the pixels respectively corresponding to the individual nozzles 62 (nozzle number 0, nozzle number 1, ...) in the unit area described above are defined as r0, r1, .... In this case, the numbers of the dots "to be recorded" by the individual nozzles 62 become r0×Q, r1×Q, .... For example, in the case of Q=40 and r0=r1= ... =4/120, the numbers of the dots become r0×Q=r1×Q= ... =4/3 pieces.

Also, in the case of indicating the nozzle ejection rate of the nozzle 62 of the nozzle number 0 defined by the first nozzle ejection rate data 334 by L0, indicating the nozzle ejection rate of the nozzle 62 of the nozzle number 1 by L1, and indicating the nozzle ejection rate of the nozzle 62 of the nozzle number k by Lk in the same manner, the numbers of the dots to be "actually recorded" by the individual nozzles 62 become "r0×Q×L0", "r1×Q×L1", .... In the case of defining the number of the nozzles of the recording head 24 as K, reference character k indicating the nozzle number designates an integer of 0 to K−1. Reference character K designates an integer equal to or larger than 2.

For example, as illustrated in FIG. 8, in the case of L0=0.0, L1=0.071, ..., the numbers of the dots become "r0×Q×L0"=0 pieces, "r1×Q×L1"=[(4/3)×0.071] pieces, .... Therefore, the number of the dots in the unit area to be "actually recorded" by the individual nozzles 62 becomes Q×(r0×L0+r1×L1+ ...).

In order to make the number of the dots to be recorded by the recording head 24 be the same as the number of the dots in the case of not reflecting the nozzle ejection rate (that is, in the case of assuming that the gradation conversion by the conversion unit 310 is not to be performed), the nozzle ejection rates (L0, L1, ...) of the individual nozzles 62 are corrected so as to satisfy Q=Q×(r0×L0+r1×L1+ ...), that is, the following expression (1).

$$(r0 \times L0 + r1 \times L1 + \ldots) = 1 \qquad \text{Expression (1)}$$

Here, the area ratios (r0, r1, ...) of the individual nozzles 62 normally satisfy the following expression (2).

$$r0 = r1 = r2 = \ldots = 1/K \qquad \text{Expression (2)}$$

In the present embodiment, since it is the case of K=30, the expression (2) becomes r0=r1=r2= ... =1/K=1/30.

The expression (1) is satisfied by performing the correction by multiplying the individual nozzle ejection rates (L0, L1, ...) with α which is the correction value so as to satisfy the following expression (3), $$L0 + L1 + L2 + \ldots = K \qquad \text{Expression (3)}$$

without changing the individual rates of the nozzle ejection rates (L0, L1, ...), based on the expression (1) and the expression (2). The correction value α is indicated by the following expression (4).

$$\alpha = K/(L0 + L1 + L2 + \ldots) \qquad \text{Expression (4)}$$

That is, by correcting the nozzle ejection rate of each nozzle using the correction value α, the number of the dots to be recorded by the recording head 24 can be made the same as the number of the dots in the case of assuming that the nozzle ejection rate is not to be reflected.

Therefore, in the configuration illustrated in FIG. 9 described above, by changing the individual nozzle ejection rates (L0, L1, ...) of the first nozzle ejection rate data 334 used by the conversion unit 310 to the values for which the correction value α is multiplied respectively with the individual nozzle ejection rates (L0, L1, ...), the number of the dots to be recorded by the recording head 24 can be made the same as the number of the dots in the case of not reflecting the nozzle ejection rate.

Figure 14:
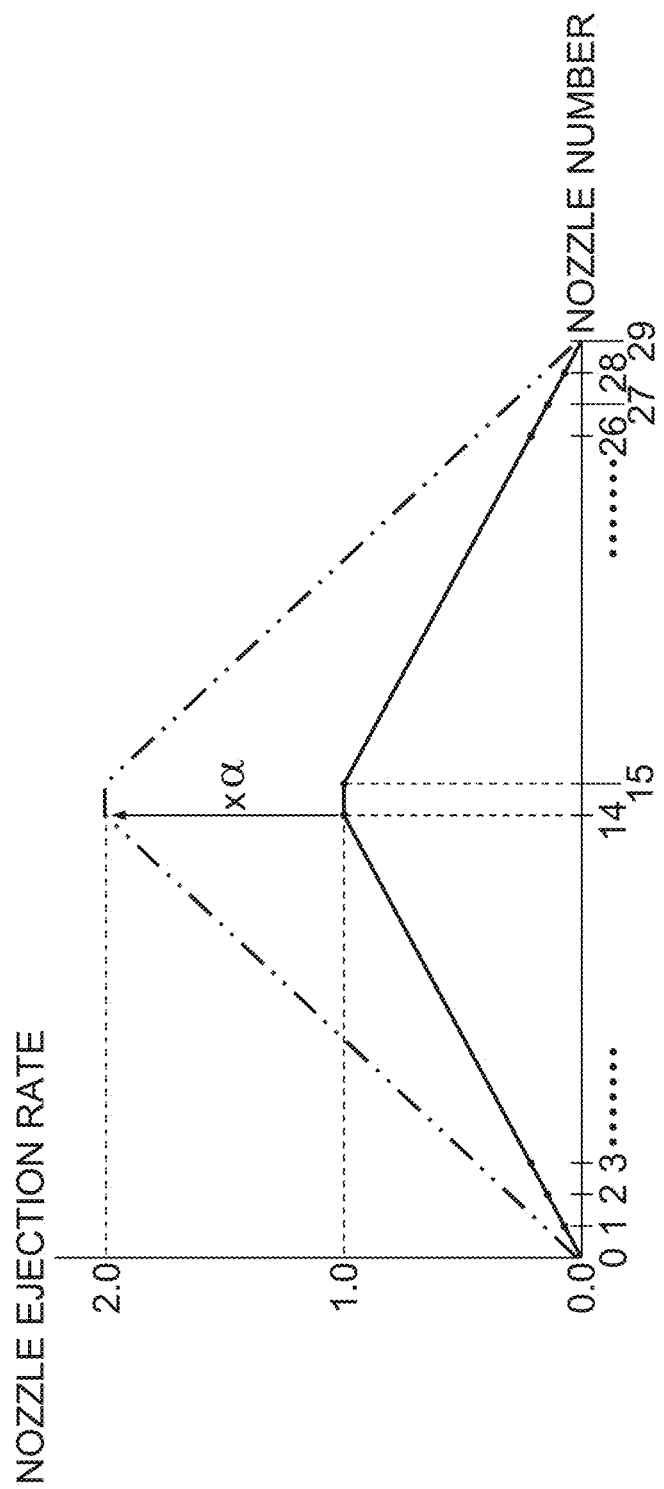
FIG. 14 is an explanatory diagram for explaining a corrected nozzle ejection rate.

FIG. 14 is an explanatory diagram for explaining the nozzle ejection rate corrected by the correction value α. As illustrated in FIG. 14, since the correction value α becomes larger than 1 (it is α=1 only in the case of L0=L1= ... =1), there is a possibility that the corrected nozzle ejection rate becomes greater than 1. At the time, in the case that the value for which the gradation values of the individual pixels of the image data are multiplied with the nozzle ejection rate after the correction becomes 100% (255 in the case of the image data of eight bits) or greater, the gradation value after the conversion may be turned to 100%.

[Explanation of Generation Method of Dither Mask Used in Halftone Processing]

In the present embodiment, the ejection rate reflecting image data 340 is generated by converting the pixel values reflecting the nozzle ejection rates of the respectively corresponding individual nozzles on the individual pixel values of the image data 332. Then, the image processing method of obtaining the dot data by executing the halftone processing with the ejection rate reflecting image data 340 as an input image is adopted.

A conventionally known general dither mask outputs the dot arrangement of a uniform dot density for a uniform input value, and thresholds of the individual pixels of the dither mask are determined so that graininess becomes excellent in a state that the dot density is uniform.

Therefore, in the state of the non-uniform dot density by the non-uniform input value reflecting the nozzle ejection rate, the graininess is deteriorated. That is, the graininess is deteriorated in the dot arrangement image of the non-uniform dot density obtained by executing the halftone processing using the conventional dither mask to the ejection rate reflecting image data 340 which is the non-uniform image reflecting the nozzle ejection rate.

Then, to cope with such a problem, in the present embodiment, the dither mask that outputs the dot arrangement for making the graininess be excellent for the non-uniform input value reflecting the nozzle ejection rate is used. Hereinafter, the generation method of the dither mask is described.

Figure 15:
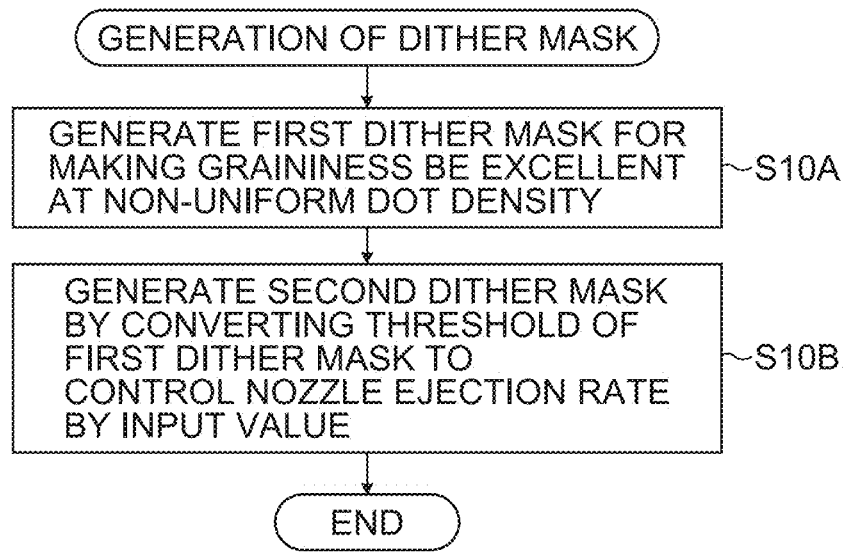
FIG. 15 is a flowchart illustrating a procedure of a generation method of a dither mask.

FIG. 15 is a flowchart illustrating a generation procedure of the dither mask. A generation process of the dither mask used in the halftone processing in the present embodiment includes the following two steps.

A first step is a process of generating the first dither mask 350 for making the graininess be excellent at the non-uniform dot density (step S10A). In the conventional general generation method of the dither mask, the dither mask is generated so that the graininess becomes excellent in the dot arrangement of the uniform dot density. In contrast, in the present embodiment, since the dot arrangement corresponding to the image reflecting the nozzle ejection rate becomes the dot arrangement of the non-uniform dot density, the first dither mask 350 is generated so that the graininess becomes excellent at the non-uniform dot density. A specific method of generating the first dither mask 350 is described later.

A second step is a process of generating the second dither mask 352 by converting the threshold of the first dither mask 350 so as to control the nozzle ejection rate by the input value inputted to the halftone processing (step S10B).

The first dither mask 350 generated in the first step (step S10A) outputs the dot arrangement of the non-uniform dot density reflecting the nozzle ejection rate for the uniform input value. That is, the first dither mask 350 generates the dot arrangement of the dot density different depending on a location (depending on the position of the pixel) for the same input value. For the first dither mask 350, since the different dot densities, that is, different densities, are reproduced for the same input value, an output density cannot be controlled by the input value, and it is not always preferable as a function of dither (halftone) processing.

Desirably, it is preferable for the dither mask to generate the dot arrangement of the same dot density for the same input value, and to function so that the graininess in the state close to a ratio of a target dot density reflecting the nozzle ejection rate becomes excellent.

By using such a dither mask, the density can be controlled by the input value, and control can be performed to the state close to the ratio of the target dot density and of the excellent graininess by the input value.

As the dither mask, it is demanded to be the one that makes the graininess be excellent in the state of the ratio of the target dot density, and to be able to generate the dot arrangement of various dot densities (that is, various densities) using the dither mask.

That is, there may be various kinds of the input image to be the target of the halftone processing. Also, the relation between the nozzles and the individual pixels of the dither mask is not always fixed. When the cycle of the scanning pattern does not always coincide with a mask size, or, when so-called "mask shifting" is performed even when the cycle of the scanning pattern coincides with the mask size, the relation between the nozzles and the individual pixels of the dither mask becomes non-fixed.

In short, the relation between the individual pixels of the dither mask and the nozzles does not become one-to-one relation, and becomes the relation that the plurality of nozzles are made to correspond to one pixel in the dither mask, and the nozzle ejection rate to the individual pixels of the dither mask is not always fixed.

Therefore, it is desirable that the configuration is such that the target dot density (nozzle ejection rate) can be controlled by the input value. "Controlling the target dot density (nozzle ejection rate) by the input value" means obtaining the dot arrangement of the dot density corresponding to the nozzle ejection rate by reflecting the nozzle ejection rate on the input value and subjecting the input value reflecting the nozzle ejection rate to the halftone processing.

Then, to control the nozzle ejection rate by the input value, that is, to output the uniform dot arrangement corresponding to the input value for the uniform input value, it is needed to convert the first dither mask 350.

The second step (step S10B) is a process of converting the threshold of the first dither mask 350, and generating the second dither mask 352 that outputs the uniform dot arrangement for the uniform input value.

Hereinafter, for the respective processes of the first step (step S10A) and the second step (step S10B), specific examples are described.

[First Example of Processing of Generating First Dither Mask 350]

Figure 16:
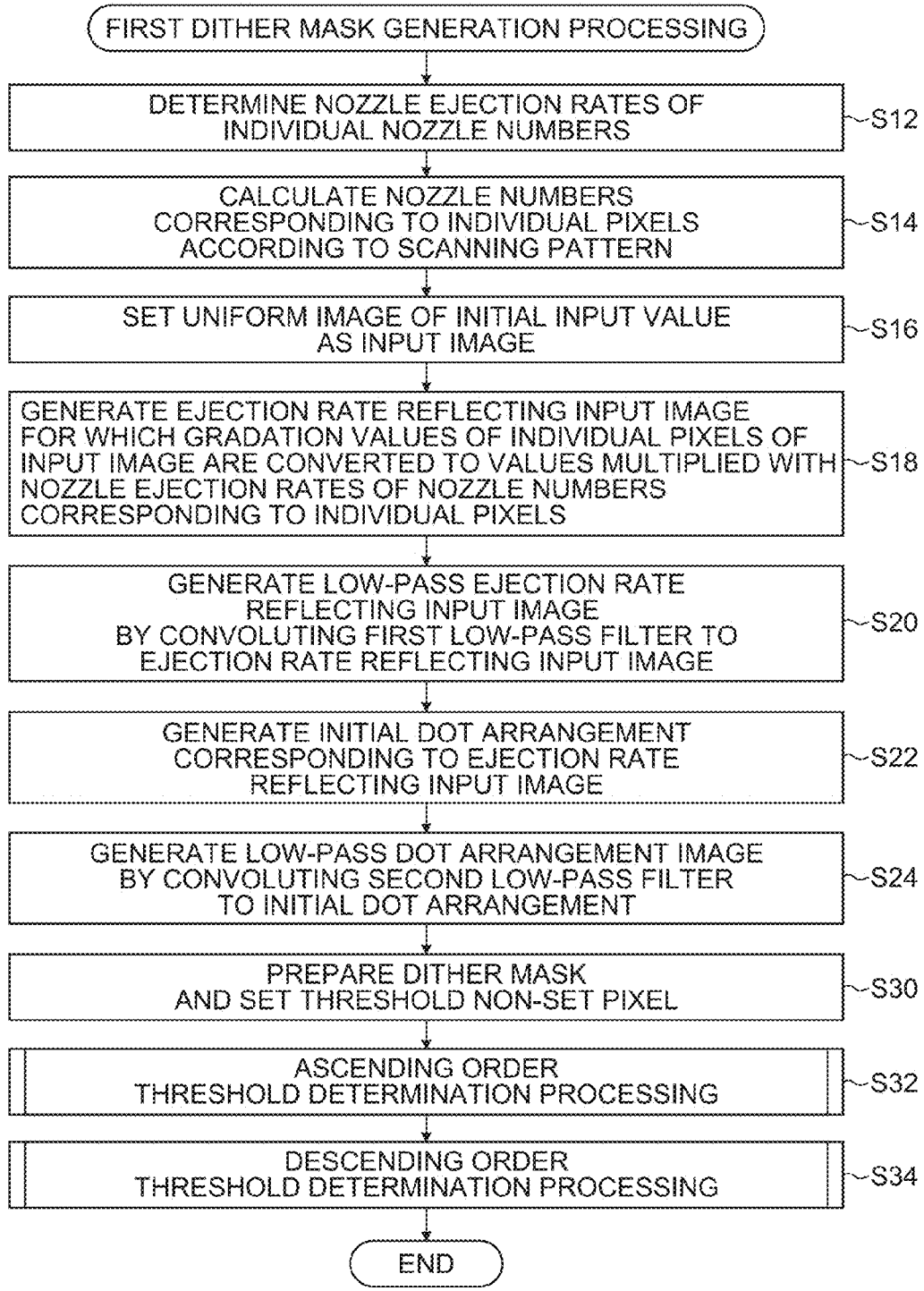
FIG. 16 is a flowchart illustrating a first example of processing of generating a first dither mask.

FIG. 16 is a flowchart illustrating a first example of the processing of generating the first dither mask. First, the nozzle ejection rates of the individual nozzle numbers in the recording head are determined (step S12). The nozzle ejection rate determined in step S12 corresponds to "second nozzle ejection rate".

Figure 17:
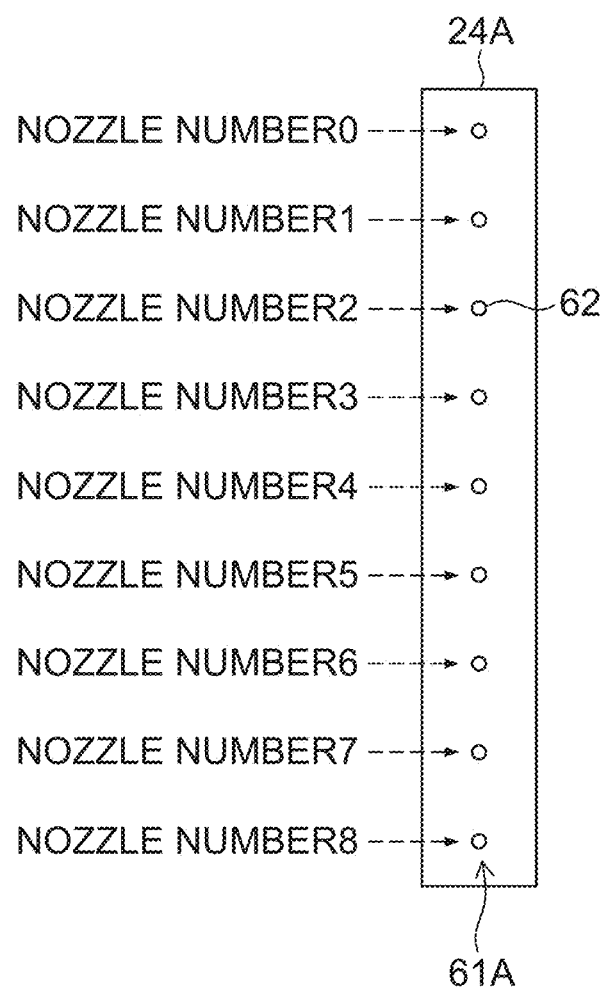
FIG. 17 is a schematic diagram of the recording head.

Here, to simplify the description, the number of the nozzles in the recording head is reduced, and a recording head 24A for which the number of the nozzles is "9" as illustrated in FIG. 17 is described as an example. The recording head 24A has a nozzle array 61A in which nine pieces of nozzles 62 are arranged in one line at equal intervals in the sub scanning direction. From the nozzle 62 at an upper end in FIG. 17 which is one end of the nozzle array 61A to a lower end in FIG. 17 which is the other end, respectively intrinsic nozzle numbers 0, 1, 2 . . . 8 are imparted in an order to the individual nozzles 62. The nozzle array density of the nozzle array 61A can be variously designed, and is assumed to be 200 npi, for example.

Figures 18, 19:
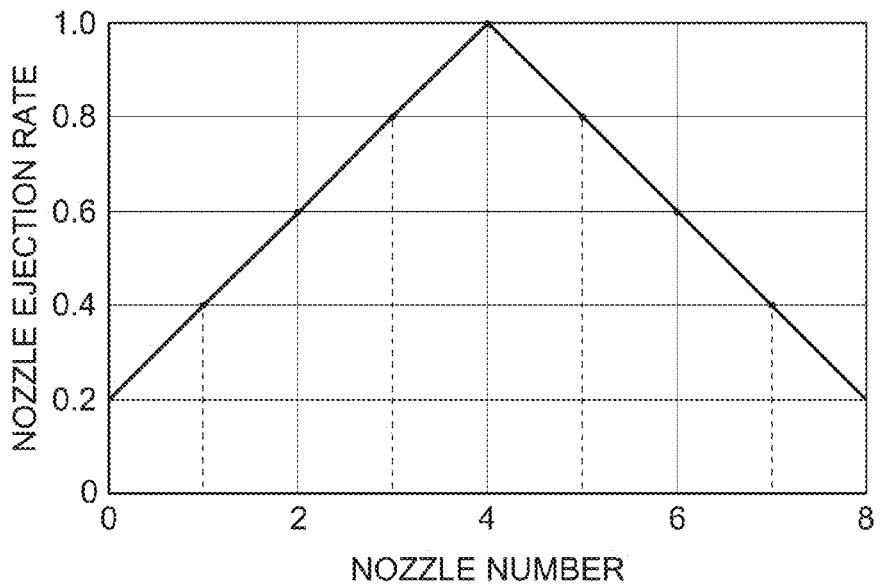
FIG. 18 is a graph illustrating a setting example of a second nozzle ejection rate.
FIG. 19 is an explanatory diagram illustrating one example of the nozzle pattern.

FIG. 18 is a graph illustrating a setting example of the nozzle ejection rate. A horizontal axis indicates the nozzle number, and a vertical axis indicates the nozzle ejection rate. The nozzle ejection rates of the individual nozzles 62 in the nozzle array 61A of the recording head 24A illustrated in FIG. 17 can be set as in FIG. 18.

Next, the nozzle numbers corresponding to the individual pixels of the dither mask are determined (step S14 in FIG. 16) according to the scanning pattern when the image recording by the inkjet recording device 10 is performed, for an image area (that is, a mask area) having a pixel array with the number of pixels equal to a mask size of the dither mask. A process of step S14 can be recognized as a corresponding nozzle specifying process.

The nozzle numbers corresponding to the individual pixels mean the nozzle numbers of the nozzles in charge of the recording of the individual pixels. The process of step S14 corresponds to determining the respectively corresponding nozzle numbers for the individual pixels of the dither mask.

In the case that m and n are natural numbers respectively and the dither mask which is a generation target is a matrix of m rows×n columns, the respectively corresponding nozzle numbers are determined for the individual pixels of the image area formed by a two-dimensional pixel array of m rows×n columns. A pattern of the nozzle numbers in which the corresponding nozzle numbers are determined for the individual pixels of the dither mask is called a nozzle pattern of the dither mask.

FIG. 19 illustrates one example of the nozzle pattern of the dither mask. In FIG. 19, an example of the mask size of 18 rows×18 columns is illustrated, and to the individual pixels, the respectively corresponding nozzle numbers are written.

The nozzle pattern illustrated in FIG. 19 illustrates the nozzle numbers corresponding to the individual pixels of the dither mask in the scanning pattern in the case of performing intermittent feed of relatively moving, by nine pixels each in the sub scanning direction, the nozzle array 61A (see FIG. 17) for which the nozzle pitch is two pixels and the number of the nozzles is nine, and scanning a scanning line of one line in the main scanning direction by the single (the same one) nozzle. For example, the pixel to which the nozzle number 0 is entered in FIG. 19 is the pixel for which the nozzle of the nozzle number 0 is in charge of the recording, and indicates the recording attending pixel of the nozzle of the nozzle number 0. That is, the nozzle pattern indicates the recording attending pixel for each nozzle number.

The nozzle pitch being two pixels means that the nozzle pitch corresponds to a distance for two pixels in the sub scanning direction, with the size of one pixel determined from the recording resolution during printing as a unit. For example, the nozzle array density 200 npi of the recording head 24A described in FIG. 17 corresponds to 200 dpi in terms of a dot recording density (resolution). That is, in this example, the recording resolution assumed during printing is 400 dpi, and the nozzle pitch of the nozzle array 61A of 200 npi corresponds to two pixels with the size of the pixel of 400 dpi as a unit.

Figure 20:
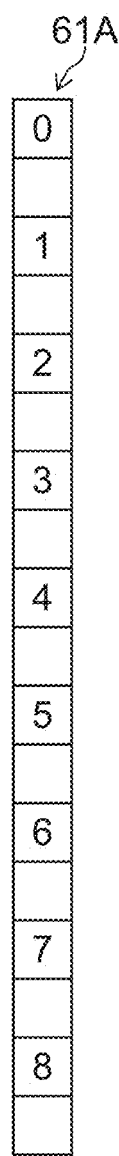
FIG. 20 is an explanatory diagram for explaining a description method of a nozzle array.

Here, in order to easily understandably illustrate the relation between the positions of the individual nozzles 62 configuring the nozzle array 61A and the positions of the individual pixels of the dither matrix, a describing method as illustrated in FIG. 20 is introduced regarding the description of the nozzle array. In FIG. 20, the nozzle array 61A is sectioned into cells of a pixel unit, and numbers 0-8 indicating the nozzle numbers are described inside the cells. The positions of the cells to which the nozzle numbers are attached indicate the positions of the nozzles. That is, the description of the nozzle array 61A illustrated in FIG. 20 is to replace the description of the recording head 24A illustrated in FIG. 17.

Figure 21:
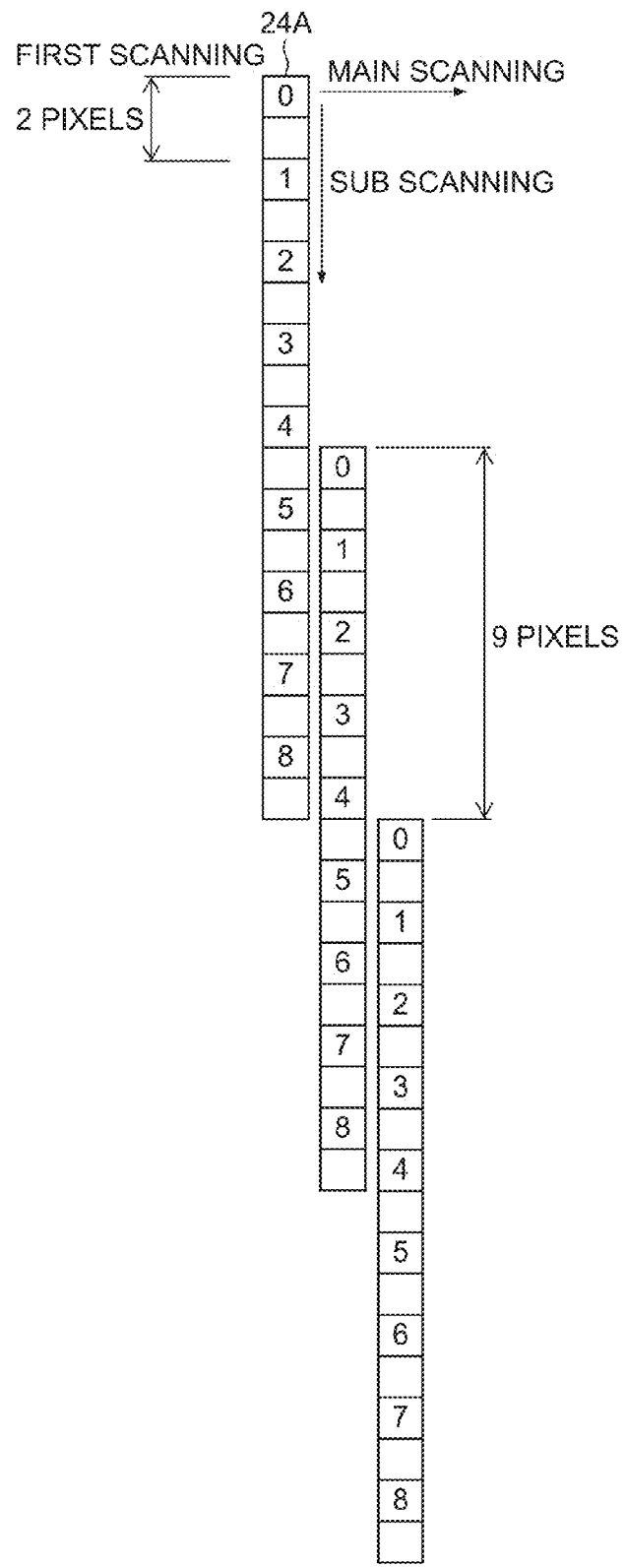
FIG. 21 is an explanatory diagram illustrating a specific example of a multipath type drawing method.

FIG. 21 illustrates a situation of the intermittent feed of relative movement by nine pixels each in the sub scanning direction every time the print path in the main scanning direction is executed once. For the convenience of the illustration, similarly to FIG. 6, FIG. 21 is illustrated assuming that the recording head 24A is moved in the sub scanning direction to the stopped recording medium.

In an image drawing method illustrated in FIG. 21, the recording of 400 dpi is completed by one path for a main scanning line which is a deposition point line in the main scanning direction, and the recording of 400 dpi is completed by two paths for a sub scanning line which is a deposition point line in the sub scanning direction. A paper feed amount in the sub scanning direction is nine pixels. The nozzle pattern of the image drawing method of repeating such scanning is illustrated in FIG. 19.

After step S14 in FIG. 16, a uniform image of an initial input value is set as the input image next (step S16 in FIG. 16). The uniform image of the initial input value can be the uniform image for which the gradation value of about 50% in the case that the maximum gradation is 100% is the initial input value. Here, in order to simplify the description, a range of the gradation values is defined as 0 to 100. As an initial input value $I_0$ which is the gradation value of 50% to the maximum gradation 100, "50" is set. However, the range of the gradation values and a specific numerical value of the initial input value are not limited to the example. For example, in the case of the image data of 8-bit gradation for which the range of the gradation values is 0 to 255, one example of the initial input value is "126" or the like.

Next, an ejection rate reflecting input image for which the gradation values of the individual pixels of the input image set in step S16 are converted to values multiplied with the nozzle ejection rates of the nozzle numbers corresponding to the individual pixels is generated (step S18). The process of step S18 can be recognized as a gradation conversion process. The ejection rate reflecting input image generated in step S18 can be understood as the input image reflecting the nozzle ejection rate.

Figure 22:
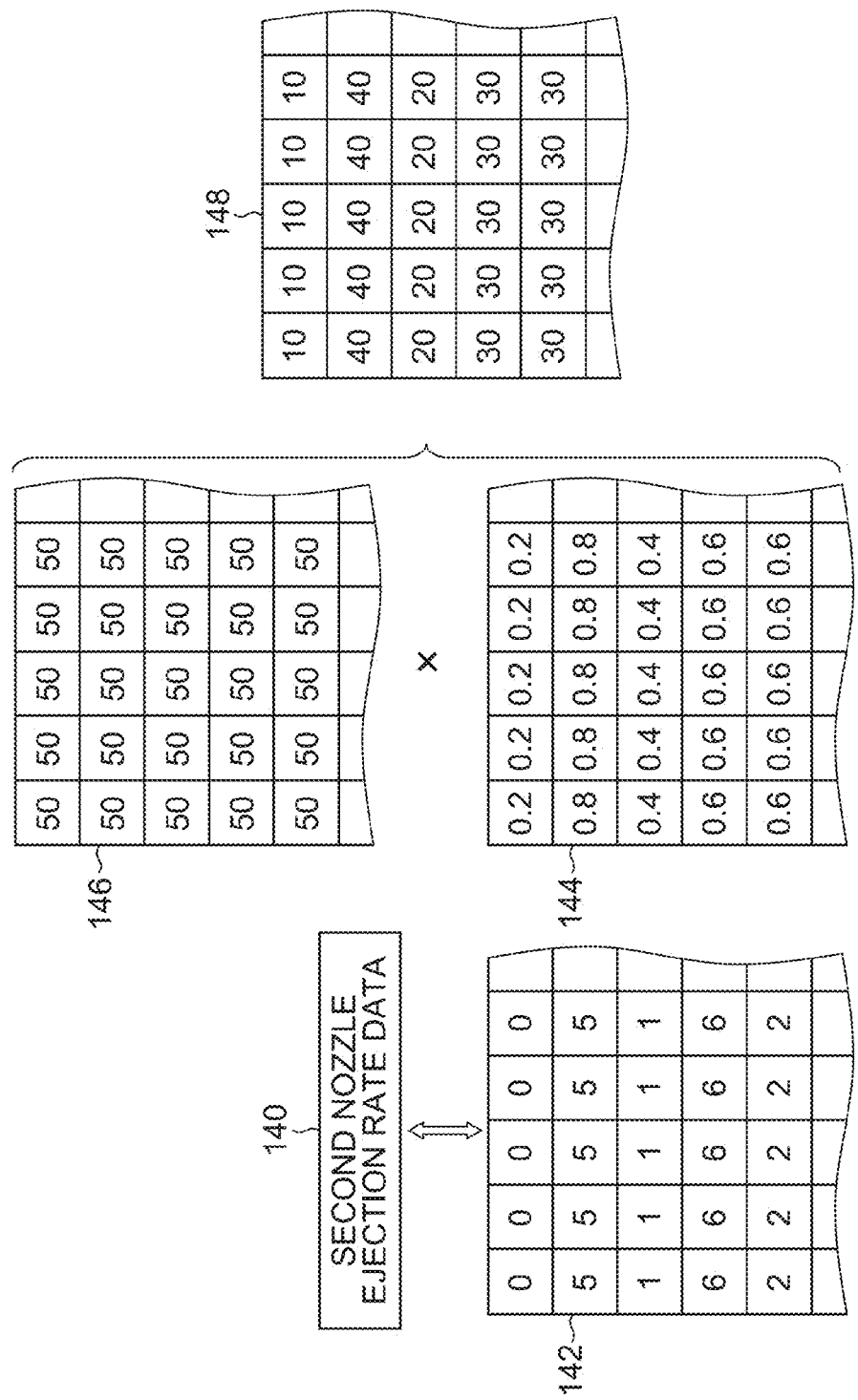
FIG. 22 is a conceptual diagram schematically illustrating the content of the generation processing of the ejection rate reflecting input image.

FIG. 22 is a conceptual diagram schematically illustrating content of the generation processing of the ejection rate reflecting input image. Second nozzle ejection rate data 140 in FIG. 22 corresponds to data determining the nozzle ejection rates of the individual nozzles described in FIG. 18 for example.

A nozzle pattern 142 in FIG. 22 corresponds to the nozzle pattern described in FIG. 19. By referring to the second nozzle ejection rate data 140 for the individual nozzle numbers in the nozzle pattern 142, an ejection rate pattern 144 indicating the relation between the individual pixels of the dither mask and the nozzle ejection rates of the nozzle numbers corresponding to the individual pixels is obtained.

The individual cells to which numbers are attached in the ejection rate pattern 144 indicate the individual pixels of the dither mask, and the numbers inside the cells indicate the nozzle ejection rates of the nozzle numbers in charge of the recording of the pertinent pixel. On the basis of the ejection rate pattern 144, the nozzle ejection rate for each pixel is determined.

An input image 146 of the uniform gradation illustrated in FIG. 22 is the uniform image whose initial input value is "50". By multiplying each of the gradation values of the individual pixels in the input image 146 with the nozzle ejection rates corresponding to the individual pixels and converting the pixel values of the input image 146, an ejection rate reflecting input image 148 is generated.

As one example, since the nozzle ejection rate of the nozzle number 0 is "0.2", the gradation value of the pixel corresponding to the nozzle of the nozzle number 0 is converted from "50" to "10" by the multiplication of 50×0.2. The pixel values are converted similarly for all the pixels.

A low-pass ejection rate reflecting input image is generated by convoluting a first low-pass filter to the ejection rate reflecting input image 148 obtained in this way (step S20 in FIG. 16). The process of step S20 can be recognized as a first low-pass filter processing process.

The first low-pass filter can be any low-pass filter, but a low-pass filter suited to a human visual characteristic is preferable. As the first low-pass filter, a visual transfer function (VTF) which is a function indicating a human visual characteristic is well known. Also, as the first low-pass filter, a filter of a Gaussian function can be also used.

For the visual transfer function, while a graph function for which a horizontal axis indicates a frequency and a vertical axis indicates a response is known, the frequency characteristic (that is, a filter in a frequency space) can be replaced with a spatial filter in a real space. An operation of multiplying f(fx, fy) of the visual transfer function in the frequency space is processing mathematically equivalent to convoluting a spatial filter F(x,y) on the real space. It is similar for the Gaussian function, and a "multiplying" operation in one of the frequency space and the real space is equivalent to convolution in the other space, and an expression of "multiplying" is used including both meanings.

Next, an initial dot arrangement corresponding to the ejection rate reflecting input image is generated (step S22 in FIG. 16). The initial dot arrangement is obtained by executing the halftone processing such as a known dither method, an error diffusion method or a direct binary search (DBS) method to the ejection rate reflecting input image. Here, it is desirable that the initial dot arrangement is continuous at a boundary of the individual arrangements in the case of being arranged in the same size and by the same arrangement method as the first dither mask. Therefore, it is desirable that the size and the arrangement method of the dither mask in the dither method or the dot arrangement in the DBS method for generating the initial dot arrangement for example are the same as the first dither mask. The process of step S22 can be recognized as a first dot arrangement generation process.

Next, a low-pass dot arrangement image is generated by convoluting a second low-pass filter to the initial dot arrangement (step S24). The process of step S24 can be recognized as a second low-pass filter processing process.

The second low-pass filter can be any low-pass filter, but a low-pass filter suited to the human visual characteristic is preferable. As the second low-pass filter, a filter of the visual transfer function or a filter of the Gaussian function can be used, similarly to the first low-pass filter.

The first low-pass filter and the second low-pass filter do not always coincide. While the first low-pass filter is a low-pass filter corresponding to the gradation value "1" of the input image, the second low-pass filter is a low-pass filter corresponding to one dot, and is a filter reflecting at least one characteristic among the density of the dot, the diameter of the dot and the shape of the dot or the like.

Next, the dither mask is prepared, and a threshold non-set pixel is set (step S30). The mask size of the dither mask is turned to an integer multiple of the repetition cycle in the main scanning direction and the sub scanning direction of the nozzle numbers by the scanning pattern. In the case of the scanning pattern described in FIG. 19, the repetition cycle of the nozzle numbers in the main scanning direction is one pixel, and the repetition cycle of the nozzle numbers in the sub scanning direction is "nine pixels". Therefore, the mask size of the dither mask is turned to the integer multiple of one pixel for the main scanning direction, and the integer multiple of nine pixels for the sub scanning direction. In this example, as one example of the mask size that satisfies such a condition, the dither mask of 18 rows×18 columns is illustrated. The threshold non-set pixel means a pixel to which the threshold is not set.

The threshold non-set pixel of the dither mask is the pixel without a dot in the case that the threshold setting is in an ascending order, and is the pixel with a dot in the case that the threshold setting is in a descending order. "Ascending order" is a procedure of setting the threshold from a threshold of a small value and successively setting the threshold of a large value. "Descending order" is a procedure of setting the threshold from a threshold of the large value and successively setting the threshold of the small value.

In the case of this example, ascending order threshold determination processing (step S32 in FIG. 16) of starting from the initial dot arrangement corresponding to the initial input value (for example, 50% gradation) and setting a larger threshold gradually in the ascending order while gradually increasing the dots, and descending order threshold determination processing (step S34) of setting a smaller threshold gradually in the descending order from the initial dot arrangement while gradually removing the dots are included.

An order of the ascending order threshold determination processing (step S32) and the descending order threshold determination processing (step S34) can be switched around.

Figure 23:
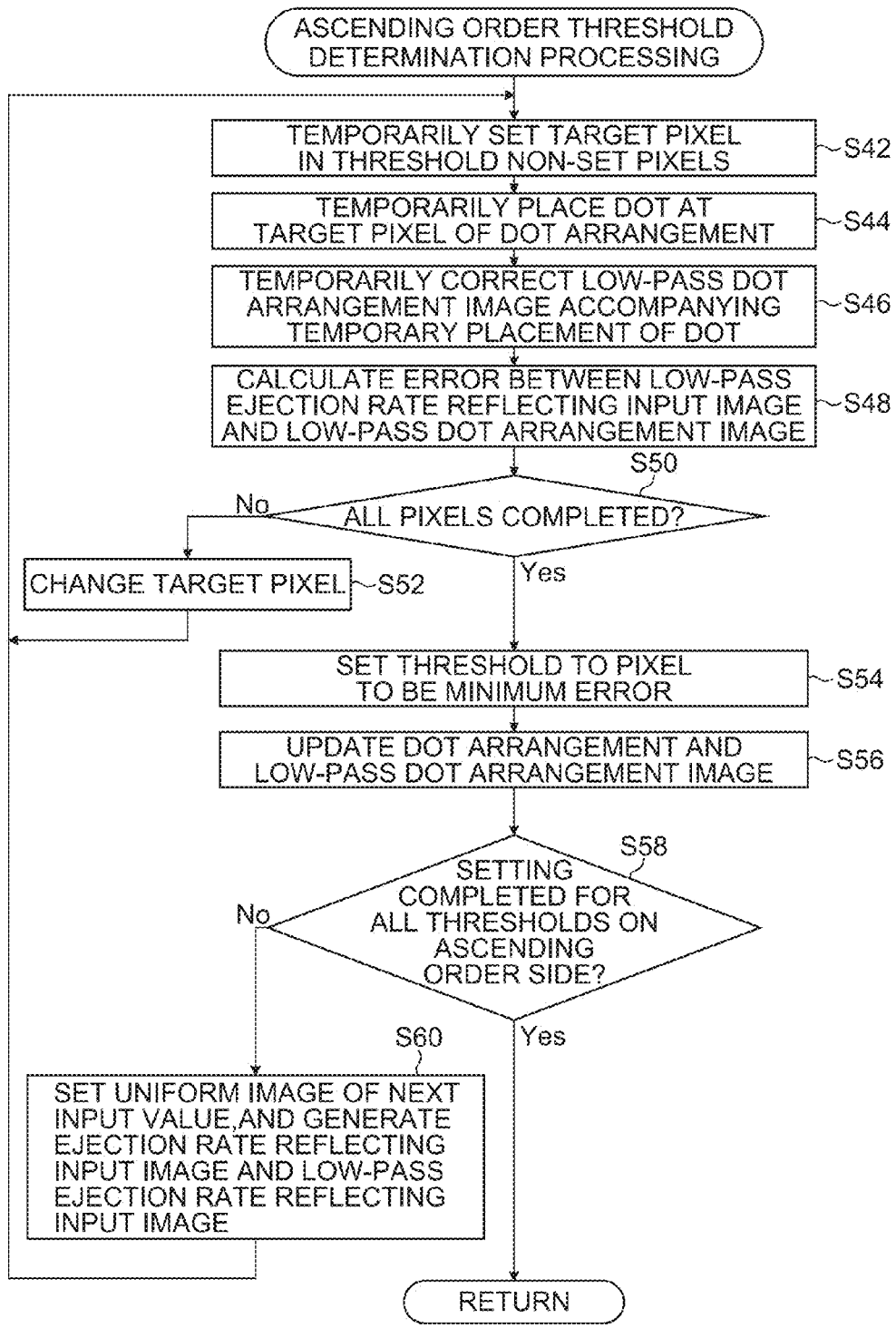
FIG. 23 is a flowchart of ascending order threshold determination processing.

FIG. 23 is a flowchart of the ascending order threshold determination processing. First, a target pixel is temporarily set in the threshold non-set pixels (step S42). Then, a dot is temporarily placed at a pixel position corresponding to the target pixel in the dot arrangement (step S44). The process of step S44 is called "temporary placement of dot". Accompanying the temporary placement of the dot, the low-pass dot arrangement image is temporarily corrected (step S46). Temporary correction in step S46 is processing of temporarily adding the second low-pass filter to the pixel corresponding to the target pixel in the low-pass dot arrangement image.

Here, for the dot arrangement and the low-pass dot arrangement, since the arrangement of the same size as the dither mask is repeatedly and adjacently arranged by the same arrangement method as the dither mask, adding the low-pass filter to the pixel corresponding to the target pixel means adding the low-pass filter to the pixel corresponding to the target pixel in all the adjacent arrangements. In the present embodiment, the processing of adding or removing the low-pass filter to/from the low-pass dot arrangement image and convoluting the low-pass filter to the dot arrangement indicates the processing on the assumption that the dot arrangement and low-pass dot arrangement images are repeatedly and adjacently arranged in the same size and by the same arrangement method as the dither mask, in this way.

Next, an error between the low-pass ejection rate reflecting input image and the low-pass dot arrangement image after the temporary correction is calculated (step S48).

As an evaluation index of the error between the low-pass ejection rate reflecting input image and the low-pass dot arrangement image, various indexes are possible. The index of the error may be, for example, a sum of squares or diffusion of a difference between the low-pass ejection rate reflecting input image and the low-pass dot arrangement image, or a square root of the sum of squares or a standard deviation.

As another evaluation index, the index of the error can be the sum of squares or diffusion of a value for which the individual pixel values of the low-pass dot arrangement image are divided by the individual pixel values of the low-pass ejection rate reflecting input image, or the square root of the sum of squares or the standard deviation. Also, on the contrary, it can be the sum of squares or diffusion of a value for which the individual pixel values of the low-pass ejection rate reflecting input image are divided by the individual pixel values of the low-pass dot arrangement image, or the square root of the sum of squares or the standard deviation. As the index of the error, in the case of including an operation of division by the individual pixel values of the low-pass ejection rate reflecting input image or the low-pass dot arrangement image, in order to prevent the division of the denominator "0", it is desirable to add a minute value (for example, "1") to an original image to be a divisor.

As a further example of the index of the error, the index that evaluates similarity of both images, such as a value for which the individual pixel values of the low-pass dot arrangement image and the individual pixel values of the low-pass ejection rate reflecting input image are multiplied and summed up or a cross-correlation value of the low-pass dot arrangement image and the low-pass ejection rate reflecting input image, may be the index of the error.

A combination of the process of step S48 of calculating the error which is the evaluation index reflecting the nozzle ejection rate and the process of steps S18 to S24 in FIG. 16 required for the processing of step S48 can be recognized as a nozzle ejection rate reflecting processing process.

Next, for all the pixels of the threshold non-set pixels, whether or not the processing of step S42 to step S48 is completed is determined (step S50). When it is not completed in step S50, the target pixel is changed (step S52), and the process returns to step S42.

The target pixel is successively changed, the processing of step S42 to step S48 is repeatedly executed, and when it is Yes determination in step S50, the process advances to step S54. In step S54, the threshold is set to the pixel for which the error between the low-pass ejection rate reflecting input image and the low-pass dot arrangement image becomes minimum. In the case of using the sum of squares or diffusion of the difference or the divided value or the square root of the sum of squares or the standard deviation as the index of the error, it is determined that the error is minimum in the case that an evaluation value to be the index is minimum.

On the other hand, in the case of using the index that evaluates the similarity of both images, such as the value for which the individual pixel values of the low-pass dot arrangement image and the individual pixel values of the low-pass ejection rate reflecting input image are multiplied and summed up or the cross-correlation value of the low-pass dot arrangement image and the low-pass ejection rate reflecting input image, as the index of the error, it is determined that the error is minimum in the case that the evaluation value indicating the similarity is maximum, that is, in the case that the similarity is highest. The process of step S54 can be recognized as a threshold setting process.

Then, a dot is placed at a position corresponding to the pixel to which the threshold is set in step S54, and the dot arrangement and the low-pass dot arrangement image are updated (step S56).

In step S58, whether or not the setting of the entire thresholds on an ascending order side is completed is determined. In the case of No determination in step S58, the process advances to step S60. In step S60, the uniform image of the next input value is set, and the ejection rate reflecting input image and the low-pass ejection rate reflecting input image are generated.

The initial input value set in step S16 and "next input value" in step S60 are determined as follows. That is, in step S48, the low-pass ejection rate reflecting input image and the low-pass dot arrangement image corresponding to it are compared to evaluate the error (similarity) between both, so that it is desirable that an average value of the pixel values in the low-pass ejection rate reflecting input image and an average value of the pixel values in the low-pass dot arrangement image corresponding to the low-pass ejection rate reflecting input image coincide or roughly coincide, when the error between both images is evaluated. "Rough coincidence" includes a range in which a difference between both is so small as not to be a problem practically for the evaluation of the error between the images and handling as the coincident ones is allowable. When the average values of both images are quite different from each other, since the error between both images cannot be appropriately evaluated, it is desirable that both are made to coincide or roughly coincide at a level of the average values.

Therefore, in step S60, according to increase of the dots accompanying the setting of the threshold in step S54, the input value of the low-pass ejection rate reflecting input image to be compared when the next threshold is determined is increased. For that, an increment of the input value corresponding to increase of one dot in step S56 is obtained beforehand, and in step S60, the input value is changed with the increment as a unit.

The increment of the input value corresponding to the increase of one dot is defined as $\Delta I$, the ejection rate reflecting input image converted to the value for which the gradation values ($\Delta I$) of the individual pixels in the uniform image of the gradation value $\Delta I$ are multiplied with the nozzle ejection rates of the nozzle numbers corresponding to the individual pixels is generated, and the low-pass ejection rate reflecting input image for which the first low-pass filter is convoluted to it is generated. Then, $\Delta I$ is determined such that the average value of the low-pass ejection rate reflecting input image coincides with the average value of the second low-pass filter corresponding to one dot.

Also, as another method, without generating the low-pass ejection rate reflecting input image from the uniform image of $\Delta I$, $\Delta I$ may be determined such that the value that is the total sum of the entire pixels of the values for which the gradation values of the individual pixels of the ejection rate reflecting input image are multiplied with the average value of the first low-pass filter corresponding to the gradation value I coincides with the average value of the second low-pass filter corresponding to one dot.

Figure 24:
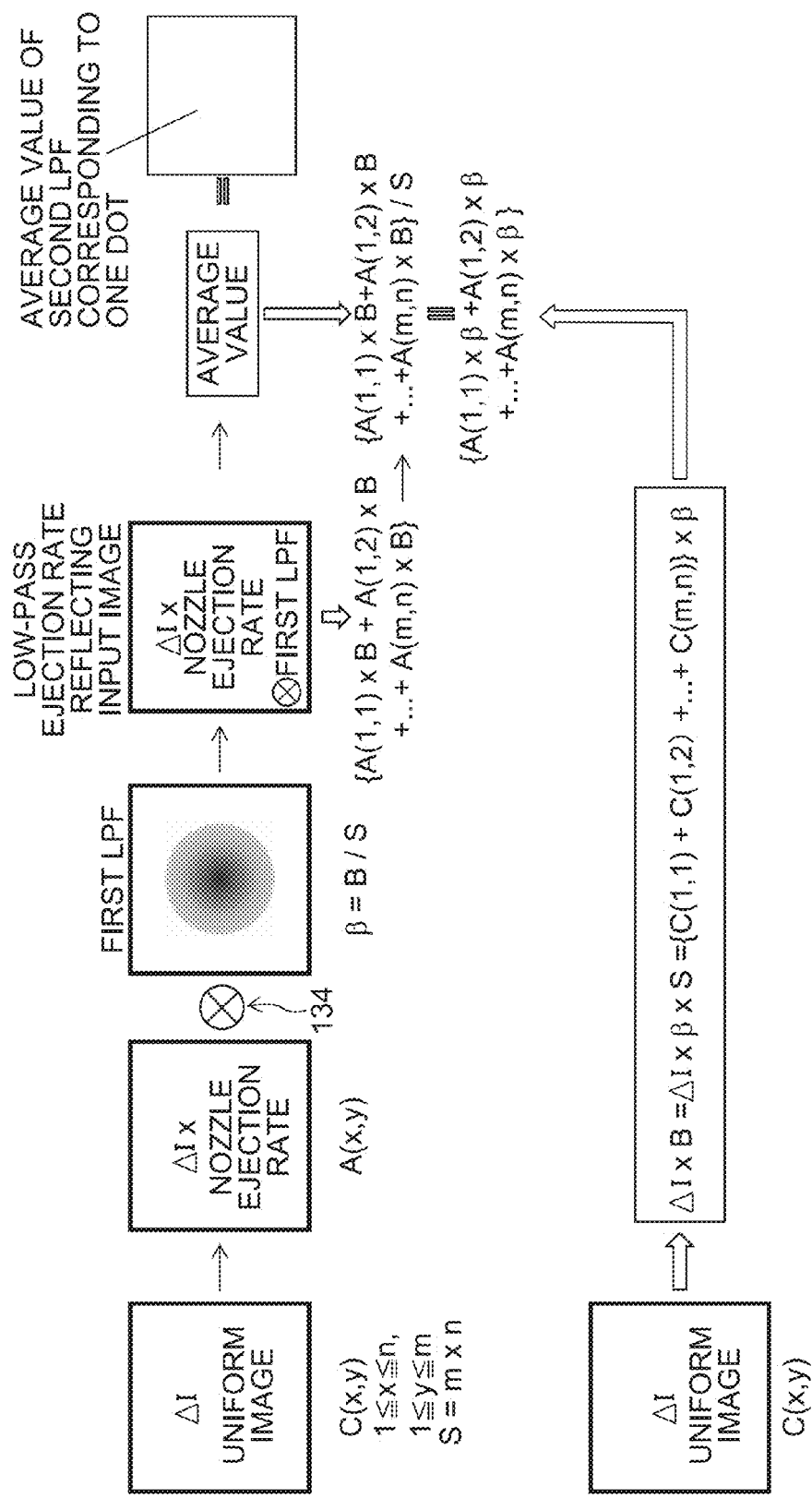
FIG. 24 is an explanatory diagram for explaining a method of obtaining an increment of an input value for one dot to be a unit of increase and decrease when changing the input value.

An outline of the method of obtaining $\Delta I$ is given using an explanatory diagram in FIG. 24. Here, the pixel value of the uniform image of the gradation value $\Delta I$ is indicated by $C(x,y)$. Reference characters x and y designate the position of the pixel. The pixel value of the ejection rate reflecting input image for which the uniform image is multiplied with the nozzle ejection rates of the nozzle numbers corresponding to the individual pixels is indicated by $A(x,y)$. The total sum of coefficients that are components of the individual cells of the first low-pass filter itself is indicated by B. In the drawings such as FIG. 24 and the like, for the simplification of the description, a simple notation of "LPF" is used as a substituting notation substituting the description of "low-pass filter". The LPF is an abbreviation notation of "low-pass filter". A symbol indicated by a sign 134 in FIG. 24 indicates that a convolution operation is to be performed.

Also, the mask size of the dither mask is indicated by S. Reference characters B and S respectively designate positive integers. The mask size in the case of assuming the dither mask of m rows×n columns is S=m×n. Reference characters m and n respectively designate positive integers. Further, the average value per pixel of the first low-pass filter itself corresponding to the gradation value 1 is defined as $\beta$=B/S.

When the first low-pass filter is applied to a certain pixel $(x,y)$ of the ejection rate reflecting input image $A(x,y)$, since the total of the pixel values increases by $A(x,y) \times B$ as the entire image, the total sum of the entire low-pass ejection rate reflecting input image obtained by convoluting the first low-pass filter to all the pixels of the ejection rate reflecting input image $A(x,y)$ is indicated by the following expression (5).

$$A(1,1) \times B + A(1,2) \times B + \ldots + A(m,n) \times B \qquad \text{Expression (5)}$$

Therefore, the average value per pixel of the increment is indicated by the following expression (6) by dividing the value of the expression (5) by the mask size S.

$$\{A(1,1) \times B + A(1,2) \times B + \ldots + A(m,n) \times B\}/S \qquad \text{Expression (6)}$$

On the other hand, since $\beta$=B/S, the average value indicated by the expression (6) can be indicated as the following expression (7).

$$A(1,1) \times \beta + A(1,2) \times \beta + \ldots + A(m,n) \times \beta \qquad \text{Expression (7)}$$

In order to make the value indicated by the expression (7) coincide with the average value of the second low-pass filter corresponding to one dot, $\Delta I$ is determined.

When $\Delta I$ is determined in this way, for an arbitrary dither mask threshold, the value for which the number of the dots generated by the threshold is multiplied with $\Delta I$ is determined as the input value.

In step S56, when the dots are added and the dot arrangement is updated, accordingly, as the next input value, $\Delta I$ is added to the input value, the uniform image is changed (step S60), and the ejection rate reflecting input image and the low-pass ejection rate reflecting input image are generated. In such a manner, the low-pass ejection rate reflecting input image and the low-pass dot arrangement image to be compared can be made to roughly coincide at the level of the average values.

In step S18 in FIG. 16 and step S60 in FIG. 23, by multiplying the gradation values of the individual pixels with the nozzle ejection rate (see FIG. 18), the values become smaller than the gradation values in the case of not multiplying the nozzle ejection rate. The nozzle ejection rate may be corrected so that, with the repetition cycle in the main scanning direction and the sub scanning direction of the nozzle numbers as the unit area, the average gradation value in the unit area does not change before multiplying and after multiplying the nozzle ejection rate, that is, the average gradation value per unit area becomes invariable before and after reflecting the nozzle ejection rate.

By not changing the average gradation value in the unit area before and after multiplying the nozzle ejection rate, calculation of ΔI described above can be further simplified. Specifically, as illustrated in a lower column of FIG. 24, ΔI is determined so that the value for which the value for which ΔI is multiplied with the average value β of the first low-pass filter corresponding to the gradation value 1 is further multiplied with the mask size S, or the value for which ΔI is multiplied with the total sum B of the first low-pass filter corresponding to the gradation value 1 coincides with the average value of the second low-pass filter corresponding to one dot.

Even when the nozzle ejection rate is reflected on ΔI, under the condition that the average value of ΔI per unit area does not change before and after that, the following expression (8) is satisfied.

$$\Delta I \times B = \Delta I \times \beta S = A(1,1) \times \beta + A(1,2) \times \beta + \ldots + A(m,n) \times \beta \quad \text{Expression (8)}$$

Therefore, in order to make this value coincide with the average value of the second low-pass filter corresponding to one dot, ΔI is determined.

The method of determining ΔI based on the average value per pixel of the coefficients that are the components of the individual cells of the first low-pass filter is described above, however, ΔI may be determined based on the total sum of the coefficients that are the components of the individual cells of the first low-pass filter. That is, ΔI may be determined so that the total sum of the entire low-pass ejection rate reflecting input image indicated by the expression (5) coincides with the total sum of the second low-pass filter corresponding to one dot, or, in the case of correcting the nozzle ejection rate so that the average gradation value in the unit area does not change before and after multiplying the nozzle ejection rate, ΔI may be determined so that the value indicated by the following expression (9) coincides with the total sum of the second low-pass filter corresponding to one dot.

$$\Delta I \times B \times S = A(1,1) \times B + A(1,2) \times B + \ldots + A(m,n) \times \beta \quad \text{Expression (9)}$$

The fact that the average gradation in the unit area does not change before and after multiplying the nozzle ejection rate means that there is the value of the nozzle ejection rate exceeding 1 by the correction of the nozzle ejection rate.

The nozzle ejection rate is corrected specifically as follows.

With the repetition cycle in the main scanning direction and the sub scanning direction of the individual nozzles 62 as the unit area, the area ratio of the pixel corresponding to the nozzle number 0 in the unit area is indicated as r0, the area ratio of the pixel corresponding to the nozzle number 1 is indicated as r1, and the area ratio of the pixel corresponding to the nozzle number k in the unit area is indicated as rk in the same manner. Reference character k is a parameter indicating the nozzle number. When the number of the nozzles configuring the nozzle array is K and the leading number of the nozzle number is 0, reference character k designates an integer of 0 to K−1 (k=0, 1, 2, ... K−1). Reference character K designates an integer equal to or larger than 2.

In the case of the example illustrated in FIG. 19, the unit area to be a unit of the repetition cycle of the scanning pattern is configured by nine pixels that are one pixel in the main scanning direction×nine pixels in the sub scanning direction that are lined in the order of the nozzle numbers 0, 5, 1, 6, 2, 7, 3, 8 and 4. The unit area to be the unit of the repetition cycle of the scanning pattern is called "scanning pattern unit area", and the pixel corresponding to the nozzle number k in the scanning pattern unit area is called "nozzle number k corresponding pixel". In this case, a gradation sum of the nozzle number k corresponding pixel becomes rk×I (k=0, 1, 2 ... K−1).

Then, when the nozzle ejection rate of the nozzle number k is defined as Lk, as a result, an average gradation in the scanning pattern unit area after multiplying the nozzle ejection rate becomes I×(r0×L0+r1×L1+ ... ).

In order to prevent the average gradation in the scanning pattern unit area from changing before and after multiplying nozzle ejection rate, the following expression (10) is satisfied, $$I = I \times (r0 \times L0 + r1 \times L1 + \ldots) \quad \text{Expression (10)}$$

that is, the nozzle ejection rates L0, L1 ... of the individual nozzles 62 are corrected so as to satisfy an expression (11).

$$r0 \times L0 + r1 \times L + \ldots = 1 \quad \text{Expression (11)}$$

The area ratio rk of the individual nozzles 62 normally satisfies the following expression (12).

$$r0 = r1 = r2 = \ldots = 1/K \quad \text{Expression (12)}$$

In the expression (12), reference character K designates the number of the nozzles configuring the nozzle array.

Therefore, the value of the second nozzle ejection rate is corrected by multiplying the nozzle ejection rates Lk (k=0, 1, 2, ... K−1) of the individual nozzles respectively with the correction value $\alpha_2 = K/(L0+L1+L2+ \ldots)$ so as to satisfy the following expression (13), $$L0+L1+L2+ \ldots = K \quad \text{Expression (13)}$$

without changing the rates of the nozzle ejection rates (L0, L1, L2 ... ) of the individual nozzles, based on the expression (11) and the expression (12).

Figure 25:
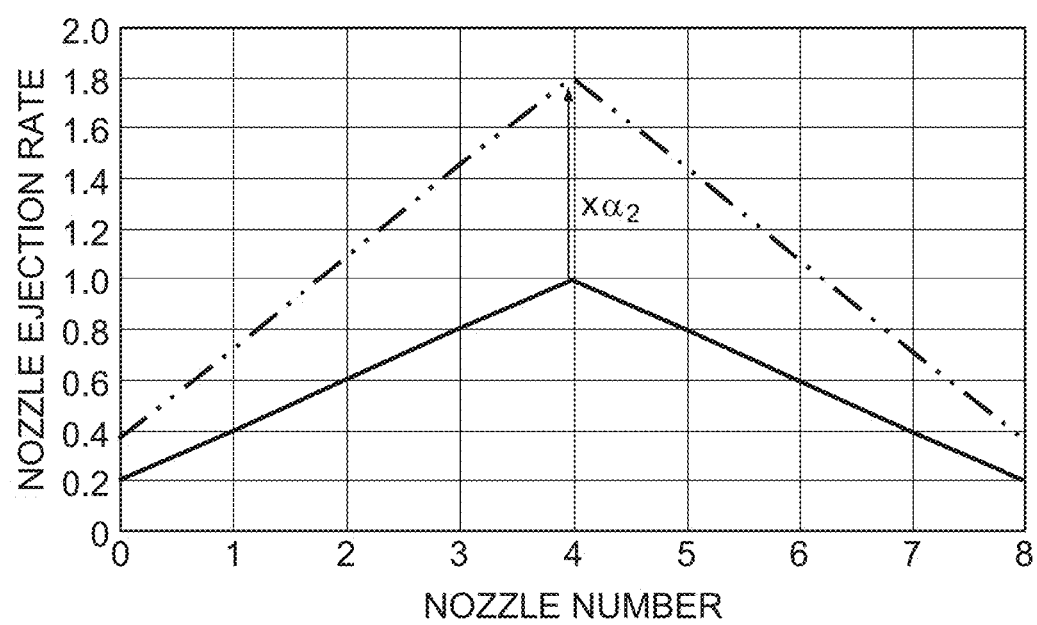
FIG. 25 is an explanatory diagram of the corrected nozzle ejection rate.

FIG. 25 is an explanatory diagram of the nozzle ejection rate corrected by multiplying the nozzle ejection rate described in FIG. 18 with the correction value $\alpha_2$. Since the correction value $\alpha_2$ becomes a value larger than 1, as illustrated in FIG. 25, there is a possibility that the nozzle ejection rate after the correction becomes greater than 1. In this case, in the case that the value for which the gradation values of the individual pixels of the input image 146 are multiplied with the nozzle ejection rate after the correction becomes 100% (255 in the case of the image data of eight bits) of the largest gradation value or greater, the gradation value after the conversion may be turned to 100% of the largest gradation value.

The process of correcting the second nozzle ejection rate using the correction value $\alpha_2$ as illustrated in FIG. 25 is executed before using the nozzle ejection rate in step S18 in FIG. 16.

After step S60 in FIG. 23, the process returns to step S42, and the above-described processing of step S42 to step S58 is repeated. In this way, the individual thresholds are determined in the ascending order, and when setting is ended to the largest threshold, Yes determination is attained in step S58, a subroutine in FIG. 23 is ended, and the process returns to a main flow in FIG. 16.

Figure 26:
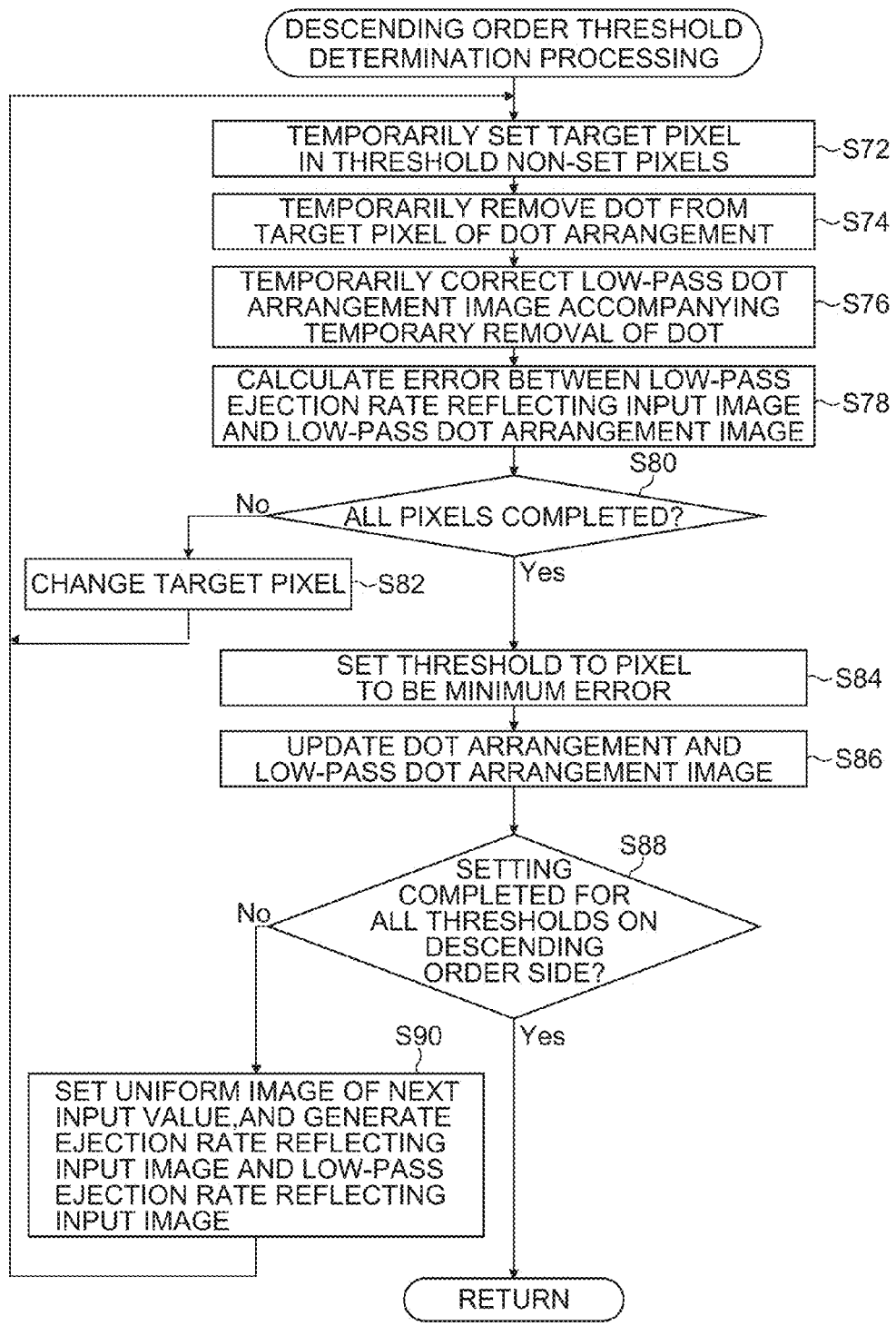
FIG. 26 is a flowchart of descending order threshold determination processing.

FIG. 26 is a flowchart of descending order threshold determination processing. The flowchart in FIG. 26 is a flow of the processing similar to the flowchart in the ascending order described in FIG. 23. Main difference is a process of steps S74 and S76 in FIG. 26.

In the descending order threshold determination processing illustrated in FIG. 26, first, a target pixel is temporarily set in the threshold non-set pixels (step S72). The threshold non-set pixels of the dither mask are the pixels with dots in the case that a threshold setting order is the descending order. That is, the target pixel is temporarily set from the pixels with dots in the dot arrangement. Then, in the case that the threshold setting order is the descending order, processing of temporarily removing a dot from the pixel position corresponding to the target pixel in the dot arrangement is performed (step S74). The process of step S74 is called "temporary removal of dot".

Accompanying the temporary removal of the dot, the low-pass dot arrangement image is temporarily corrected (step S76). Temporary correction in step S76 is processing of temporarily removing the second low-pass filter at the pixel position corresponding to the target pixel from the low-pass dot arrangement image.

Then, an error between the low-pass ejection rate reflecting input image and the low-pass dot arrangement image after the temporary correction is calculated (step S78). An evaluation index of "error" calculated here can be, similarly to step S48 in FIG. 23, the sum of squares or diffusion of a difference, or the square root of the sum of squares of the difference or the standard deviation.

Since the individual processes of steps S80, S82, S84, S86, S88 and S90 in FIG. 26 correspond to the individual processes of steps S50, S52, S54, S56, S58 and S60 in FIG. 23 respectively, the description is omitted. However, in step S88 in FIG. 26 replacing step S58 in FIG. 23, whether or not the setting of all the thresholds on the descending order side is competed is determined.

After step S90, the process returns to step S72, and the above-described processing of step S72 to step S88 is repeated.

In this way, the individual thresholds are determined in the descending order, and when the setting is ended to the smallest threshold, Yes determination is attained in step S88, a subroutine in FIG. 26 is ended, and the process returns to the main flow in FIG. 16.

In this way, the thresholds of all the pixels in the first dither mask 350 are set, and the first dither mask 350 is completed.

[Configuration of Dither Mask Generation Device]

Figure 27:
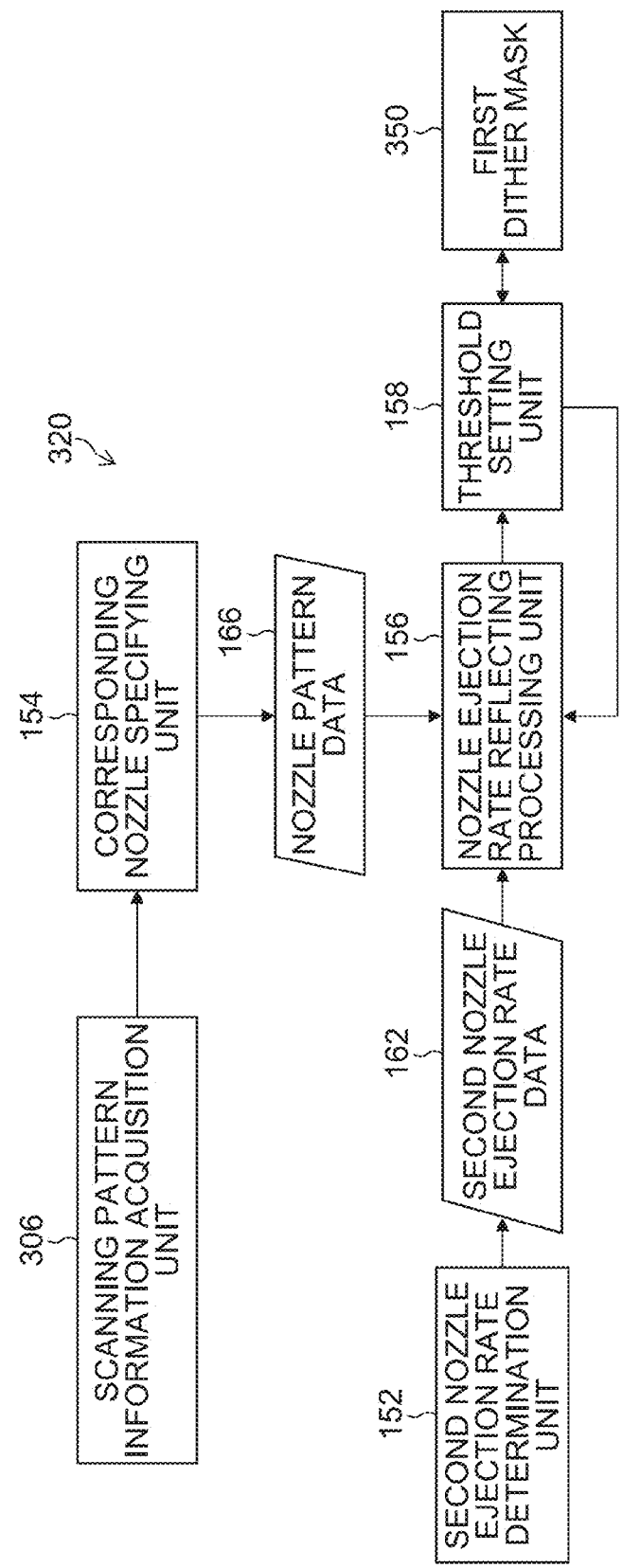
FIG. 27 is a block diagram illustrating a configuration of a first dither mask generation unit.

FIG. 27 is a block diagram illustrating a configuration example of the first dither mask generation unit 320. The first dither mask generation unit 320 includes a second nozzle ejection rate determination unit 152, a corresponding nozzle specifying unit 154, a nozzle ejection rate reflecting processing unit 156, and a threshold setting unit 158. These individual units can be realized by a hardware circuit such as an integrated circuit, or hardware and software of a computer, or an appropriate combination thereof.

The second nozzle ejection rate determination unit 152 performs processing of determining the nozzle ejection rate for each nozzle in the recording head 24 (see FIG. 4). That is, the second nozzle ejection rate determination unit 152 determines second nozzle ejection rate data 162 indicating the nozzle ejection rate of each nozzle. The second nozzle ejection rate data 162 corresponds to the second nozzle ejection rate data 140 described in FIG. 22, and is like the one described in FIG. 8 and FIG. 18 specifically.

A function of the second nozzle ejection rate determination unit 152 may be loaded on the first nozzle ejection rate determination unit 304 described in FIG. 9.

The corresponding nozzle specifying unit 154 illustrated in FIG. 27 performs processing of specifying the nozzles corresponding to the individual pixels of the first dither mask 350, based on the information of the scanning pattern obtained from the scanning pattern information acquisition unit 306. That is, the corresponding nozzle specifying unit 154 performs processing of making at least one nozzle in charge of recording at the respective pixel positions correspond, for the individual pixels of the first dither mask 350.

The scanning pattern information acquisition unit 306 acquires the information of the scanning pattern according to the image drawing mode from the scanning pattern program or the like. As described above, since the scanning pattern program defines the reciprocating scanning in the main scanning direction by the recording head 24 to the recording medium 12 intermittently conveyed in the sub scanning direction and the number of the paths, the scanning pattern of the recording head 24 can be discriminated from the scanning pattern program.

The corresponding nozzle specifying unit 154 discriminates the scanning pattern when the recording head 24 is relatively moved in the main scanning direction and the sub scanning direction to the recording medium 12. The corresponding nozzle specifying unit 154 performs processing of determining by which nozzle 62 of the recording head 24 the individual pixels of the first dither mask 350 are to be recorded based on the scanning pattern. The corresponding nozzle specifying unit 154 generates nozzle pattern data 166 which is the data of the nozzle pattern indicating correspondence relation between the individual pixels of the first dither mask 350 and the nozzles in charge of the recording of the respective pixels. The nozzle pattern data 166 corresponds to the data of the nozzle pattern 142 described in FIG. 22.

The method of generating the nozzle pattern data 166 is not limited to the method of determining it based on the scanning pattern program, and various kinds of methods can be used. Since the nozzle pattern data 166 can be determined by the image drawing mode and the size and arrangement method of the first dither mask 350, the nozzle pattern data corresponding to each of the plurality of kinds of the image drawing modes can be held beforehand in the information storage unit such as a memory.

A function of the corresponding nozzle specifying unit 154 may be loaded on the nozzle pattern determination unit 308 described in FIG. 9.

The nozzle ejection rate reflecting processing unit 156 illustrated in FIG. 27 performs processing of reflecting the nozzle ejection rate on the evaluation index when the individual thresholds of the first dither mask 350 are set. The nozzle ejection rate to be reflected on the evaluation index in the nozzle ejection rate reflecting processing unit 156 is called "second nozzle ejection rate".

The threshold setting unit 158 performs processing of preparing the first dither mask 350 including the pixels to which the threshold is not set, and setting the threshold to the threshold non-set pixels of the first dither mask 350 based on the evaluation index on which the second nozzle ejection rate is reflected. By setting the thresholds of all the pixels of the first dither mask 350 by the threshold setting unit 158, the first dither mask 350 is completed.

For a correcting function of correcting the nozzle ejection rate described in FIG. 25, a nozzle ejection rate correction unit (not illustrated in the figure) may be provided in the second nozzle ejection rate determination unit 152, or the nozzle ejection rate correction unit (not illustrated in the figure) may be provided in the nozzle ejection rate reflecting processing unit 156.

The first dither mask 350 obtained by the first dither mask generation unit 320 becomes the dither mask capable of obtaining the dot arrangement to be excellent dot dispersibility for reproduction of the ejection rate reflecting input image reflecting the second nozzle ejection rate.

Figure 28:
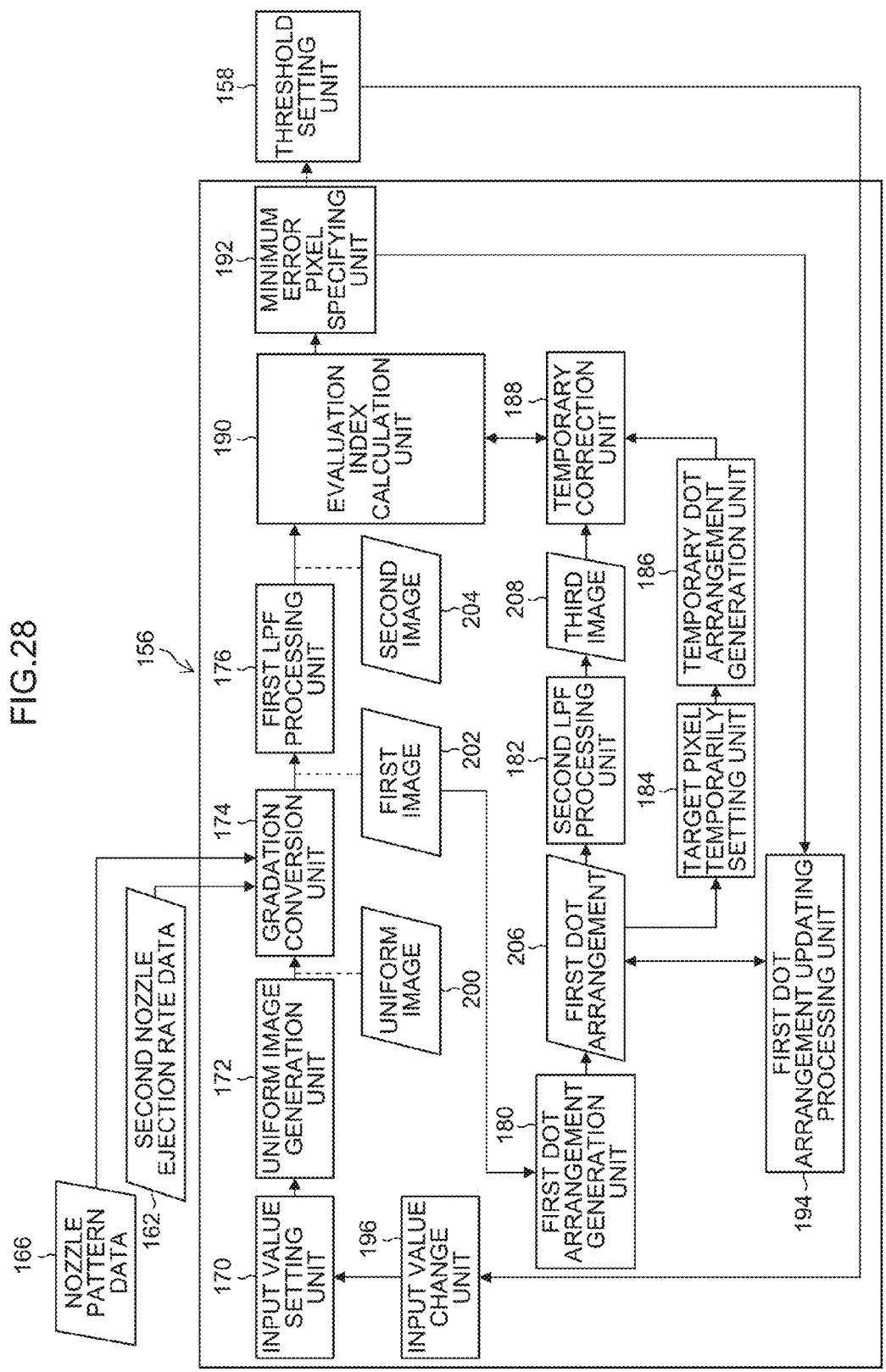
FIG. 28 is a block diagram illustrating a detailed configuration of a nozzle ejection rate reflecting processing unit in the first dither mask generation unit.

FIG. 28 is a block diagram illustrating a detailed configuration of the nozzle ejection rate reflecting processing unit 156 in the first dither mask generation unit 320. In FIG. 28, the same signs are attached to the same elements as the ones in the configuration described in FIG. 27 and the description is omitted.

The nozzle ejection rate reflecting processing unit 156 includes an input value setting unit 170, a uniform image generation unit 172, a gradation conversion unit 174, a first low-pass filter processing unit 176, a first dot arrangement generation unit 180, a second low-pass filter processing unit 182, a target pixel temporarily setting unit 184, a temporary dot arrangement generation unit 186, a temporary correction unit 188, an evaluation index calculation unit 190, a minimum error pixel specifying unit 192, a first dot arrangement updating processing unit 194, and an input value change unit 196.

The input value setting unit 170 sets an input value I indicating the gradation value of the input image. The input value setting unit 170 sets an initial input value $I_0$ indicating the gradation value of the initial input image 146 (see FIG. 22) first.

The uniform image generation unit 172 generates a uniform image 200 of the input value set in the input value setting unit 170. The initial uniform image 200 corresponding to the initial input value $I_0$ corresponds to the input image 146 described in FIG. 22.

The gradation conversion unit 174 illustrated in FIG. 28 performs processing of gradation conversion of reflecting the corresponding nozzle ejection rates on the individual pixel values of the uniform image 200 based on the second nozzle ejection rate data 162 and the nozzle pattern data 166. A first image 202 generated by the gradation conversion unit 174 corresponds to the ejection rate reflecting input image described in step S18 in FIG. 16. The first image 202 corresponds to the ejection rate reflecting input image 148 described in FIG. 22. The gradation conversion unit 174 can be called a first image generation unit, and the conversion processing by the gradation conversion unit 174 can be recognized as first image generation processing.

The first low-pass filter processing unit 176 illustrated in FIG. 28 generates a second image 204 by performing an operation of convoluting the first low-pass filter to the first image 202. The second image 204 corresponds to the low-pass ejection rate reflecting input image described in step S20 in FIG. 16. The first low-pass filter processing unit 176 can be called a second image generation unit, and filter processing by the first low-pass filter processing unit 176 can be recognized as second image generation processing.

The first dot arrangement generation unit 180 illustrated in FIG. 28 generates a first dot arrangement 206 which is the dot arrangement corresponding to the first image 202.

The second low-pass filter processing unit 182 generates a third image 208 by performing an operation of convoluting the second low-pass filter to the first dot arrangement. The third image 208 corresponds to the low-pass dot arrangement image described in step S24 in FIG. 16. The second low-pass filter processing unit 182 can be called a third image generation unit, and filter processing by the second low-pass filter processing unit 182 can be recognized as third image generation processing.

The target pixel temporarily setting unit 184 temporarily sets the target pixel to the threshold non-set pixels of the dither mask based on the first dot arrangement 206. The target pixel temporarily setting unit 184 performs the process indicated in step S42 in FIG. 23 and step S72 in FIG. 26.

The temporary dot arrangement generation unit 186 temporarily places the dot to the target pixel, or temporarily removes the dot from the target pixel, and generates a temporary dot arrangement. The temporary dot arrangement generation unit 186 performs the process indicated in step S44 in FIG. 23 and step S74 in FIG. 26.

The temporary correction unit 188 performs processing of temporarily correcting the third image 208 accompanying the temporary placement or temporary removal of the dot by the temporary dot arrangement generation unit 186. The temporary correction unit 188 performs the process indicated in step S46 in FIG. 23 and step S76 in FIG. 26.

The evaluation index calculation unit 190 calculates the evaluation index that evaluates the error between the second image 204 and the third image 208 after the temporary correction. The evaluation index calculation unit 190 performs the process indicated in step S48 in FIG. 23 and step S78 in FIG. 26.

The minimum error pixel specifying unit 192 changes the position of the temporarily set target pixel, and specifies the position of the pixel for which the error becomes minimum from the evaluation index calculated by the evaluation index calculation unit 190. The information of the minimum error pixel which is the pixel for which the error becomes minimum is provided to the threshold setting unit 158.

The threshold setting unit 158 sets the threshold to the pixel for which the error becomes minimum from the evaluation index obtained by the evaluation index calculation unit 190 among the threshold non-set pixels of the first dither mask 350. By the minimum error pixel specifying unit 192 and the threshold setting unit 158, the process indicated in step S54 in FIG. 23 and step S84 in FIG. 26 is performed.

The first dot arrangement updating processing unit 194 performs processing of placing the dot to the minimum error pixel or removing the dot from the minimum error pixel based on the information of the minimum error pixel, and updating the first dot arrangement 206. Then, the second low-pass filter processing unit 182 updates the third image 208 by performing the operation of convoluting the second low-pass filter to the updated first dot arrangement 206. Or, the second low-pass filter processing unit 182 updates the third image 208 by adding the second low-pass filter to the pixel position corresponding to the minimum error pixel or removing the second low-pass filter from the pixel position corresponding to the minimum error pixel for the initial third image 208. By the first dot arrangement updating processing unit 194 and the second low-pass filter processing unit 182, the process indicated in step S56 in FIG. 23 and step S86 in FIG. 26 is performed.

The initial first dot arrangement may be rewritten and updated by the latest dot arrangement generated by the first dot arrangement updating processing unit 194, or the initial first dot arrangement may be held and also the updated dot arrangement may be held.

The input value change unit 196 changes the input value accompanying the setting of the threshold by the threshold setting unit 158. Specifically, using ΔI that is the increment of the input value for one dot, the input value is changed corresponding to the increase and decrease of the dot. Then, the uniform image generation unit 172 generates the uniform image 200 of the changed input value, the gradation conversion unit 174 generates the first image 202 by performing the processing of the gradation conversion of reflecting the corresponding nozzle ejection rates on the individual pixel values of the uniform image 200, and the first low-pass filter processing unit 176 generates the second image 204 by performing the operation of convoluting the first low-pass filter to the first image 202.

By the input value change unit 196, the uniform image generation unit 172, the gradation conversion unit 174 and the first low-pass filter processing unit 176, the process indicated in step S60 in FIG. 23 and step S90 in FIG. 26 is performed.

[Second Example of Processing of Generating First Dither Mask 350]

In the generation processing of the first dither mask 350 described in the first example, a huge operation amount is required since it is needed, as described in FIG. 23 and FIG. 26, to repeatedly execute the processing of temporarily setting the target pixel to the threshold non-set pixel to be a candidate every time of setting the individual thresholds, temporarily placing the dot to the first dot arrangement and adding the second low-pass filter to the low-pass dot arrangement image in the case of an ascending threshold setting order, temporarily removing the dot from the first dot arrangement and removing the second low-pass filter from the low-pass dot arrangement image in the case of a descending threshold setting order, and calculating the error between the low-pass ejection rate reflecting input image and the low-pass dot arrangement image.

Therefore, in the second example, a device capable of generating the first dither mask 350 with an operation amount smaller than that in the first example is provided.

Figure 29:
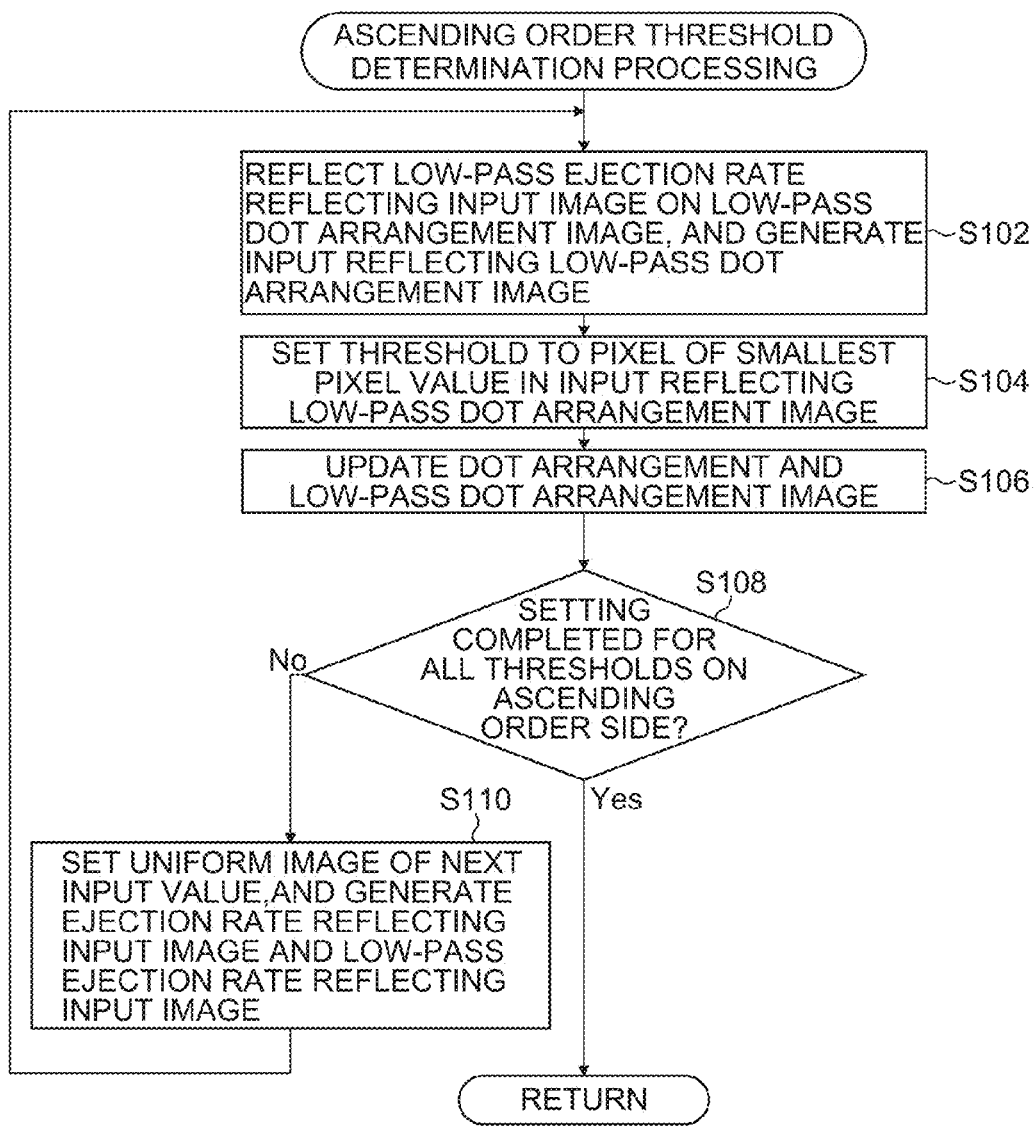
FIG. 29 is a flowchart illustrating a second example of the processing of generating the first dither mask.

FIG. 29 is a flowchart illustrating the second example of the processing of generating the first dither mask 350. Instead of the flowchart described in FIG. 23, the flowchart in FIG. 29 can be adopted.

Here, in order to simplify the description, only the case that the threshold setting order is the ascending order is described. As in the flowchart in FIG. 29, in ascending order threshold setting processing, first, the low-pass ejection rate reflecting input image is reflected on the low-pass dot arrangement image, and an input reflecting low-pass dot arrangement image is generated (step S102). The input reflecting low-pass dot arrangement image can be recognized as a fourth image, and a process in step S102 can be recognized as a fourth image generation process.

As a reflecting method of reflecting the low-pass ejection rate reflecting input image on the low-pass dot arrangement image, in the case of taking a difference between the low-pass dot arrangement image and the low-pass ejection rate reflecting input image, the input reflecting low-pass dot arrangement image is generated by the following expression (14).

$$RIN\_F\_HT(x,y) = F\_HT(x,y) - F\_IN(x,y) \qquad \text{Expression (14)}$$

Here, reference characters x and y designate the position of the pixel. Reference character $RIN\_F\_HT(x,y)$ designates the input reflecting low-pass dot arrangement image at x,y. Reference character $F\_HT(x,y)$ means the low-pass dot arrangement image at x,y. Reference character $F\_IN(x,y)$ means the low-pass ejection rate reflecting input image at x,y.

Also, as the reflecting method, in the case of taking the ratio (that is, the quotient) of the low-pass dot arrangement image and low-pass ejection rate reflecting input image, the input reflecting low-pass dot arrangement image is generated by the following expression (15).

$$RIN\_F\_HT(x,y) = F\_HT(x,y)/F\_IN(x,y) \qquad \text{Expression (15)}$$

In the case of taking the quotient, in order to prevent division by a denominator "0", it is desirable to add a minute value (for example, 1 or the like) to $F\_IN(x,y)$.

In order to help understanding, the description is given with a specific conceptual diagram.

Figure 30:
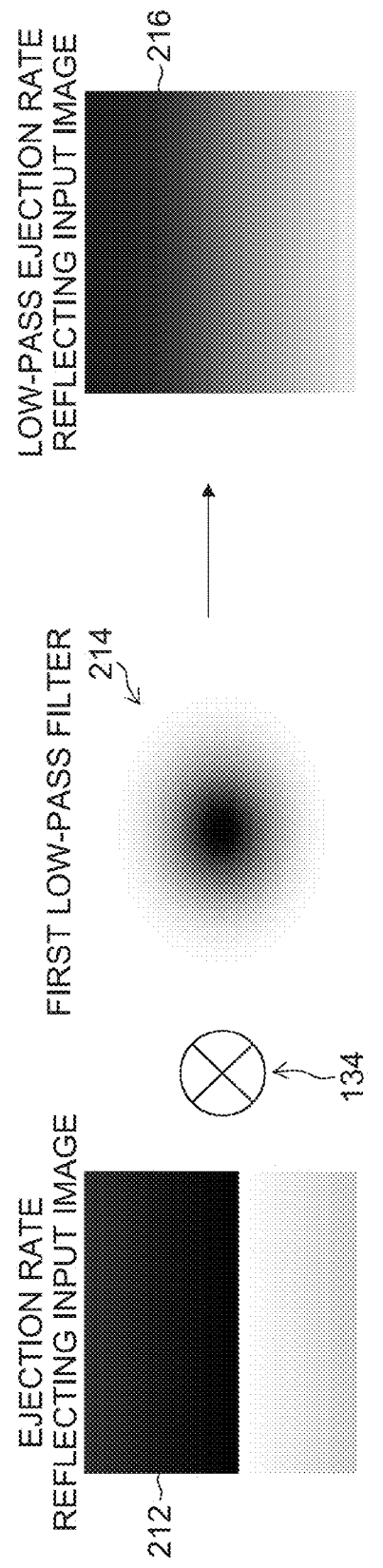
FIG. 30 is an explanatory diagram illustrating a process of generating a low-pass ejection rate reflecting input image, using a specific image.

FIG. 30 is an explanatory diagram illustrating a process of generating the low-pass ejection rate reflecting input image using a specific image. In FIG. 30, for the convenience of the illustration, as an example of an ejection rate reflecting input image 212, as illustrated, a separately painted pattern for which an upper side of an image is dark and a lower side is light is indicated. In FIG. 30, a first low-pass filter 214 indicates a size of a filter coefficient by shades. A tendency that the filter coefficient gradually becomes small from a filter center part to an outer side periphery is indicated.

By convoluting the first low-pass filter 214 to the ejection rate reflecting input image 212, a low-pass ejection rate reflecting input image 216 is generated. The low-pass ejection rate reflecting input image 216 corresponds to the second image 204 (see FIG. 28).

Figure 31:
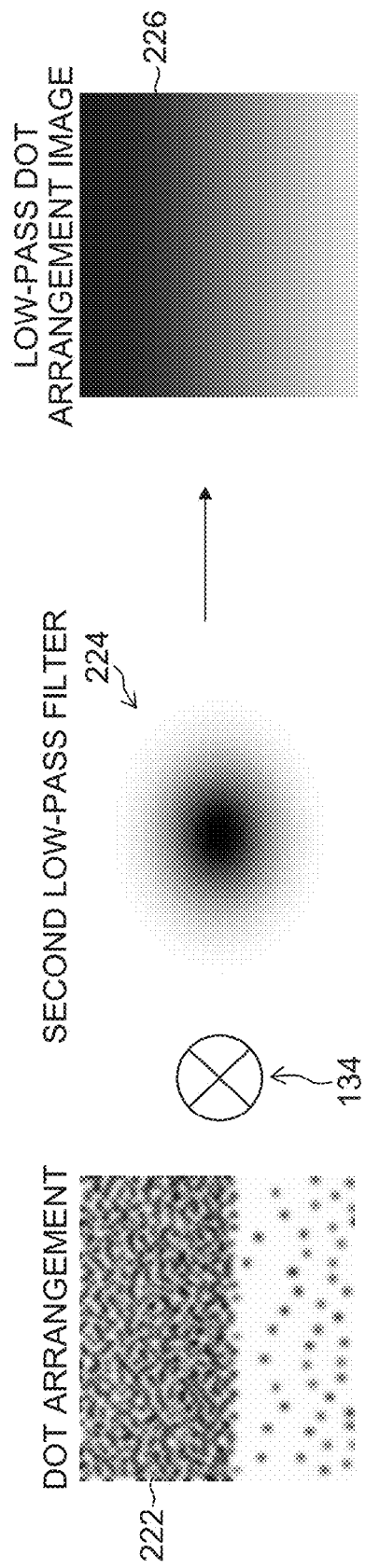
FIG. 31 is an explanatory diagram illustrating a process of generating a low-pass dot arrangement image, using a specific image.

FIG. 31 is an explanatory diagram illustrating a process of generating the low-pass dot arrangement image using a specific image. A dot arrangement 222 illustrated in FIG. 31 is the initial dot arrangement corresponding to the ejection rate reflecting input image 212 illustrated in FIG. 30. In FIG. 30, a second low-pass filter 224 indicates the size of the filter coefficient by shades. A tendency that the filter coefficient gradually becomes small from the filter center part to the outer side periphery is indicated.

By convoluting the second low-pass filter 224 to the dot arrangement 222, a low-pass dot arrangement image 226 is generated. The low-pass dot arrangement image 226 corresponds to the third image 208 (see FIG. 28).

Figure 32:
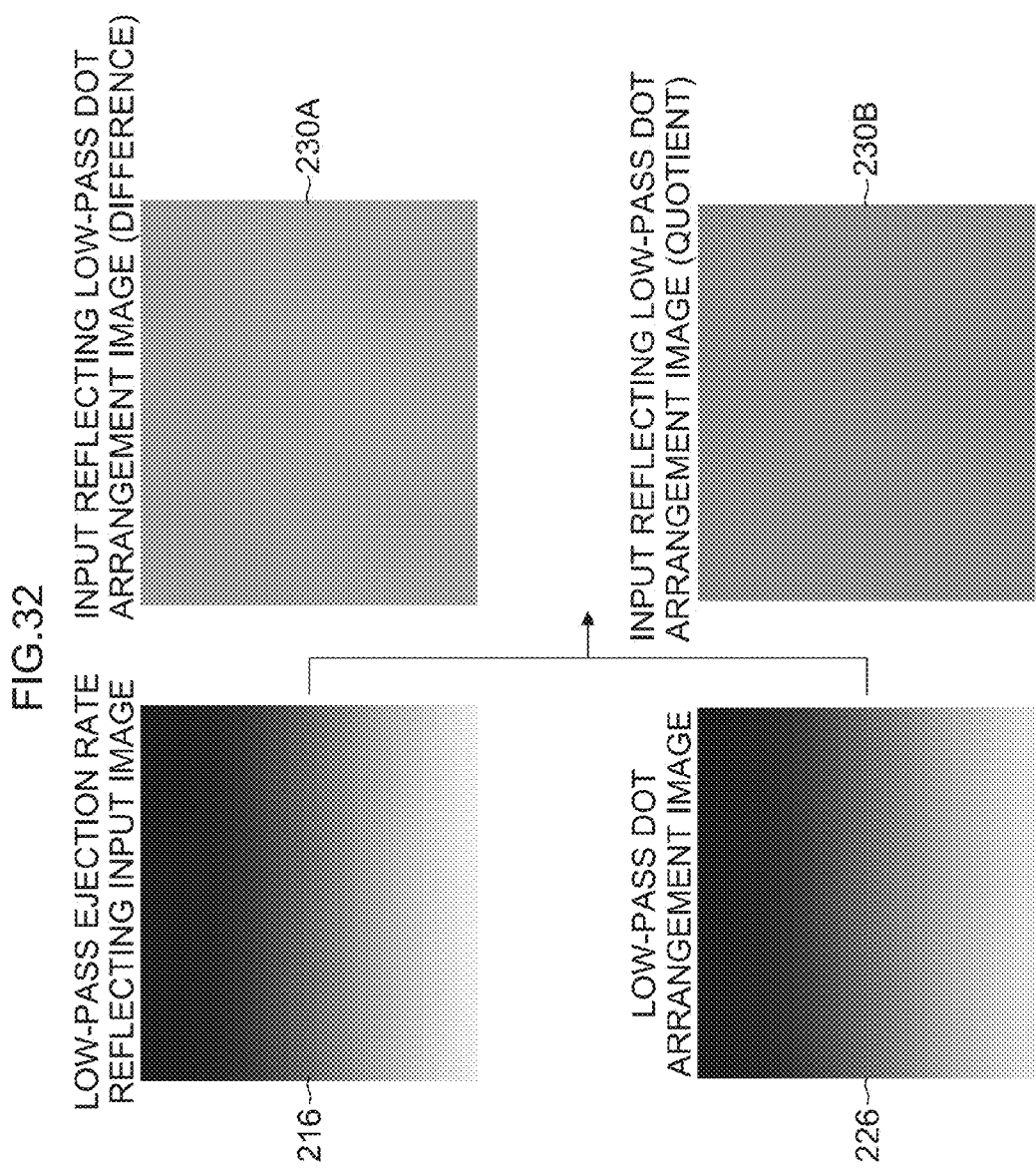
FIG. 32 is an explanatory diagram illustrating a process of generating an input reflecting low-pass dot arrangement image, using a specific image.

FIG. 32 is an explanatory diagram illustrating a process of generating the input reflecting low-pass dot arrangement image using a specific image.

The low-pass ejection rate reflecting input image 216 illustrated in FIG. 32 is an image obtained by convoluting the first low-pass filter 214 to the ejection rate reflecting input image 212 described in FIG. 30. The low-pass dot arrangement image 226 illustrated in FIG. 32 is an image obtained by convoluting the second low-pass filter 224 to the dot arrangement 222 described in FIG. 31. However, in FIG. 32, in order to easily understandably illustrate the drawing, a scale (change field) of the shades of the individual images in FIG. 32 is appropriately adjusted and drawn, and the scale is not unified among the images.

An input reflecting low-pass dot arrangement image 230A illustrated in FIG. 32 is an image obtained by subtracting the pixel values of the corresponding pixels of the low-pass ejection rate reflecting input image 216 and the low-pass dot arrangement image 226, indicating a difference between both.

Also, an input reflecting low-pass dot arrangement image 230B illustrated in FIG. 32 is an image obtained by dividing the pixel values of the corresponding pixels of the low-pass ejection rate reflecting input image 216 and the low-pass dot arrangement image 226, indicating the quotient of both.

Though there is a difference between indicating a distinction between the low-pass ejection rate reflecting input image 216 and the low-pass dot arrangement image 226 by the difference and indicating it by the quotient, in both cases, the input reflecting low-pass dot arrangement images 230A and 230B are the images reflecting the individual pixel values of the low-pass ejection rate reflecting input image 216 on the individual corresponding pixel values of the low-pass dot arrangement image 226.

As the error between the low-pass ejection rate reflecting input image 216 and the low-pass dot arrangement image 226 is smaller, uniformity of a gradation distribution of the input reflecting low-pass dot arrangement image 230A or 230B increases. That is, as the error between the low-pass ejection rate reflecting input image 216 and the low-pass dot arrangement image 226 is smaller, the input reflecting low-pass dot arrangement image 230A or 230B becomes closer to a more uniform image.

Therefore, by determining the position of the pixel to be a dot additionally installing position or a dot removing position so as to improve the uniformity of the gradation distribution of the input reflecting low-pass dot arrangement image 230A or 230B, the dot arrangement suitable for reproduction of the ejection rate reflecting input image 212 can be obtained.

"Improving uniformity of gradation distribution" means that the input reflecting low-pass dot arrangement images 230A and 230B become closer to the uniform image. The fact that the input reflecting low-pass dot arrangement image 230A or 230B becomes closer to the uniform image means that the difference (that is, the error) between the low-pass ejection rate reflecting input image 216 and the low-pass dot arrangement image 226 becomes small.

The fact that the low-pass dot arrangement image 226 with a small difference from the low-pass ejection rate reflecting input image 216 is obtained means, namely, that the dot arrangement (that is, the halftone image) that excellently reproduces image content of the ejection rate reflecting input image 212 can be obtained. "Improving uniformity of gradation distribution" is sometimes expressed as "uniformization". Improvement of the uniformity of the gradation distribution means that the uniformity of the gradation distribution becomes excellent, and has the same meaning as enhancement of the uniformity of the gradation distribution.

When the input reflecting low-pass dot arrangement image is generated in step S102 in FIG. 29, subsequently, the threshold is set to the pixel of the smallest pixel value inside the generated input reflecting low-pass dot arrangement image (step S104). In step S104, the pixel values of the individual pixels inside the image of the input reflecting low-pass dot arrangement image are compared with each other, and the pixel whose pixel value is the smallest is determined as a threshold setting pixel. Then, to the determined threshold setting pixel, the threshold is set.

The pixel whose pixel value is the smallest in the input reflecting low-pass dot arrangement image can be recognized as being pertinent to the pixel that enhances the uniformity of the gradation distribution of the fourth image in the case of correcting the third image and the fourth image accompanying execution of dot installation, among the individual pixels in the first dot arrangement.

Accompanying the setting of the threshold by step S104, the dot arrangement and the low-pass dot arrangement image are updated (step S106). That is, the dot arrangement is updated by placing the dot at the position of the pixel to which the threshold is set by step S104, and the low-pass dot arrangement image is updated by generating the low-pass dot arrangement image corresponding to the updated dot arrangement.

In step S108, whether or not the setting of all the thresholds on the ascending order side is completed is determined. In the case of No determination in step S108, the process advances to step S110. In step S110, the uniform image of the next input value is set, and the ejection rate reflecting input image and the low-pass ejection rate reflecting input image are generated. The process of step S108 and step S110 is similar to the process of step S58 and step S60 in FIG. 23.

However, in the case that the input reflecting low-pass dot arrangement image is defined by the quotient as indicated by the expression (15), the process of step S110 in FIG. 29 is not needed.

After step S110 in FIG. 29, the process returns to step S102, and the above-described processing of step S102 to step S108 is repeated. In this way, the individual thresholds are determined in the ascending order, and when the setting is ended to the largest threshold, Yes determination is attained in step S108, a subroutine in FIG. 29 is ended, and the process returns to the main flow in FIG. 16.

The descending order threshold determination processing is similar to the flowchart in FIG. 29. In the case of the descending order, the threshold is set to the pixel of the largest pixel value in the input reflecting low-pass dot arrangement image instead of the process of setting the threshold to the pixel of the smallest pixel value in step S104, and the dot is removed (eliminated) from the position of the pixel to which the threshold is set and the dot arrangement and the low-pass dot arrangement image are updated instead of the process of placing the dot at the pixel position to which the threshold is set and updating the dot arrangement and the low-pass dot arrangement image in step S106.

According to the first dither mask generation method described in the second example, an operation method of reducing the error between the low-pass ejection rate reflecting input image and the low-pass dot arrangement image as a result by introducing the input reflecting low-pass dot arrangement image and determining the position to place the dot or the position to remove the dot so as to uniformize the input reflecting low-pass dot arrangement image is adopted. That is, in the second example, the position of the pixel to set the threshold is specified and the threshold is set, based on the comparison of the pixel values within the input reflecting low-pass dot arrangement image, so as to uniformize the input reflecting low-pass dot arrangement image.

According to the second example, the pixel value of the input reflecting low-pass dot arrangement image can be utilized as it is as the evaluation index, and the pixel to set the threshold can be easily specified based on the comparison of size relation among the pixel values with each other within the image of the input reflecting low-pass dot arrangement image, without calculating a separate evaluation value such as a square error.

Therefore, compared to the method in the first example, the appropriate first dither mask 350 can be obtained with a small operation amount.

Figure 33:
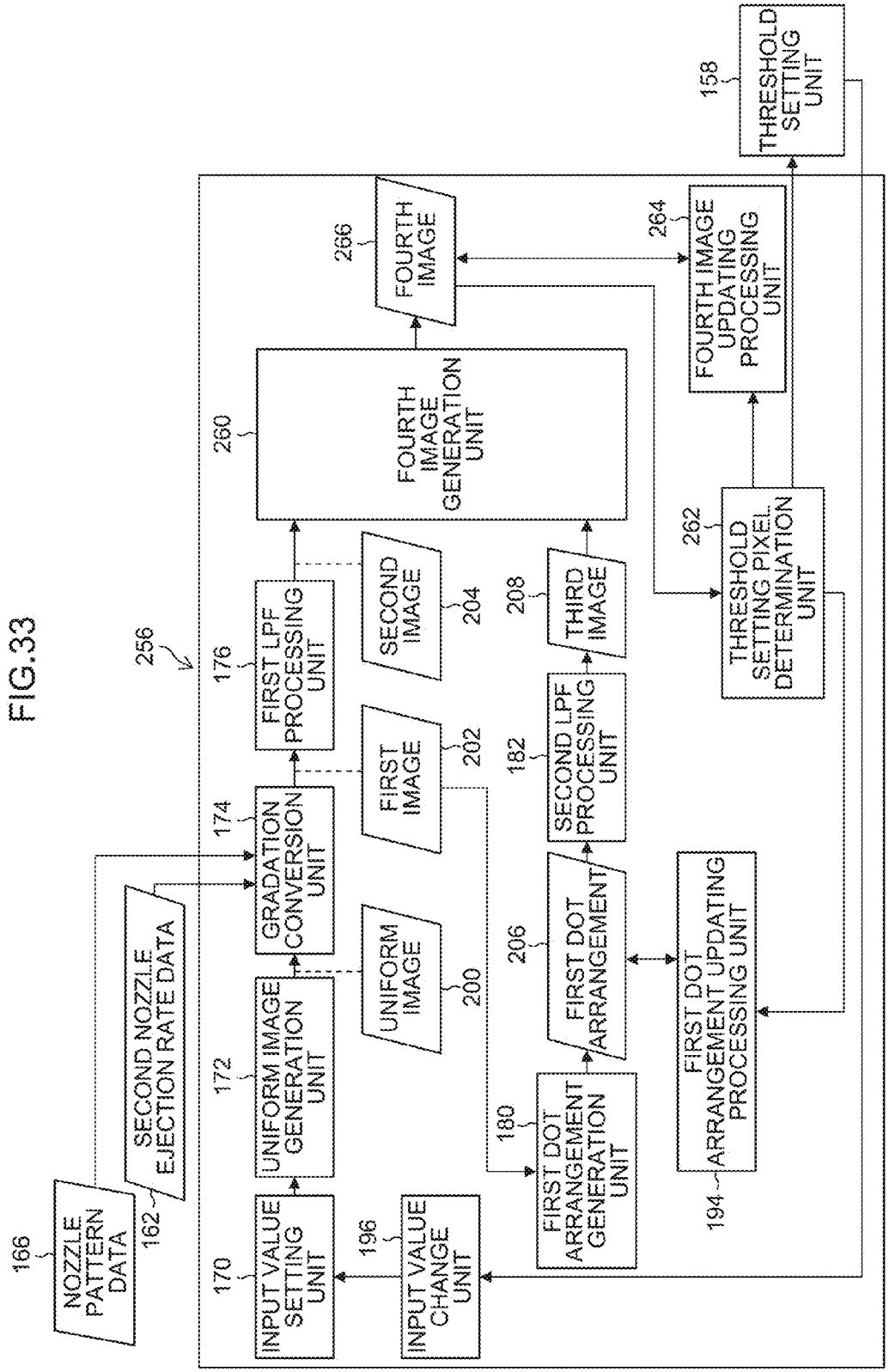
FIG. 33 is a block diagram illustrating a main part configuration of the first dither mask generation unit relating to the second example.

FIG. 33 is a block diagram illustrating a main part configuration of the first dither mask generation unit 320 relating to the second example. In FIG. 33, the same signs are attached to the elements same as or similar to the ones in the configuration described in FIG. 28, and the description is omitted. A basic configuration of the first dither mask generation unit 320 relating to the second example is similar to the configuration in the first example illustrated in FIG. 27, however, instead of the nozzle ejection rate reflecting processing unit 156 described in FIG. 27 and FIG. 28, the configuration of a nozzle ejection rate reflecting processing unit 256 illustrated in FIG. 33 is provided.

The nozzle ejection rate reflecting processing unit 256 in the second example includes a fourth image generation unit 260, a threshold setting pixel determination unit 262, and a fourth image updating processing unit 264. The fourth image generation unit 260 performs processing of generating, from the second image 204 and the third image 208, a fourth image 266 indicating a difference between both. The fourth image 266 corresponds to the input reflecting low-pass dot arrangement image described in step S102 in FIG. 29. The fourth image 266 is an image reflecting the individual pixel values of the second image 204 on the individual pixel values of the third image 208.

As the reflecting method of reflecting the individual pixel values of the second image on the individual pixel values of the third image 208 so as to indicate a difference between the second image 204 and the third image 208, there are the case of taking the difference and the case of taking the ratio. "Difference" is obtained by subtraction of the pixel values with each other. "Ratio" is obtained by division of the pixel values with each other. "Ratio" has the same meaning as "quotient".

The fourth image generation unit 260 can be the configuration of calculating the difference in the pixel value between the respectively corresponding pixel positions of the second image 204 and the third image 208 (that is, the subtraction), and generating the fourth image 266 for which the value indicating the difference is the pixel value.

Also, without being limited to the form of calculating the difference, the fourth image 266 indicating the difference between the second image 204 and the third image 208 may be generated by the ratio of the pixel values of the corresponding pixel positions with each other, that is, the quotient by the division. That is, the fourth image generation unit 260 can be the configuration of calculating the ratio (the quotient by the division) of the pixel values of the respectively corresponding pixel positions with each other of the second image 204 and the third image 208 and generating the fourth image 266 for which the value indicating the quotient is the pixel value.

The threshold setting pixel determination unit 262 performs processing of determining the threshold setting pixel which is a location of the pixel to set the threshold based on the fourth image 266. Specifically, the pixel values within the image of the fourth image 266 are compared, and the pixel whose pixel value becomes the smallest or the pixel whose pixel value becomes the largest is determined from the fourth image 266.

The information of the threshold setting pixel determined in the threshold setting pixel determination unit 262 is sent to the threshold setting unit 158. The threshold setting unit 158 sets the threshold to the threshold setting pixel.

Also, the information of the threshold setting pixel determined in the threshold setting pixel determination unit 262 is sent to the first dot arrangement updating processing unit 194. The first dot arrangement updating processing unit 194 performs processing of updating the first dot arrangement 206 by adding the dot to the threshold setting pixel or removing the dot from the threshold setting pixel. The initial first dot arrangement may be rewritten and updated by the latest dot arrangement generated by the first dot arrangement updating processing unit 194, or the initial first dot arrangement may be held and also the updated dot arrangement may be held.

Further, the information of the threshold setting pixel determined in the threshold setting pixel determination unit 262 is sent to the fourth image updating processing unit 264.

The fourth image updating processing unit 264 performs processing of correcting and updating the fourth image 266 accompanying the updating processing of the first dot arrangement 206 by the first dot arrangement updating processing unit 194. The fourth image updating processing unit 264 corrects the fourth image 266 by performing processing of adding a contributory component of the second low-pass filter corresponding to the dot to be added to the threshold setting pixel to the fourth image 266 or processing of removing the contributory component of the second low-pass filter corresponding to the dot to be removed from the threshold setting pixel from the fourth image 266.

As a result of correction processing by the fourth image updating processing unit 264, the fourth image 266 for which the value of the pixel is updated is obtained. The initial fourth image 266 may be rewritten and updated by the latest fourth image 266 generated by the fourth image updating processing unit 264, or the initial fourth image may be held and also the updated fourth image generated by the fourth image updating processing unit 264 may be held.

The individual pieces of data of the first image 202, the second image 204, the first dot arrangement 206, the third image 208 and the fourth image 266 generated inside the first dither mask generation unit 320 (see FIG. 27) are held in a memory (not illustrated in the figure) provided inside the image processing unit 110 (see FIG. 5) or a storage unit such as the information storage unit 124.

[Modification 1 of Second Example]

In the second example described above, the example of holding the input reflecting low-pass dot arrangement image which is the fourth image 266 generated by the fourth image generation unit 260 in the memory or the like, updating the fourth image 266 accompanying the setting of the threshold, and holding the updated fourth image 266 is described.

However, when the invention is implemented, it is not always needed to hold the generated fourth image 266. For example, only the second image 204 and the third image 208 may be held and a value corresponding to the fourth image may be calculated as required when the pixel value is evaluated when the threshold setting pixel is determined.

[Modification 2 of Second Example]

In the second example described above, the threshold is set to the pixel corresponding to the smallest value (in the case of the ascending threshold setting order) of the fourth image 266, however, the threshold setting pixel is not always needed to be the pixel of the smallest value in the fourth image 266. For example, the pixels smaller than the average value of the pixel values in the fourth image 266 by a specified value or less may be all defined as candidates, one threshold setting pixel may be selected from the candidates randomly or by considering a separate index or arrangement restrictions further, and the threshold may be set to the selected threshold setting pixel.

"Specified value" to be a reference of determining the candidates may be a fixed value set beforehand, or may be changed every time of setting the threshold. Also, in the case of changing the specified value, a negative value may be also included. Using the negative value as the specified value means, namely, including the pixels of the pixel value larger than the average value in the candidates. A reason for allowing the negative value as the specified value is to avoid falling into a partial and local optimum solution and reach an optimum solution, similarly to a simulated annealing method. In a range that such an object can be achieved, the specified value is changed.

For the separate index, for example, an index that evaluates image quality such as graininess, stripe-like image defects, density irregularity or banding, an index of a dot covering rate or the like, or an appropriate combination of these indexes can be adopted.

As the arrangement restrictions, for example, other than the restrictions of setting a limit to the pixel with an adjacent dot, or setting the limit to the pixel without the adjacent dot, the restrictions of setting the limit to the pixel corresponding to a specific nozzle or a specific scanning path or setting the limit to the pixel not corresponding to the specific nozzle or the specific scanning path or the like can be adopted, and these restrictions may be appropriately combined for the arrangement restriction.

All the threshold non-set pixels are turned to the candidates and a trial operation is repeated in the method described in the first example. On the contrary, according to the second example, since the pixels to be the candidates are narrowed based on the pixel value of the input reflecting low-pass dot arrangement image, it is easy to determine the threshold setting pixel. In particular, by the second example, one threshold setting pixel can be specified according to a simple rule, based on the comparison of the pixel values in the input reflecting low-pass dot arrangement image. The simple rule is the already described rule to be the pixel of the smallest value, or the rule for which narrowing of the candidates by the specified value and selection by a random number or the like are combined or the like. According to the present embodiment, an optimum dither mask can be obtained with a small operation amount. Also, when the pixel values in the input reflecting low-pass dot arrangement image is compared, without being limited to the case of comparing the pixel values in a pixel-to-pixel manner by a pixel unit, the plurality of pixels may be turned into a group and the pixel values may be compared by a group unit.

[Modification 3 of Second Example]

Regarding the generation of the input reflecting low-pass dot arrangement image described in step S102 in FIG. 29, an expression (16) for which a first term and a second term on a right side of the already described expression (14) are replaced can be used.

That is, as the method of reflecting the low-pass ejection rate reflecting input image on the low-pass dot arrangement image, in the case of taking "difference" between both, instead of the expression (14), the following expression (16) can be used.

$$RIN\_F\_HT(x,y) = F\_IN(x,y) - F\_HT(x,y)$$  Expression (16)

In this case, for the processing of step S104, the threshold is set to the pixel of the largest value in the input reflecting low-pass dot arrangement image, or the threshold is set to the pixel larger than the average value by the specified value or more.

[Modification 4 of Second Example]

Regarding the generation of the input reflecting low-pass dot arrangement image described in step S102 in FIG. 29, an expression (17) for which a denominator and a numerator on a right side of the already described expression (15) are replaced can be used. That is, as the method of reflecting the low-pass ejection rate reflecting input image on the low-pass dot arrangement image, in the case of taking "quotient" of both, instead of the expression (15), the following expression (17) can be used.

$$RIN\_F\_HT(x,y) = F\_IN(x,y)/F\_HT(x,y)$$  Expression (17)

In order to prevent the division by the denominator "0", it is desirable to add a minute value (for example, "1") to F_HT(x,y).

In this case, for the processing of step S104, the threshold is set to the pixel of the largest value in the input reflecting low-pass dot arrangement image, or the threshold is set to the pixel larger than the average value by the specified value or more.

[Modification 5 of Second Example]

For a definition of the input reflecting low-pass dot arrangement image, the case of defining it by "difference" by the subtraction like the expression (14) and the expression (16) and the case of defining it by "quotient" by the division like the expression (15) and the expression (17) are described, however, the subtraction can be also handled as addition of a negative value and the division can be handled as multiplication of a fraction. Therefore, under such equivalent handling, the difference by the subtraction can be noted as "sum" by the addition, and the quotient by the division can be noted as "product" by the multiplication.

[Third Example of Processing of Generating First Dither Mask 350]

The generation method of the first dither mask 350 is not limited to the first example, the second example and the modifications thereof described above. For example, as the generation method of the first dither mask 350, the method described in Japanese Patent Application Laid-Open No. 2010-162770 can be adopted. As described in Japanese Patent Application Laid-Open No. 2010-162770, the dither mask generated so as to suppress threshold setting of a specific pixel corresponding to the nozzle at the end of the nozzle array can be handled as the first dither mask 350. That is, as described in the first example and the second example, in the generation of the first dither mask, in one of the method of reflecting the nozzle ejection rate on the evaluation index when the individual thresholds are set and the method of reflecting the nozzle ejection rate on the pixel to be the candidate of setting the individual thresholds as described in Japanese Patent Application Laid-Open No. 2010-162770, the dither mask generated as a result is the one that outputs the dot arrangement of the non-uniform dot density reflecting the nozzle ejection rate for the uniform input value, and corresponds to the first dither mask.

[About Method of Generating Second Dither Mask 352 from First Dither Mask 350]

Next, a method of generating the second dither mask 352 is described.

The processing of dither mask conversion described in step S10B in FIG. 15 is processing of converting the first dither mask 350 that outputs the dot arrangement of the non-uniform dot density reflecting the nozzle ejection rate for the uniform input value so as to output the dot arrangement of the uniform dot density for the uniform input value.

Figure 34:
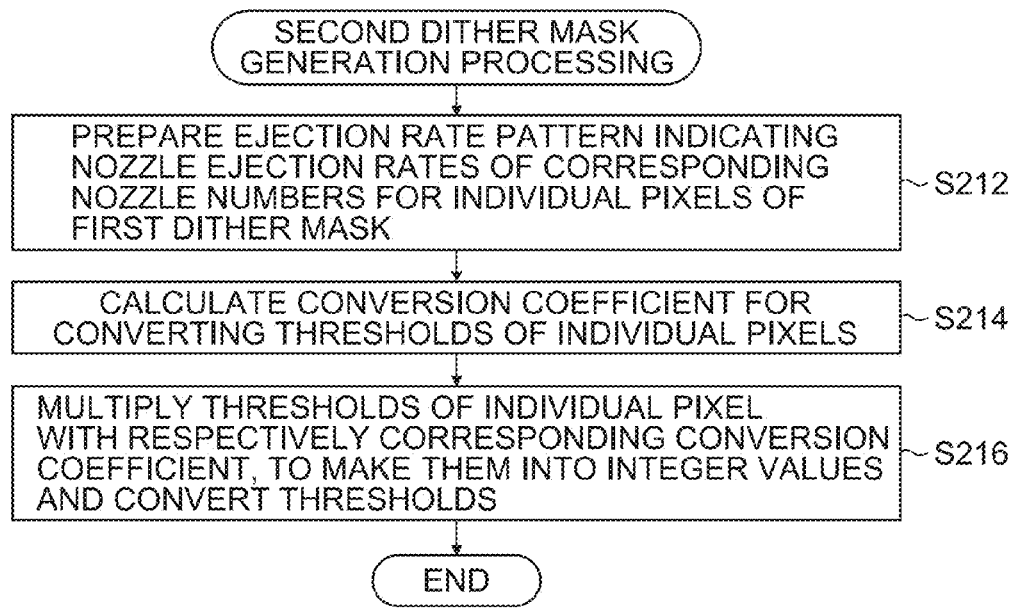
FIG. 34 is a flowchart illustrating a procedure of processing of generating a second dither mask.

FIG. 34 is a flowchart illustrating a procedure of the processing of generating the second dither mask.

First, for the individual pixels of the first dither mask, an ejection rate pattern indicating the nozzle ejection rates of the corresponding nozzle numbers is prepared (step S212). For the ejection rate pattern prepared here, the ejection rate pattern used when the first dither mask 350 is generated can be used as it is.

Next, the conversion coefficient for converting the thresholds of the individual pixels of the first dither mask 350 is calculated (step S214). For example, the conversion coefficient is calculated by the following expression (18).

$$r(x,y)/\text{Ave}\_r$$  Expression (18)

In the expression (18), reference character r(x,y) designates the nozzle ejection rate of the pixel at coordinates x,y of the dither mask. This r(x,y) corresponds to "second nozzle ejection rate".

Reference character Ave_r is an average value of the nozzle ejection rate defined by the following expression (19).

$$\text{Ave\_}r = \text{Tot\_}r/S \quad \text{Expression (19)}$$

Reference character Tot_r in the expression (19) designates the total sum of the nozzle ejection rates of all the pixels inside the dither mask defined by the following expression (20). Reference character S designates a dither mask size.

$$\text{Tot\_}r = \Sigma r(x,y) \quad \text{Expression (20)}$$

Derivation of the expression (18) is described below.

It is considered that an input value J is inputted to the dither mask and J pieces of dots are generated in a range of the dither mask size. That is, it is considered that the number of the thresholds equal to or smaller than J is J in the dither mask. This means that the input value J takes the value in the range of 0 to S, the dot is not generated in the case of the input value 0, and the dots are generated at all the pixels in the case of the input value S.

After the dither mask conversion, the dot density (here, it is the number of the dots per pixel) in all the pixels of the dither mask is equally J/S regardless of the pixel position.

On the other hand, the dot density of the individual pixels in the dither mask before the dither mask conversion is given by the following expression (21).

$$J \times r(x,y)/\text{Tot\_}r \quad \text{Expression (21)}$$

That is, while the number of the thresholds equal to or smaller than the input value J is $J \times r(x,y)/\text{Tot\_}r$ pieces per pixel in the first dither mask before the dither mask conversion, it is recognized that the number of the thresholds equal to or smaller than the input value J is J/S in the second dither mask after the dither mask conversion.

Then, it is recognized that, in order to turn the number of the thresholds per pixel equal to or smaller than the input value J to J/S pieces, the threshold before the dither mask conversion is to be multiplied with $\{J \times r(x,y)/\text{Tot\_}r\}/\{J/S\} = r(x,y)/\text{Ave\_}r$, and the expression (18) is derived.

Now, Ave_r can be modified like the following expression (22).

$$\text{Ave\_}r = \text{Tot\_}r/S = (L0+L1+L2+\ldots+LK-1)/K \quad \text{Expression (22)}$$

In the expression (22), reference characters L0, L1, L2 . . . , LK−1 designate the nozzle ejection rates of the nozzle numbers 0, 1, 2 . . . , K−1 respectively, and reference character K designates the number of the nozzles configuring the nozzle array.

Therefore, it is recognized that the conversion coefficient can be calculated not only by the expression (18) but also by the following expression (23).

$$r(x,y) \times K/(L0+L1+L2+\ldots+LK-1) \quad \text{Expression (23)}$$

Here, r(x,y) is the nozzle ejection rate of the nozzle corresponding to the coordinates x,y of the dither mask, and when correction is performed beforehand by multiplying the nozzle ejection rates L0, L1, L2 . . . , LK−1 of the individual nozzles with a correction value $\alpha_3 = K/(L0+L1+L2+\ldots+LK-1)$, the nozzle ejection rate itself of the nozzle corresponding to the coordinates x,y of the dither mask can be turned to the conversion coefficient.

The conversion coefficient indicated by the expression (18) or the expression (23) is determined according to the coordinates x,y of the pixel, and an array of the conversion coefficients corresponding to the positions of the individual pixels of the dither mask can be recognized as a conversion coefficient pattern.

Next, the thresholds of the individual pixels of the first dither mask 350 are multiplied with the conversion coefficient r(x,y)/Ave_r or $r(x,y) \times K/(L0+L1+L2+\ldots+LK-1)$ calculated in step S214 and made into integer values by being rounded off to integers or rounding down decimal places or the like, and the thresholds are converted (step S216).

By performing the threshold conversion in step S216, the second dither mask 352 is generated.

The second dither mask 352 outputs the dot arrangement of the uniform dot density for the uniform input value.

Figure 35A:
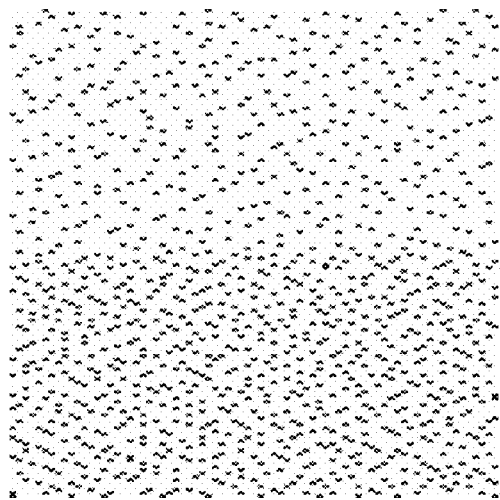
FIG. 35A is a diagram illustrating an example of output of a dot arrangement for a uniform input value of the first dither mask.
Figure 35B:
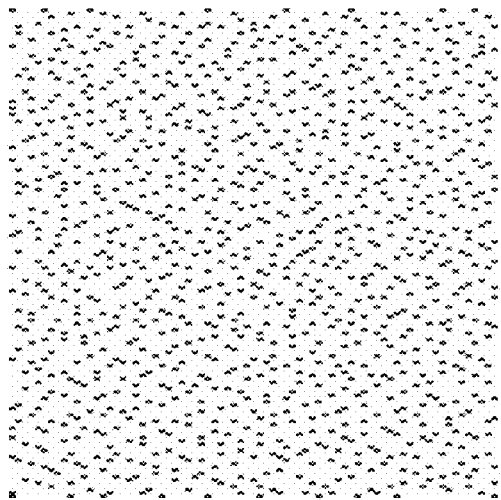
FIG. 35B is a diagram illustrating an example of output of a dot arrangement for a uniform input value of the second dither mask.

In order to help understanding, simple examples are illustrated in FIGS. 35A and 35B. Here, in order to simplify the description, as a simple example of the non-uniform dot density, the case that the dot density of a lower half of the image is double the dot density of an upper half is illustrated.

FIG. 35A illustrates the output of the dot arrangement for the uniform input value of the first dither mask generated by setting the dot density of the lower half double the dot density of an upper half image area. FIG. 35B illustrates an example of dot arrangement output for the uniform input value of the second dither mask obtained by performing the threshold conversion according to the flowchart in FIG. 34 to the first dither mask that outputs FIG. 35A.

The number of the dots in the dot arrangement in FIG. 35A and the number of the dots in the dot arrangement in FIG. 35B are equal. Also, the dot arrangement in the lower half image area in FIG. 35A includes the dot arrangement in the lower half image area in FIG. 35B. Further, the dot arrangement in the upper half image area in FIG. 35B includes the dot arrangement in the upper half image area in FIG. 35A.

That is, since some of the dots generated in the lower half image area in FIG. 35A are not generated, the dot arrangement in the lower half image area in FIG. 35B is attained. Also, by additionally generating the dots further to the dots arranged in the upper half image area in FIG. 35A, the dot arrangement in the upper half image area in FIG. 35B is attained.

As it is clear when comparing FIGS. 35A and 35B, it is recognized that the second dither mask outputs the dot arrangement of the uniform dot density for the uniform input value while including generation positions of the dots by the first dither mask.

Figure 36:
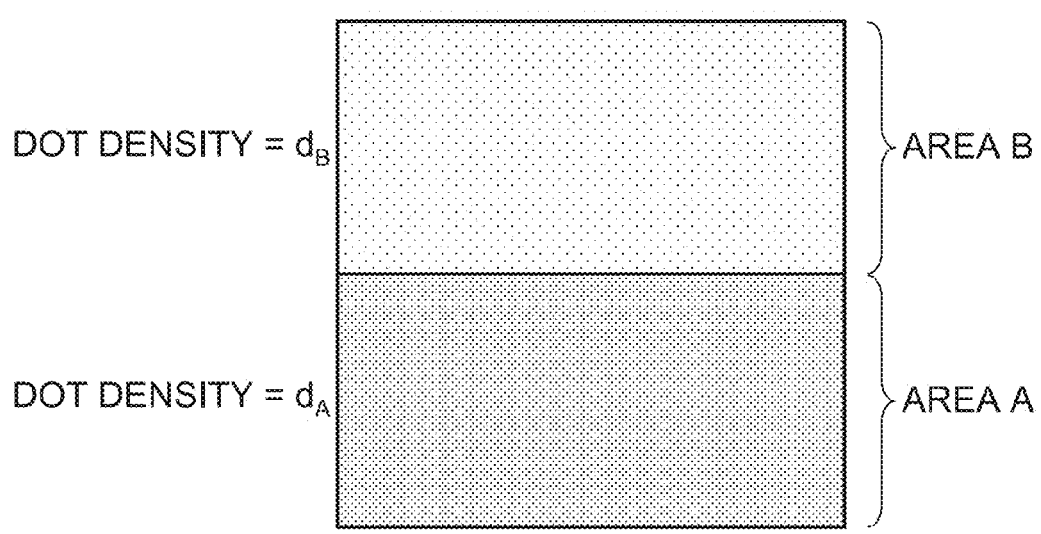
FIG. 36 is an explanatory diagram for explaining a distribution of a dot density (a ratio of the dot density) set when generating the first dither mask that outputs the dot arrangement illustrated in FIG. 35A.

FIG. 36 is an explanatory diagram for explaining the distribution of the dot density (the ratio of the dot density) set when the first dither mask that outputs the dot arrangement illustrated in FIG. 35A is generated. FIG. 36 schematically illustrates the image area equal to the size of the dither mask, and indicates the dot arrangement image for which the dot density $d_A$ of a lower half area A is double the dot density dB of an upper half area B ($d_A = 2 \times d_B$). Such a distribution of the dot density can be set by the second nozzle ejection rate.

Figure 37:
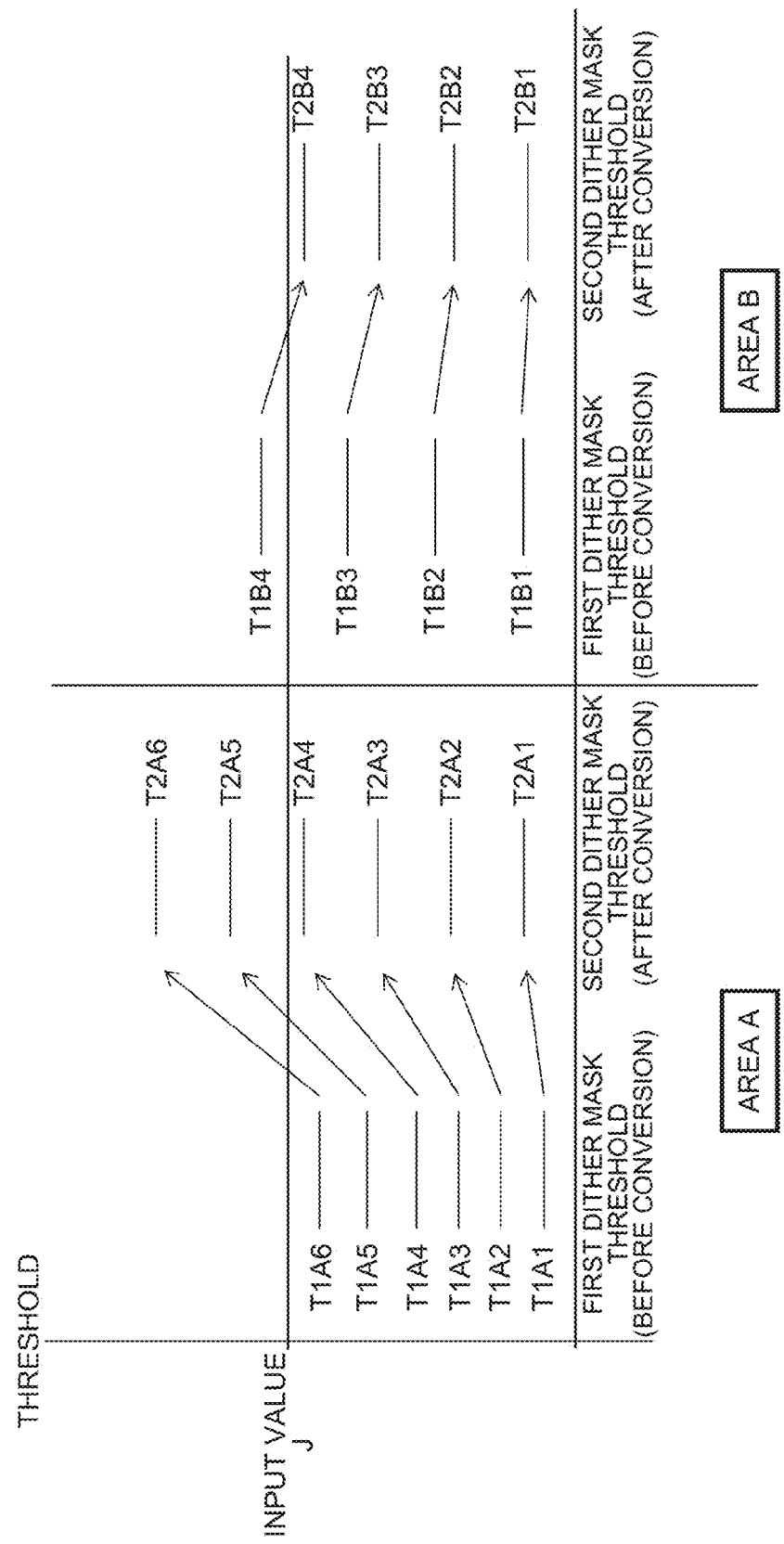
FIG. 37 is an explanatory diagram schematically illustrating processing content of threshold conversion.

FIG. 37 is an explanatory diagram schematically illustrating the relation between the thresholds of the first dither mask generated under a condition that the graininess of the dot arrangement by the distribution of the dot density illustrated in FIG. 36 becomes excellent and the thresholds of the second dither mask after the conversion of converting it. A vertical axis in FIG. 37 indicates a level of the threshold, and the value becomes larger upwards.

A left side of FIG. 37 illustrates the thresholds set to the pixels in the area A (see FIG. 36) in the dither mask, and a right side of FIG. 37 illustrates the thresholds set to the pixels in the area B (see FIG. 36) in the dither mask. The vertical axis of FIG. 37 indicates the size of the numerical value of the threshold.

FIG. 37 indicates that six thresholds smaller than the input value J exist in the area A in the first dither mask, and three thresholds smaller than the input value J exist in the area B in the first dither mask.

The six thresholds smaller than the input value J in the area A in the first dither mask are described as T1A1, T1A2, T1A3, T1A4, T1A5, and T1A6 in the ascending order. Also, the three thresholds smaller than the input value J in the area B in the first dither mask are described as T1B1, T1B2, and T1B3 in the ascending order. "T1B4" is the threshold larger than the input value J in the area B in the first dither mask. It means that, when the uniform input value J is inputted to the first dither mask, six dots are generated in the area A, and three dots are generated in the area B.

The thresholds of the second dither mask generated by performing the threshold conversion described in the flowchart in FIG. 34 to the individual thresholds (T1A1, T1A2, T1A3, T1A4, T1A5, T1A6, T1B1, T1B2, T1B3, and T1B4) of the first dither mask illustrated in FIG. 37 are described as T2A1, T2A2, T2A3, T2A4, T2A5, T2A6, T2B1, T2B2. T2B3, and T2B4.

The conversion coefficient applied to the thresholds (T1A1, T1A2, T1A3, T1A4, T1A5, and T1A6) in the area A reflects the nozzle ejection rate corresponding to the dot density $d_A$ (see FIG. 36) in the area A, and the conversion coefficient applied to the thresholds (T1B1, T1B2, T1B3, and T1B4) in the area B reflects the nozzle ejection rate corresponding to the dot density dB (see FIG. 36) in the area B.

Therefore, the thresholds (T1A1, T1A2, T1A3, T1A4, T1A5, and T1A6) in the area A are converted respectively to the thresholds (T2A1, T2A2, T2A3, T2A4, T2A5, and T2A6) in the area A in the second dither mask illustrated in FIG. 37, and the thresholds (T1B1, T1B2, T1B3, and T1B4) in the area B are converted respectively to the thresholds (T2B1, T2B2, T2B3, and T2B4) in the area B illustrated in FIG. 37.

As a result, for the second dither mask, the same number of the dots each (here, four pieces each) are generated in both of the area A and the area B for the input value J.

By a principle described in FIG. 37, the second dither mask capable of outputting the dot arrangement of the uniform dot density for the uniform input value is generated.

[Another Configuration Example of Threshold Conversion]

In the flowchart in FIG. 34, the example of calculating the conversion coefficient based on r(x,y) which is the second nozzle ejection rate according to the expression (18) or the expression (23), multiplying the individual thresholds of the first dither mask with the conversion coefficient, and converting the thresholds is described.

However, the conversion of the thresholds is not limited to the example of multiplying the individual thresholds with the conversion coefficient. For example, by preparing a function or a table indicated by the following expression (24) or the expression (25), $$F(t,r)=t \times r/\text{Ave}\_r \qquad \text{Expression (24)}$$

$$F(t,r)=t \times r \times K/(L0+L1+L2+ \ldots +LK-1) \qquad \text{Expression (25)}$$

with the threshold at the coordinates x,y of the first dither mask as t(x,y) and the second nozzle ejection rate as r(x,y), F(t(x,y),r(x,y)) is obtained as a new threshold after the conversion.

According to such a method, the thresholds can be converted just by the function or a table operation without multiplying the conversion coefficient.

Also, it is possible to adopt operation processing of dividing the individual thresholds t(x,y) by Ave_r first and multiplying r(x,y) thereafter without obtaining the conversion coefficient r(x,y)/Ave_r in advance and multiplying the individual thresholds t(x,y) with it, or to adopt operation processing of dividing the individual thresholds t(x,y) by (L0+L1+L2+ . . . +LK−1) first and multiplying r(x,y)×K thereafter without obtaining the conversion coefficient r(x, y)×K/(L0+L1+L2+ . . . +LK−1) in advance and multiplying the individual thresholds t(x,y) with it.

[Case that Multiple Nozzle Numbers Exist for Individual Pixels of Dither Mask]

In the description above, the case that there is only one nozzle ejection rate to be reflected in the generation of the dither mask respectively for the individual pixels of the dither mask is described. However, the case that there are the plurality of nozzle ejection rates for the individual pixels of the dither mask is also assumed. When the size of the dither mask coincides with a multiple of the repetition cycle in the main scanning direction and the sub scanning direction of the nozzle numbers, since there is one nozzle number corresponding to the individual pixels of the dither mask for one pixel, there is only one nozzle ejection rate to be applied to the individual pixels of the dither mask for one pixel. However, in the case that the size of the dither mask does not coincide with the multiple of the repetition cycle in the main scanning direction and the sub scanning direction of the nozzle numbers, there are the plurality of nozzle numbers corresponding to the individual pixels of the dither mask for one pixel, and as a result, there are the plurality of nozzle ejection rates to be applied to the individual pixels of the dither mask for one pixel.

Also, for example, as disclosed in Japanese Patent Application Laid-Open No. 2000-101837, even in the case of shifting the dither mask in the sub scanning direction and arranging it upon the halftone processing of the continuous gradation image, there are the plurality of nozzle ejection rates respectively for the individual pixels of the dither mask.

The first dither mask generation method in the case that there are the plurality of nozzle numbers for the individual pixels of the dither mask, that is, in the case that there are the plurality of nozzle ejection rates, is described. Here, an example of assuming processing of shifting the dither mask in the sub scanning direction and arranging it upon the halftone processing (called "mask shifting processing" in the present specification) is described.

Figure 38:
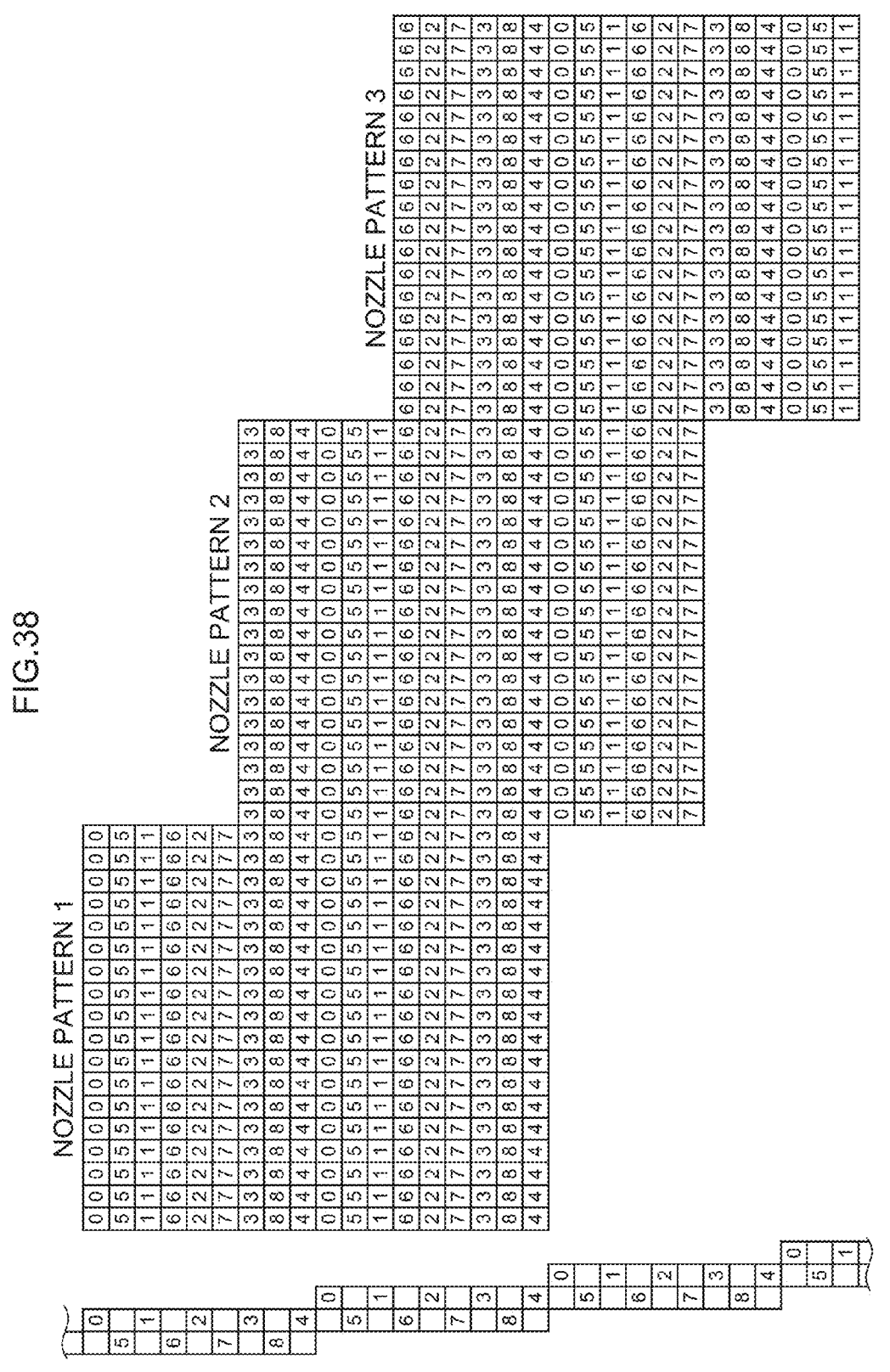

FIG. 38 is an explanatory diagram of the nozzle numbers corresponding to the individual pixels of the dither mask in the case of the mask shifting processing. FIG. 38 illustrates an example of performing scanning with one nozzle in the main scanning direction while moving the nozzle array 61A for which the nozzle pitch is two pixels and the number of the nozzles is nine in the sub scanning direction by nine pixels each, and illustrates the nozzle numbers corresponding to the individual pixels of the dither mask in the case of shifting the dither mask in the sub scanning direction by six pixels each and arranging it, in the case of changing a position in the main scanning direction and arranging the dither mask upon the application of the dither mask. In FIG. 38, a crosswise direction is the main scanning direction, and the longitudinal direction is the sub scanning direction.

As illustrated in FIG. 38, depending on the position in the main scanning direction of the dither mask, there are three kinds of the nozzle numbers corresponding to the individual pixels of the dither mask.

From the left in FIG. 38, a pattern of the nozzle numbers corresponding to the individual pixels of the dither mask at a first position in the main scanning direction of the dither mask is defined as "nozzle pattern 1". A pattern of the nozzle numbers corresponding to the individual pixels of the dither mask at a second position in the main scanning direction is defined as "nozzle pattern 2", and a pattern of the nozzle numbers corresponding to the individual pixels of the dither mask at a third position in the main scanning direction is defined as "nozzle pattern 3".

Also, it is assumed that the nozzle ejection rates of the individual nozzles in the nozzle array are set as in FIG. 18. In this case, the nozzle ejection rates corresponding to the individual pixels of the dither mask are like a graph in FIG. 39. A horizontal axis in FIG. 39 indicates a row number of the dither mask. A vertical axis indicates the nozzle ejection rate. Since the nozzle ejection rate does not change in the main scanning direction (since it is fixed), the graph in FIG. 39 indicates the nozzle ejection rates on individual lines at the individual positions in the sub scanning direction. The positions in the sub scanning direction of the individual lines are expressed by the row numbers.

Figure 39:
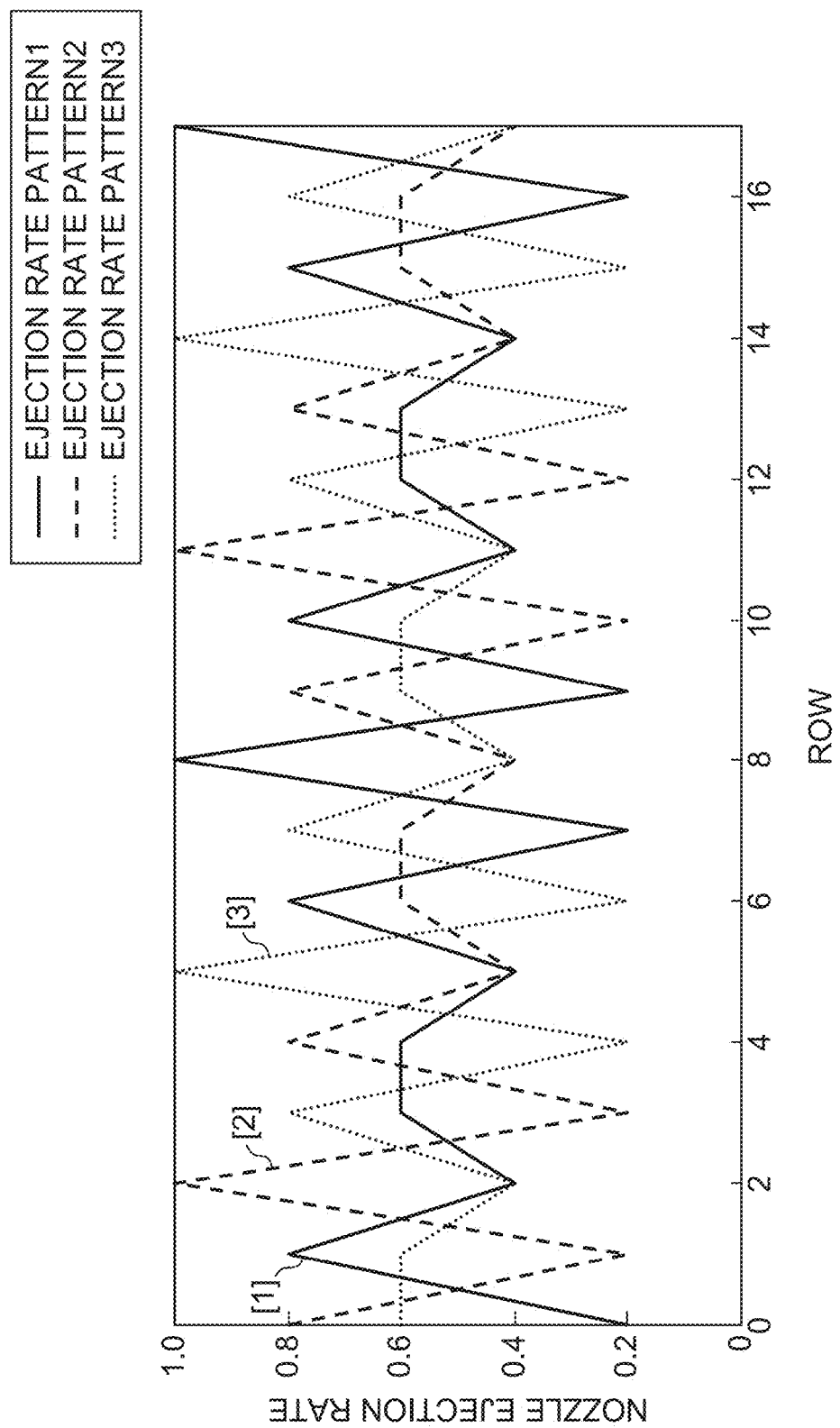
FIG. 39 is a graph illustrating an ejection rate pattern corresponding to each nozzle pattern illustrated in FIG. 38.

A graph [1] in FIG. 39 indicates a pattern of the nozzle ejection rates in the nozzle pattern 1. The pattern of the nozzle ejection rates in the nozzle pattern 1 is called "ejection rate pattern 1". A graph [2] indicates a pattern of the nozzle ejection rates in the nozzle pattern 2. The pattern of the nozzle ejection rates in the nozzle pattern 2 is called "ejection rate pattern 2".

A graph [3] indicates a pattern of the nozzle ejection rates in the nozzle pattern 3. The pattern of the nozzle ejection rates in the nozzle pattern 3 is called "ejection rate pattern 3".

Figure 40:
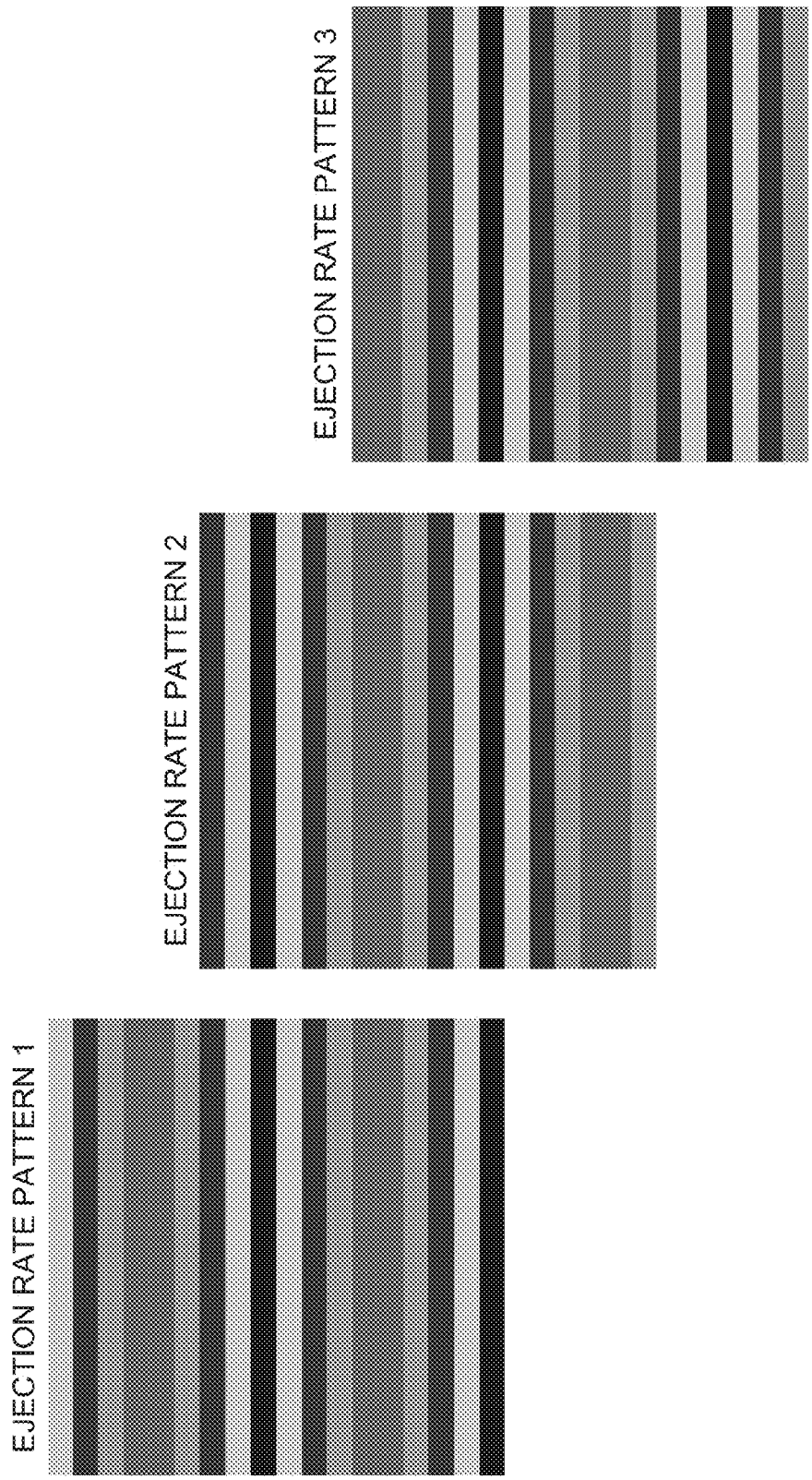
FIG. 40 is an explanatory diagram schematically illustrating values of the nozzle ejection rates in individual ejection rate patterns by shades.

FIG. 40 is an explanatory diagram schematically illustrating the values of the nozzle ejection rates in the ejection rate patterns 1, 2 and 3 by shades. A darker color indicates a larger value of the nozzle ejection rate.

Figure 41:
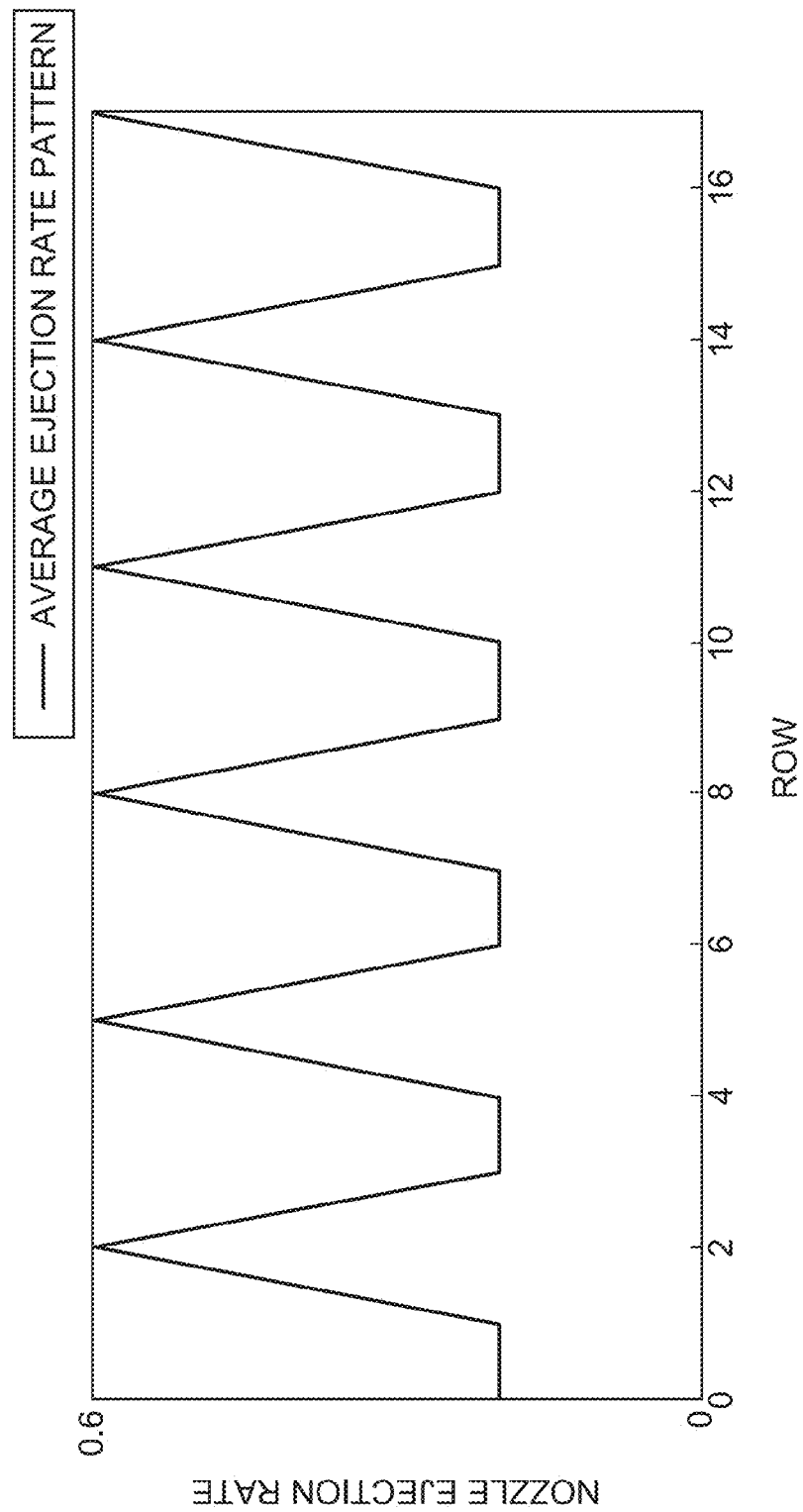
FIG. 41 is a graph of an average ejection rate pattern of three kinds of ejection rate patterns illustrated in FIG. 39 and FIG. 40.

FIG. 41 illustrates a graph of the average ejection rate pattern of the three kinds of ejection rate patterns illustrated in FIG. 39 and FIG. 40.

Figure 42:
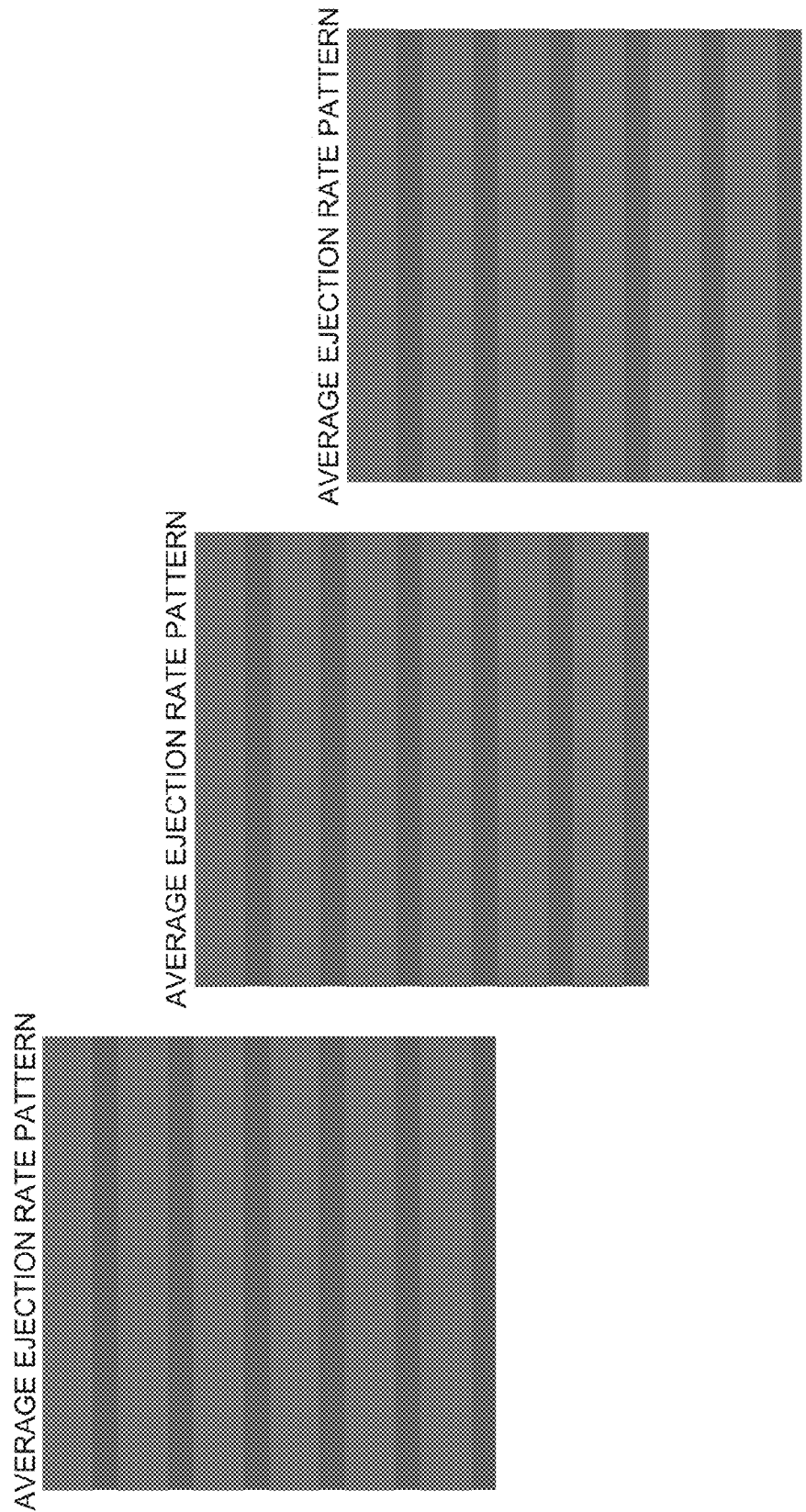
FIG. 42 is an explanatory diagram schematically illustrating the value of the nozzle ejection rate in the case of applying the average ejection rate pattern to each of the nozzle patterns illustrated in FIG. 39 by shades.

FIG. 42 is an explanatory diagram schematically illustrating the values of the nozzle ejection rates in the case of applying the average ejection rate pattern to each of the nozzle patterns 1, 2 and 3 by shades. The darker color indicates the larger value of the nozzle ejection rate.

The average ejection rate pattern illustrated in FIG. 42 is a pattern for which the nozzle ejection rates on three different lines shifted by a shift amount of the dither mask on the individual lines of the original ejection rate patterns 1, 2 and 3 described in FIG. 39 and FIG. 40 are averaged. Then, since "three different lines" are circulated depending on a shift setting condition of the dither mask, even when it is shifted and arranged in the sub scanning direction by the shift amount of the dither mask as illustrated in FIG. 42, the nozzle ejection rates of the individual lines coincide. "Shift setting condition" includes a condition of the shift amount.

Then, since the nozzle ejection rates of the individual lines do not change depending on the position in the main scanning direction of the dither mask, the nozzle ejection rates of the corresponding nozzles also do not change depending on the position in the main scanning direction of the dither mask.

Figure 43:
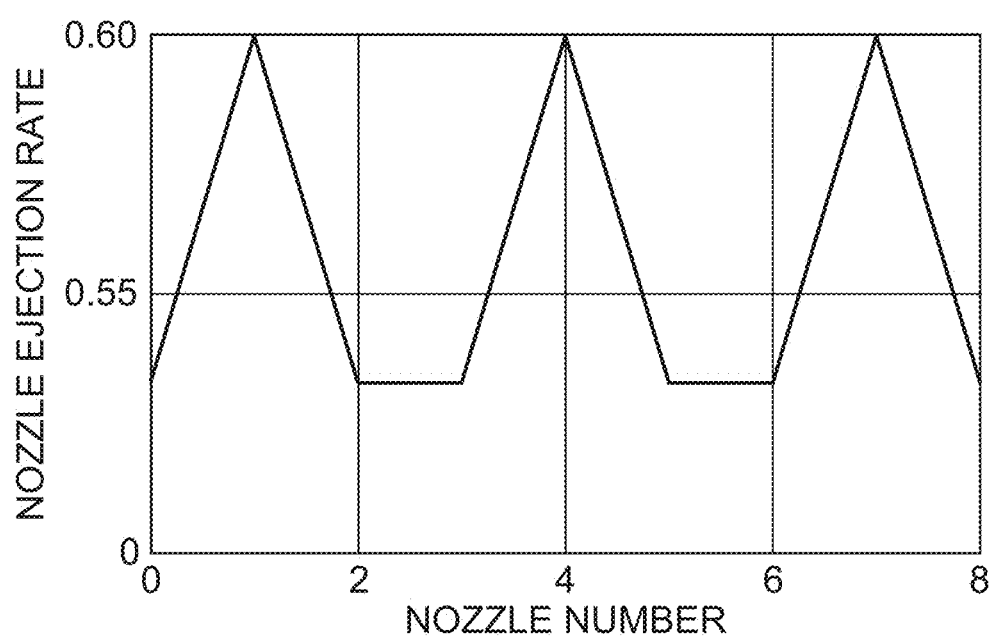
FIG. 43 is a graph illustrating the nozzle ejection rate of each nozzle derived from the average ejection rate pattern.

FIG. 43 illustrates the nozzle ejection rates of the individual nozzles derived from the average ejection rate pattern. In FIG. 43, it is recognized that it is possible to "make the nozzle ejection rate of the nozzle at the center high and the nozzle ejection rate of the nozzles at both ends low" though the nozzle ejection rates of the nozzle numbers 2, 3, 5, and 6 that are the nozzles in the middle other than the center and both ends of the nozzle array become low, differently from the initially assumed nozzle ejection rates of the individual nozzles illustrated in FIG. 18. In FIG. 43, the nozzle number is 4 for the nozzle at the center and the nozzle numbers are 0 and 8 for the nozzles at both ends.

The average nozzle ejection rate illustrated in FIG. 43 can be used as "second nozzle ejection rate". That is, upon generating the dither mask, the average nozzle ejection rate illustrated in FIG. 43 is reflected, and the dither mask with excellent graininess for the non-uniform input value reflecting the average nozzle ejection rate can be generated.

Banding can be sufficiently suppressed by reflecting the ejection rate pattern 1, 2 or 3 as the first nozzle ejection rate respectively on the gradation values of the individual pixels in the image data and converting the gradation values, and also the graininess can be improved to some extent by using the dither mask generated in this way.

As described in FIG. 38 to FIG. 43, in the case of shifting the dither mask in the sub scanning direction and performing the halftone processing, in order to generate the dither mask using the average nozzle ejection rate (see FIG. 43), there is a condition for the shift amount of the dither mask.

[About Condition for Shift Amount of Dither Mask]

Hereinafter, the condition for the shift amount of the dither mask is simply described.

When the dither mask is shifted and arranged in the sub scanning direction, depending on the shift amount, all the nozzle numbers are circulated for the nozzle numbers corresponding to the individual pixels of the dither mask. As a result, the average ejection rate pattern becomes all the same value, and an effect of suppressing banding cannot be expected. A condition of circulating all the nozzle numbers is as follows.

<<Condition of Circulating all Nozzle Numbers>>

All the nozzle numbers are circulated "in the case that the size in the sub scanning direction of the dither mask is defined as m, the shift amount in the sub scanning direction of the dither mask is defined as p, and p or m-p is equal to the nozzle pitch or a divisor of the nozzle pitch".

Provided that, m and p are positive integers whose unit is a pixel size determined from the recording resolution in the sub scanning direction, m is an integer equal to or larger than 2, and p is an integer equal to or larger than 1 and smaller than m. Also, the nozzle pitch is indicated by a positive integer whose unit is the pixel size determined from the recording resolution in the sub scanning direction.

Figure 44:
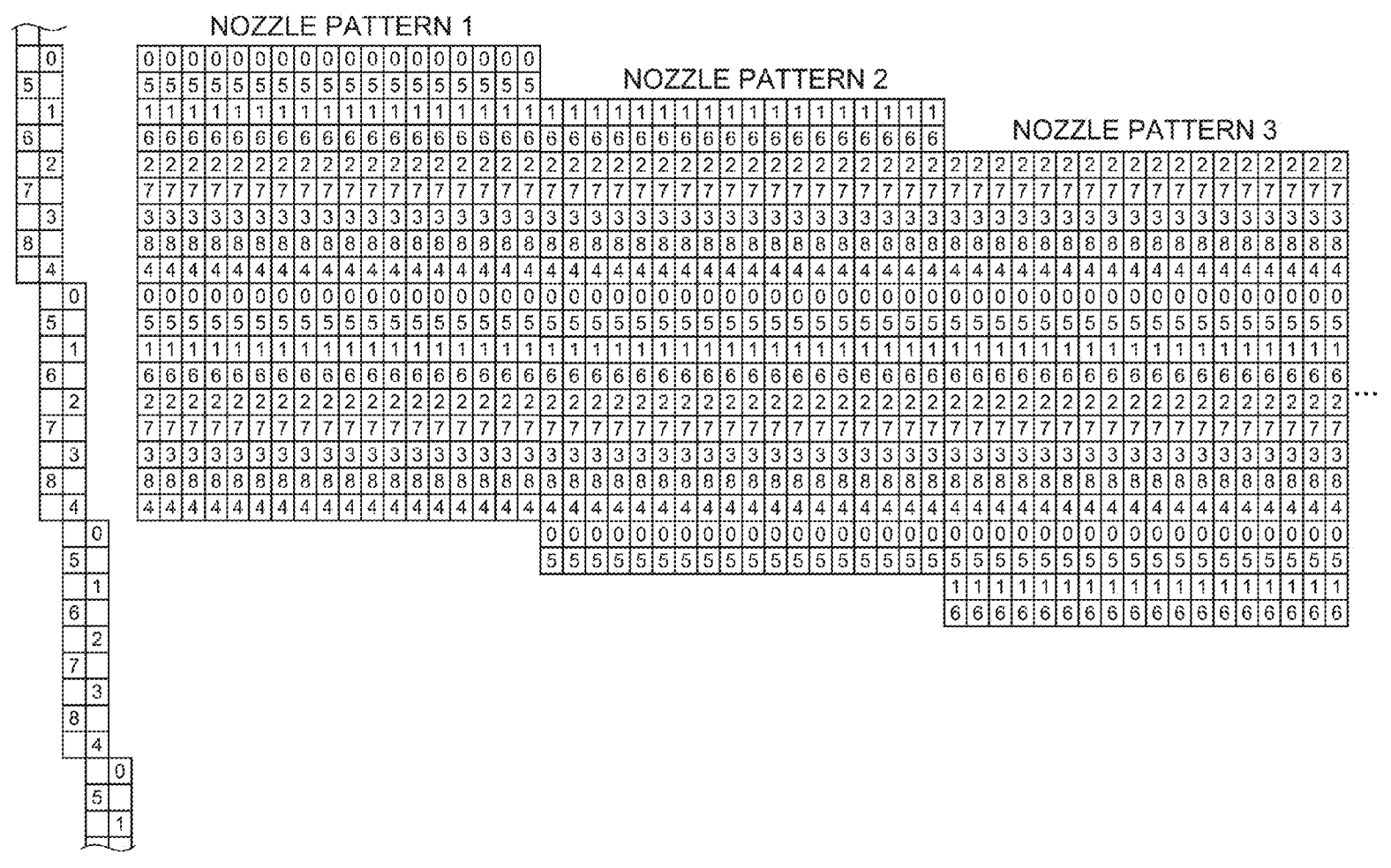
Figure 45:
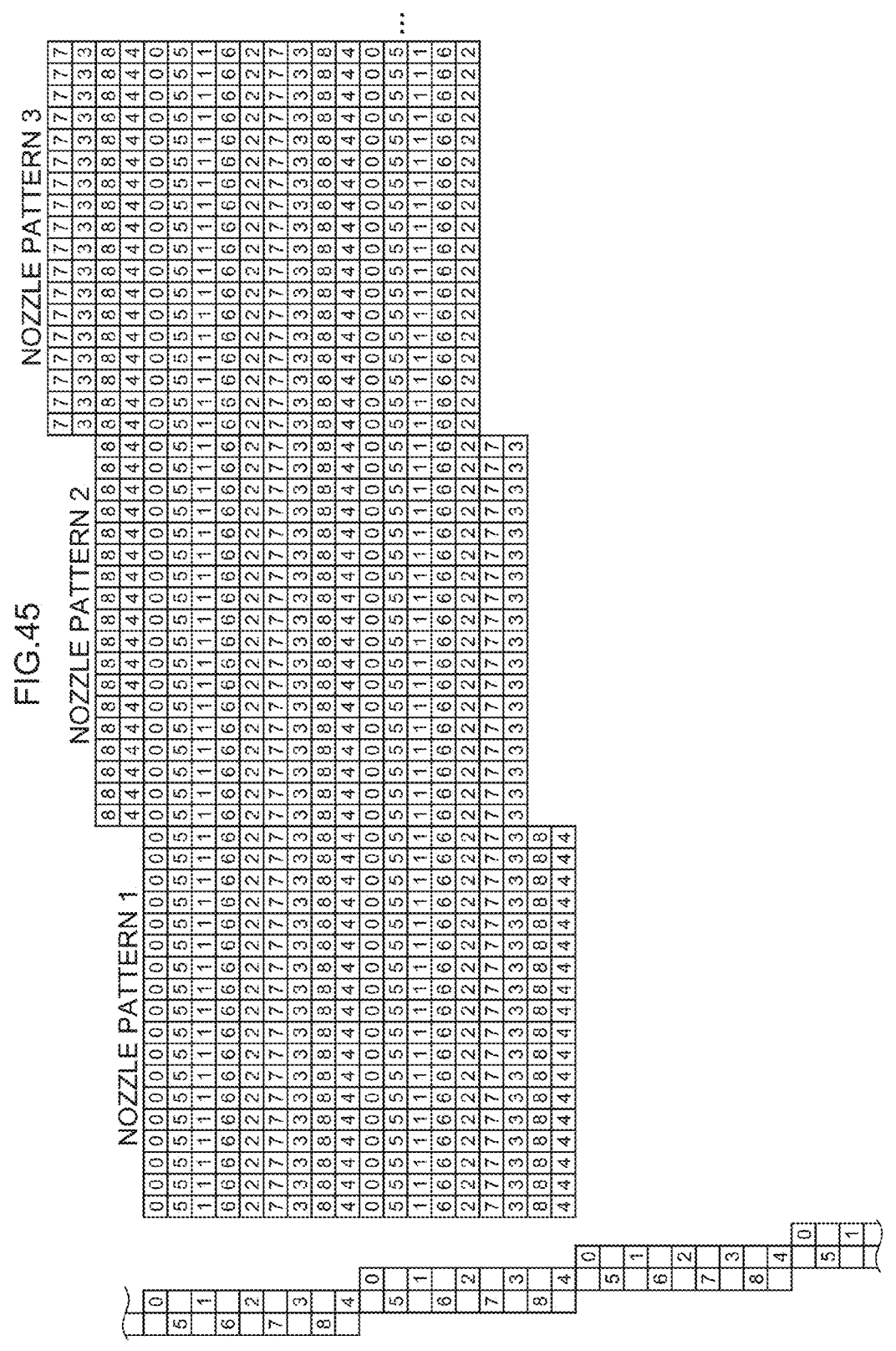

FIG. 44 and FIG. 45 are explanatory diagrams illustrating an example of the case of satisfying the condition of circulating all the nozzle numbers. FIG. 44 illustrates the case that the shift amount of the dither mask is "2". FIG. 45 illustrates the case that the shift amount of the dither mask is "16". The shift amount is noted assuming that the dither mask is shifted in a lower direction in FIG. 44.

Also, " . . . " indicated on the right side of the nozzle pattern 3 in FIG. 44 and FIG. 45 indicates that a nozzle pattern 4, a nozzle pattern 5 . . . continue on the right side of the nozzle pattern 3.

For example, in the case of the scanning pattern described in FIG. 38, as illustrated in FIG. 44, when the shift amount is equal to "2" of the nozzle pitch, it is recognized that the nozzle numbers corresponding to the individual pixels of the individual nozzle patterns are circulated through all the nozzles (0 to 8).

Or, as illustrated in FIG. 45, in the case that a value for which the shift amount "16" is subtracted from the size "18"

in the sub scanning direction of the dither mask is equal to "2" of the nozzle pitch, it is recognized also that the nozzle numbers corresponding to the individual pixels of the individual nozzle patterns are circulated through all the nozzles (0 to 8).

In the case of FIG. 45, the shift amount of the dither mask is "16" in the lower direction in the figure, however, it can be also recognized that the shift amount is "2" in an upper direction of FIG. 45. No matter which interpretation is adopted, it is clear that it is pertinent to the condition of circulating all the nozzle numbers.

When the shift amount of the dither mask is called a mask shift amount and the size in the sub scanning direction of the dither mask is called a mask size, even if "mask shift amount" or "mask size-mask shift amount" does not coincide with the nozzle pitch, when it is equal to the divisor of the nozzle pitch (in the case of this example, when it is equal to 1 which is the divisor of the nozzle pitch "2"), it is easily recognized from arrangement diagrams like FIG. 44 and FIG. 45 that the nozzle numbers corresponding to the individual pixels of the individual nozzle patterns are circulated through all the nozzles (0 to 8) similarly.

Also, while this example is an example that the number of main scanning paths, that is, the number of overlaps in the main scanning direction, is "1", regardless of the number of the main scanning paths, the condition of circulating all the nozzles is satisfied.

From the above observations, a condition of the shift amount of the dither mask for controlling the nozzle ejection rates of the individual nozzles while shifting the dither mask in the sub scanning direction is as follows.

<<Condition of Shift Amount of Dither Mask>>

"The size in the sub scanning direction of the dither mask is defined as m, the shift amount in the sub scanning direction of the dither mask is defined as p, and p or m-p is different from the nozzle pitch and a divisor of the nozzle pitch".

Provided that, m and p are positive integers whose unit is the pixel size determined from the recording resolution in the sub scanning direction, m is an integer equal to or larger than 2, and p is an integer equal to or larger than 1 and smaller than m. Also, the nozzle pitch is indicated by a positive integer whose unit is the pixel size determined from the recording resolution in the sub scanning direction.

When the shift amount p of the dither mask satisfies such a condition, the nozzle numbers corresponding to the individual nozzle patterns are circulated only through some nozzle numbers. Therefore, by generating the dither mask with excellent graininess for the non-uniform input value reflecting the average ejection rate pattern, the ejection rate pattern 1, 2 or 3 different from the average ejection rate pattern is reflected respectively as the first nozzle ejection rate on the gradation values of the individual pixels in the image data, the gradation values are converted, and thus, banding is sufficiently suppressed, and the graininess can be made excellent to some extent.

Hereinafter, processing of generating the first dither mask reflecting "average ejection rate pattern" described above as the second nozzle ejection rate in the case of shifting and arranging the dither mask is specifically described. By using "average ejection rate pattern" described above for the ejection rate pattern used in the first example and the second example, the first dither mask can be generated.

Fourth Example

Figure 46:
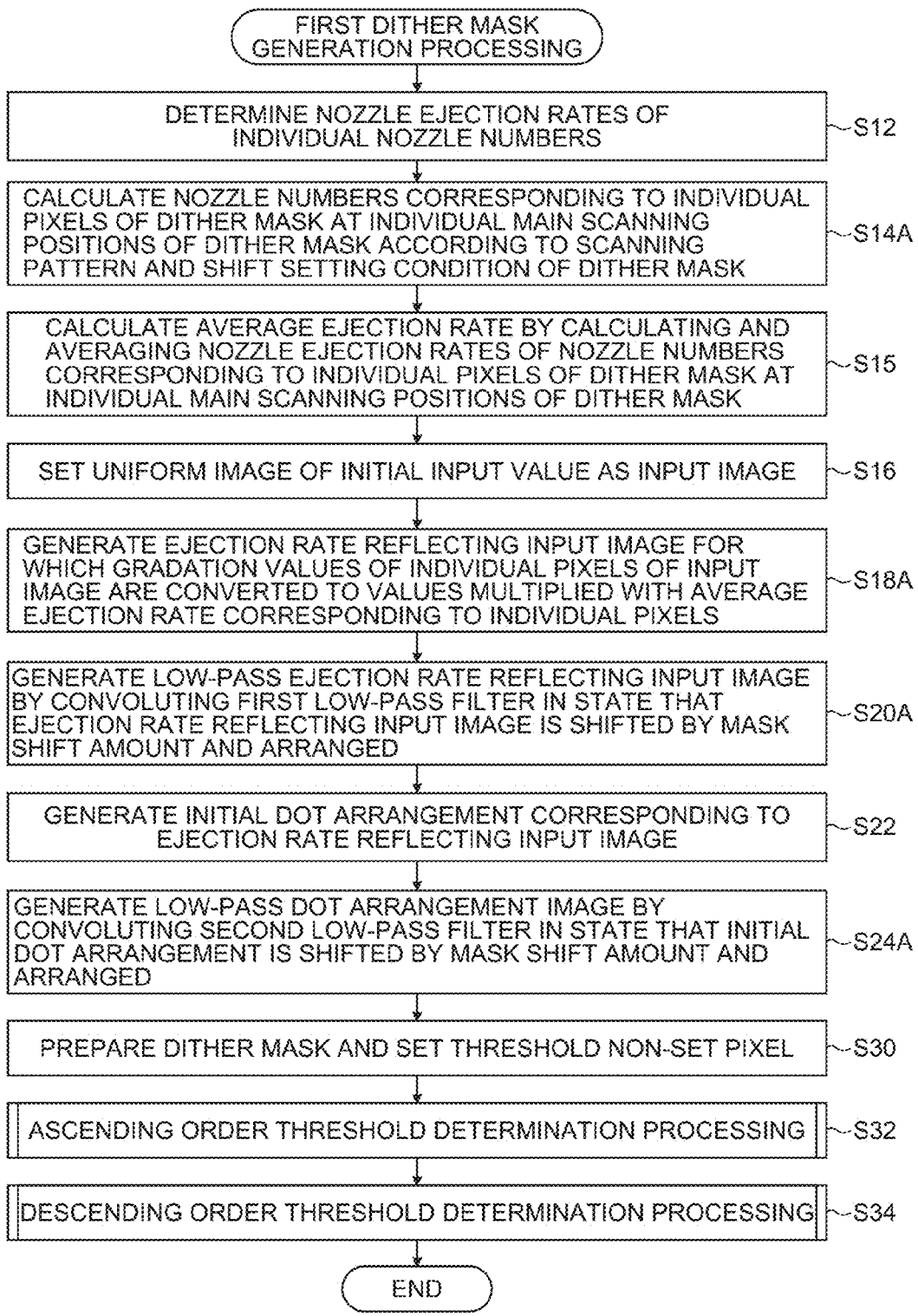
FIG. 46 is a flowchart illustrating a fourth example of the processing of generating the first dither mask.

The fourth example is a form of coping with the mask shifting processing for the example described in the first example. FIG. 46 is a flowchart illustrating the fourth example of the processing of generating the first dither mask 350. In FIG. 46, the same step numbers are attached to the processes same as or similar to that in the flowchart described in FIG. 16, and the description is omitted.

In FIG. 46, instead of step S14 in FIG. 16, a process of step S14A is adopted, and a process of step S15 is added further. Also, in FIG. 46, instead of the individual processes of steps S18, S20 and S24 in FIG. 16, processes of steps S18A, S20A and S24A are adopted.

In step S14A in FIG. 46, according to the scanning pattern and the shift setting condition of the dither mask, the nozzle numbers corresponding to the individual pixels of the dither mask are calculated at individual main scanning positions of the dither mask. Provided that, "individual main scanning positions" here mean only the main scanning positions where the relation between the individual pixels and the nozzle numbers is different. Even in the case that the main scanning positions are different, regarding the main scanning positions where the relation between the individual pixels and the nozzle numbers is the same, it is not needed to redundantly calculate the nozzle numbers corresponding to the individual pixels of the dither mask. "Main scanning position" means the position in the main scanning direction.

Next, in step S15, at the individual main scanning positions of the dither mask, the nozzle ejection rates of the nozzle numbers corresponding to the individual pixels of the dither mask are calculated, they are averaged, and the average ejection rate is calculated. The average ejection rate corresponds to "average ejection rate pattern" described in FIG. 41.

In step S18A in FIG. 46, the ejection rate reflecting input image, for which the gradation values of the individual pixels of the input image are converted to the values multiplied with the average ejection rate corresponding to the individual pixels, is generated.

Then, in step S20A, in the state that the ejection rate reflecting input image is shifted by the mask shift amount and arranged, the first low-pass filter is convoluted and the low-pass ejection rate reflecting input image is generated.

Also, in step S24A, in the state that the initial dot arrangement is shifted by the mask shift amount and arranged, the second low-pass filter is convoluted and the low-pass dot arrangement image is generated.

The initial dot arrangement in step S22 can be, as already described, obtained by executing the halftone processing such as a known dither method, an error diffusion method or a DBS method. At the time, in the case of the dither method, it is preferable to use the dither mask generated in consideration of the mask shifting processing, as the dither mask to be used. The dither mask generation method of generating the dither mask in consideration of the mask shifting processing is disclosed in Japanese Patent Application Laid-Open No. 2000-101837 for instance. Also, in the case of using the DBS method for generating the initial dot arrangement, the halftone processing of the DBS method is executed in consideration of the mask shifting processing.

Figure 47:
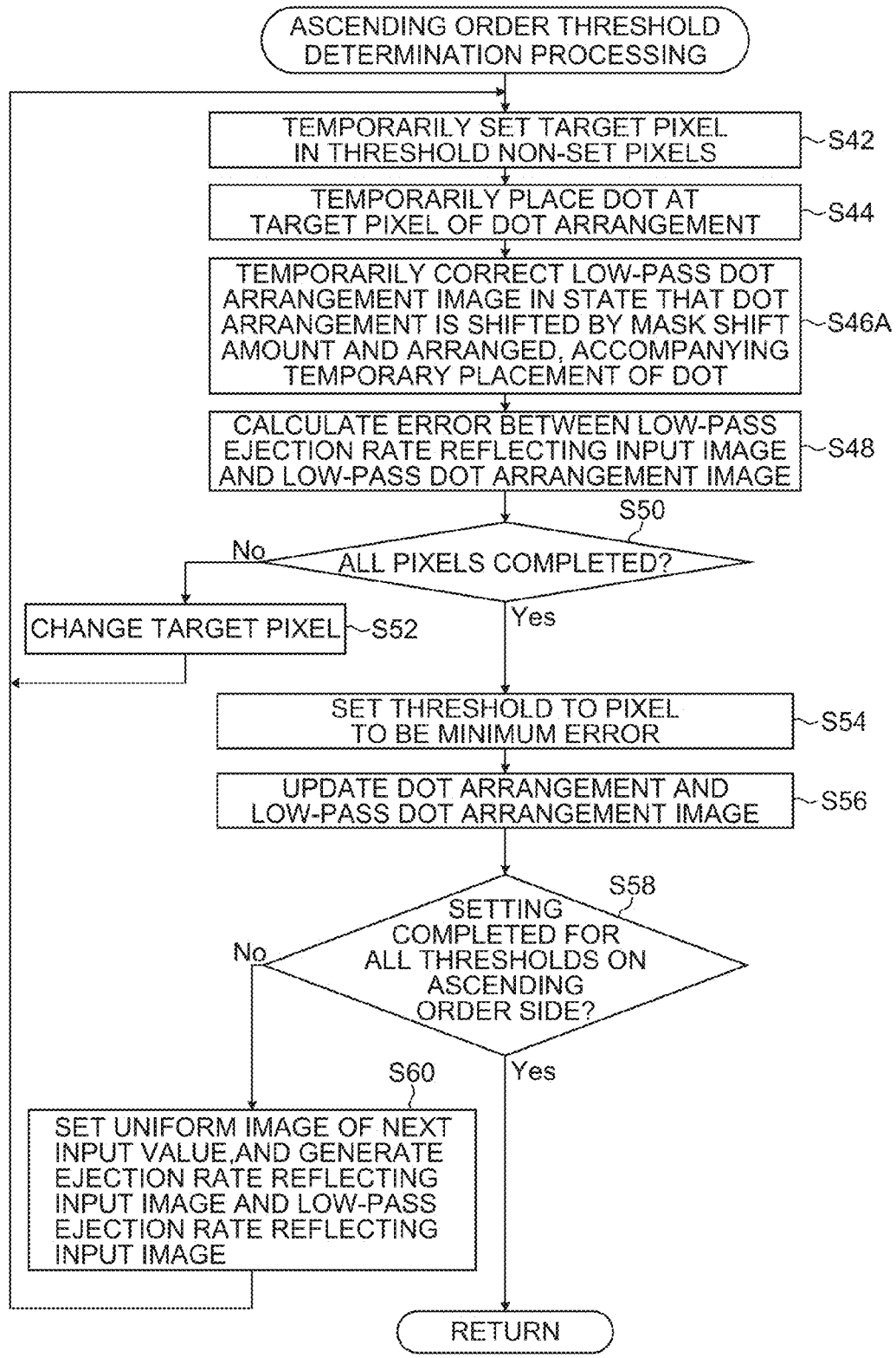
FIG. 47 is a flowchart of ascending order threshold setting processing in the fourth example.

FIG. 47 is a flowchart illustrating a procedure of the ascending order threshold setting processing in the fourth example. In FIG. 47, the same step numbers are attached to the processes same as or similar to that in the flowchart described in FIG. 23, and the description is omitted.

In FIG. 47, instead of step S46 in FIG. 23, a process of step S46A is adopted.

In step S46A in FIG. 47, the low-pass dot arrangement image is temporarily corrected in the state of shifting the dot arrangement by the mask shift amount and arranging it accompanying temporary placement of the dots.

Though the description relating to the descending order threshold setting processing is omitted, instead of step S76 in FIG. 26, the low-pass dot arrangement image is temporarily corrected in the state of shifting the dot arrangement by the mask shift amount and arranging it accompanying temporary removal of the dots. The other processes are similar to the first example.

Fifth Example

The fifth example is a form of coping with the mask shifting processing for the example described in the second example.

The first dither mask generation method relating to the fifth example is achieved by a combination of the flowchart illustrated in FIG. 46 and the flowchart of the second example described in FIG. 29.

However, in step S106 of FIG. 29, the low-pass dot arrangement image is updated in the state of shifting the dot arrangement by the mask shift amount and arranging it. Since content of the other processes is already described, the description is omitted.

As described using FIG. 38 to FIG. 47, even in the case that the dither mask is shifted in the sub scanning direction and arranged, and there are the plurality of nozzle numbers corresponding to the individual pixels of the dither mask, the first dither mask can be generated using the average nozzle ejection rate.

Without being limited to the case of shifting and arranging the dither mask, in the case that there are the plurality of nozzle numbers corresponding to the individual pixels of the dither mask, the first dither mask can be generated similarly.

As described in the fourth example and the fifth example, in the case of generating the first dither mask 350 using the average nozzle ejection rate, the method of generating the second dither mask 352 by converting the threshold of the first dither mask 350 is similar to the example already described in FIG. 34, and just the average nozzle ejection rate is used when converting the threshold.

In this way, when the dither mask is generated, it is generated reflecting the average ejection rate pattern, however, on the image data in the case of performing the halftone processing using the generated dither mask, the ejection rate pattern 1, 2 or 3 is reflected respectively according to the image position.

That is, as described in the flowchart in FIG. 12, on the input value in the case of performing the halftone processing reflecting the first nozzle ejection rate on the input value, the ejection rate pattern 1, 2 or 3 is reflected according to the image position to apply the dither mask.

That is, depending on the position where the second dither mask 352 is arranged on the image after conversion converted by the conversion unit 310, the first nozzle ejection rate to be reflected on the gradation values of the individual pixels of the image corresponding to the individual pixel positions of the second dither mask 352 becomes different.

Sixth Example

For a halftone processing technique described in the present embodiment, one of features is a point that it separates "generating the dither mask with excellent graininess for the non-uniform input value reflecting the nozzle ejection rate, that is, in the state of the non-uniform dot density" and "controlling the nozzle ejection rate by the input value".

Thus, as described in FIG. 38 to FIG. 47, even in the case that the dither mask is shifted and arranged or the like and there are the plurality of nozzle numbers for the individual pixels of the dither mask, banding can be suppressed while making the graininess be excellent to some extent.

Also, even in the case of sharing one dither mask in a plurality of print modes, for example, for the scanning patterns of different resolutions, dot kinds and relation between the individual pixels and the nozzle numbers due to memory limitation or the like, the average ejection rate pattern is reflected on the dither mask, the one with the excellent graininess is generated, and the nozzle ejection rate can be controlled by the input value according to the individual print modes.

Figure 48:
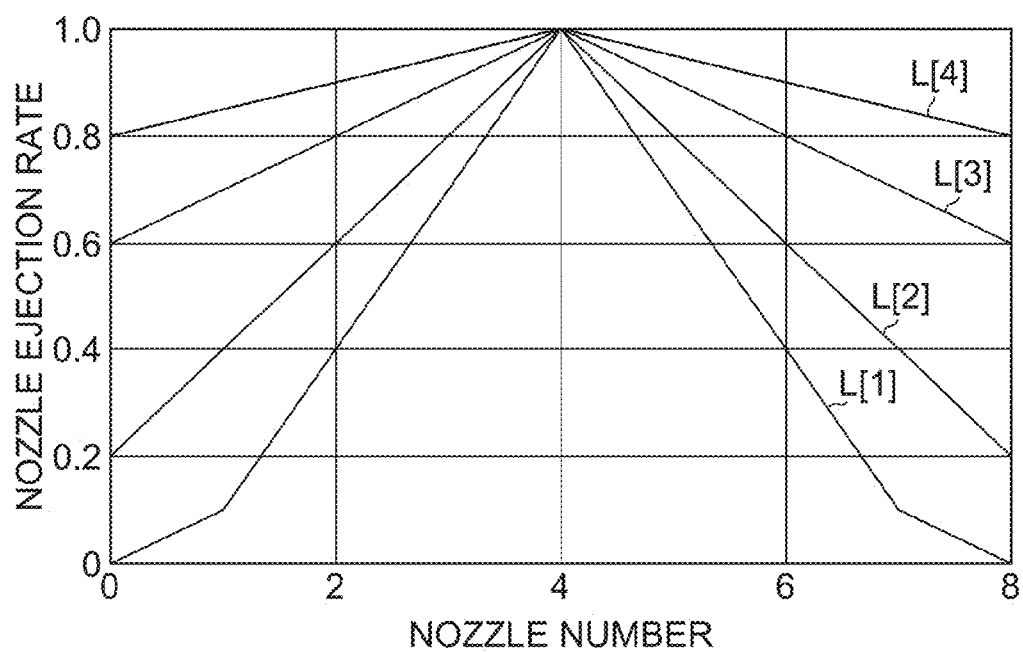
FIG. 48 is a graph illustrating an example of data of two or more kinds of nozzle ejection rates.

For example, as illustrated in FIG. 48, it is considered that the data of the plurality of kinds of nozzle ejection rates is prepared according to the print modes.

In the print mode in which the dot diameter is large for the resolution, since sufficient print density can be obtained even at a low recording duty, a nozzle ejection rate L[1] in a graph in FIG. 48 is reflected on the input value and importance is placed on banding suppression.

Also, in the print mode in which the dot diameter is small for the resolution, since the sufficient print density cannot be obtained without a certain level of the recording duty, a nozzle ejection rate [4] of the recording duty capable of obtaining the print density in the graph in FIG. 48 is reflected on the input value, and banding is suitably suppressed.

In this way, while changing the first nozzle ejection rate to be reflected on the input value depending on the print mode, when the dither mask is generated, the dither mask for making the graininess be excellent may be generated reflecting L[2] which is the average nozzle ejection rate among four kinds of the nozzle ejection rates L[1], L[2], L[3] and L[4] illustrated in FIG. 48.

Also, the dither mask is generated with excellent graininess by a standard ejection rate pattern, and the ejection rate pattern to be reflected on the input value may be changed adaptively according to the level of banding and graininess. For example, banding and graininess may be measured for each model or every time of a print test, the nozzle ejection rate of the nozzle at the end of the nozzle array may be changed so as to be lower than the standard in the case that banding is conspicuous, and the ejection rate pattern close to the standard may be reflected on the input value in the case that graininess is low.

In short, the configuration can be such that the first nozzle ejection rate to be reflected on the gradation values of the individual pixels of the image is changed according to at least one of the print mode, the level of banding and the level of graininess, and the second nozzle ejection rate to be reflected on the second dither mask 352 is made the same regardless of at least one of the print mode, the level of banding and the level of graininess.

<Relation Between First Nozzle Ejection Rate and Second Nozzle Ejection Rate>

As described in FIG. 39 and FIG. 40 in the fourth example and the fifth example, the respective ejection rate patterns 1, 2 and 3 corresponding to the first nozzle ejection rate to be reflected on the input value are the patterns similar to each other. Also, as described in FIG. 41 to FIG. 43, the average ejection rate pattern corresponding to the second nozzle ejection rate to be reflected when the dither mask is generated indicates an average characteristic of the ejection rate patterns 1, 2 and 3, and is the pattern roughly similar to the individual ejection rate patterns 1, 2 and 3.

Also, in the sixth example, as described in FIG. 48, in the case of the configuration that the plurality of kinds of nozzle ejection rate are prepared and the data (that is the ejection rate pattern) of the first nozzle ejection rate to be reflected on the input value is switched according to the condition of the print mode or the like, application candidates of the plurality of kinds of nozzle ejection rates are all in common at the point that the nozzle ejection rate of the nozzle at the end of the nozzle array is set at the value relatively smaller than the nozzle ejection rate of the nozzle at the center, and the individual nozzle ejection rates L[1] to L[4] are the patterns similar to each other respectively. Then, for the second nozzle ejection rate to be reflected on the generation of the dither mask, one nozzle ejection rate L[2] averagely representing the plurality of kinds of the nozzle ejection rates L[1]-L[4] to be the application candidates, an average ejection rate of the nozzle ejection rates L[1] to L[4], or a separately determined standard nozzle ejection rate is used.

That is, for the second nozzle ejection rate to be reflected when the dither mask is generated, compared to the first nozzle ejection rate to be reflected on the input value, the one to be the ejection rate pattern that is similar to some extent is used. In this way, by using the dither mask (second dither mask) generated reflecting the second nozzle ejection rate, and reflecting the first nozzle ejection rate that is the same as the second nozzle ejection rate or similar to the second nozzle ejection rate on the input value, suitably excellent graininess can be secured while achieving a target banding suppressing effect.

An allowable range of similarity between "the first nozzle ejection rate to be reflected on the input value" and "the second nozzle ejection rate to be reflected on dither mask generation" can be determined as follows.

When "the first nozzle ejection rate to be reflected on the input value" and "the second nozzle ejection rate to be reflected on dither mask generation" are similar, the dispersibility of the dot data generated by inputting the input value reflecting the first nozzle ejection rate to the dither mask reflecting the second nozzle ejection rate and performing the halftone processing becomes excellent compared to the dispersibility of the dot data generated by performing the halftone processing in the case of turning the ejection rates of all the nozzles to "1.0" (the nozzle ejection rate is not reflected) for one of the first nozzle ejection rate and the second nozzle ejection rate (with the maximum gradation as 100%, it becomes excellent at least in the middle gradation range nip roller 40 to 60%).

That is, compared to the dispersibility of the dot data generated by performing the halftone processing in the case of not reflecting the nozzle ejection rate on the dither mask (the second nozzle ejection rate is "1.0" for all the nozzles) and reflecting the nozzle ejection rate (first nozzle ejection rate) only on the input value, or in the case of reflecting the nozzle ejection rate (second nozzle ejection rate) only on the dither mask and not reflecting the nozzle ejection rate on the input value (the first nozzle ejection rate is "1.0" for all the nozzles), the dispersibility of the dot data generated by reflecting the nozzle ejection rate (the similar first nozzle ejection rate and second nozzle ejection rate) on both of the dither mask and the input value and performing the halftone processing becomes more excellent.

"Excellent dispersibility" indicates a state that distances between the individual dots that are close are uniform, and for example, indicates a state that a value for which the dot data is multiplied with the visual transfer function (VTF) that is a function indicating the human visual characteristic and then RMS (root mean square) graininess is calculated is small. The RMS graininess is a square root of the mean square of density variation, and is indicated by the following expression.

$$\mathrm{SQRT}(\Sigma (Di - D\_\mathrm{ave})^2 / (N-1))$$

Here, reference character SQRT( ) designates a function of obtaining the square root of a numerical value specified by an argument described inside ( ). Reference character Di designates the density of the individual pixels. Reference character D_ave designates a density average. Reference character N designates the number of the pixels. Reference character $\Sigma(Di-D\_\mathrm{ave})^2$ designates the total sum of all the pixels of $(Di-D\_\mathrm{ave})^2$.

[Other Modifications]

In the embodiment described above, as the inkjet recording device, the example of the wide format printer that uses the ultraviolet curing type ink is described, however, the presently disclosed subject matter can be applied not only to the one that uses the ultraviolet curing type ink but also to various kinds of inkjet recording devices that record images on the recording medium using various kinds of ink.

Also, in the first example to the sixth example, in order to suppress banding generated when the image is recorded by the serial type recording head, the nozzle ejection rates of the nozzles at both ends of the nozzle array are set lower than the nozzle ejection rate of the nozzle at the center part of the nozzle array, however, the nozzle ejection rates of the individual nozzles may be appropriately changed according to the kind or recording system of the recording head.

Also, in the first example to the sixth example, the example of the inkjet recording device having the serial type recording head is described, however, in applying the invention, the inkjet recording device to be a target is not limited to the serial type. The presently disclosed subject matter can be applied also to the inkjet recording device having a single path type recording head.

Seventh Example

FIG. 49A is a schematic diagram of a single path type recording head 400. FIG. 49B is a graph illustrating the nozzle ejection rates of the individual nozzles 62 of the recording head 400.

The single path type recording head 400 is a line head having a structure for which a plurality of head modules HA, HB and HC are connected in the main scanning direction. In FIGS. 49A and 49B, for the individual head modules HA, HB and HC, the number of the nozzles 62 configuring the nozzle array in the main scanning direction is defined as "20", however, the number of the nozzles and an array form of the nozzles 62 are not limited to this example.

The recording head 400 is provided with a superimposing area of the nozzle array in order to smooth joints of the plurality of head modules HA. HB and HC and to make the error of a dot forming position and an ejection amount generated at the ends of the individual head modules HA, HB and HC inconspicuous.

That is, as illustrated in FIG. 49A, the recording head 400 is provided with the superimposing area of the head module HA and the head module HB, and the superimposing area of the head module HB and the head module HC. In the individual superimposing areas, the dots are formed by alternately using the nozzles 62 of the head module HA and the head module HB, and the head module HB and the head module HC in the sub scanning direction.

However, due to the difference in the nozzle position and the ejection amount between the head module HA and the head module HB, and the head module HB and the head module HC, image defects such as stripes and irregularity in the superimposing areas or the density irregularity in the individual head module cycles are generated.

For this problem, as illustrated in FIG. 49B, in the superimposing area, the nozzle ejection rate is set smaller near the nozzle 62 at the end of the head module. Then, when the dither mask is generated, the nozzle ejection rate illustrated in FIG. 49B is reflected and the threshold is determined.

For the specific dither mask generation method, the method similar to the method described in the first example to the sixth example can be used.

Using the dither mask obtained in this way, according to the flowchart in FIG. 12, the halftone processing of the image data for printing is performed, and the ejection of the individual nozzles of the recording head 400 is controlled on the basis of the generated halftone image. Thus, generation of the image defects such as the stripes and the irregularity can be suppressed.

<About Program that Makes Computer Function as Image Processing Device>

It is possible to record a program for making a computer realize an image processing function described in the embodiment described above in a computer readable medium (a non-temporary information storage medium that is a tangible object) such as a CD-ROM (Compact Disc read-only memory) or a magnetic disk, and provide the program through the information storage medium. Instead of such a form of storing and providing the program in the information storage medium, it is also possible to provide a program signal as a downloading service by utilizing a communication network like the Internet.

Also, it is also possible to provide some or all of a dither mask generation function and a halftone processing function described in the above-described embodiment as an application server and perform a service of providing the processing function through the communication network.

Further, by incorporating the program in a computer, the computer can be made to realize the individual functions of the image processing device, and the image processing function including the dither mask generation function and the halftone processing function described in the above-described embodiment can be realized.

Also, a form of incorporating some or all of the program for achieving printing control including the image processing function described in the present embodiment in a high-order controller such as a host computer, and application as an operation program of a central processing unit (CPU) on an inkjet recording device side are also possible.

<Advantages of Embodiment>

According to the embodiment of the presently disclosed subject matter, the nozzle ejection rate can be controlled by the input value, and the dot data of the dot arrangement with excellent graininess for the non-uniform input value reflecting the nozzle ejection rate can be obtained. Also, according to the embodiment of the presently disclosed subject matter, the second dither mask used in the halftone processing can output the dot arrangement with the excellent graininess suitably for the non-uniform input value reflecting the other first nozzle ejection rate that is the same as the second nozzle ejection rate or similar to it.

By executing the halftone processing using the second dither mask generated by the present embodiment and controlling the ejection of the ink based on the obtained dot data (halftone image), the excellent image for which banding is suppressed can be formed.

According to the embodiment of the presently disclosed subject matter, even when there is one nozzle capable of recording the dot to each pixel, since ejection control of the individual nozzles is possible, excessive scanning is not needed, and thus productivity is not lowered.

According to the present embodiment, the generation of the density irregularity such as banding can be suppressed without lowering the productivity, without inviting image quality decline, and regardless of the recording duty.

[Others]

While an object is to suppress banding, stripes or irregularity due to density change in the above embodiment, banding, stripes or irregularity due to gloss change is similarly generated in the inkjet recording device, and the presently disclosed subject matter is effective also for this problem. Also, the presently disclosed subject matter is similarly effective for banding, stripes or irregularity by the change of a dot pattern.

For the embodiment of the presently disclosed subject matter described above, without departing from the scope of the invention, components can be appropriately changed, added or deleted. The presently disclosed subject matter is not limited to the embodiment described above, and many modifications are possible by persons skilled in the art within the technical idea of the presently disclosed subject matter.

What is claimed is:

1. An image processing device comprising:
a nozzle ejection rate determination unit that determines a first nozzle ejection rate for each nozzle, in the case of calling information indicating a ratio of recording pixels for which each nozzle ejects ink to record a dot a nozzle ejection rate, in recording attending pixels allocated to each nozzle as pixels for which each of a plurality of nozzles in a recording head having the plurality of nozzles that eject ink is in charge of recording;
a nozzle pattern determination unit that determines a nozzle pattern indicating by which of the plurality of nozzles the individual pixels of an image are to be recorded, wherein the image is to be recorded on a recording medium by the recording head;
a conversion unit that converts gradation values of the individual pixels, reflecting the first nozzle ejection rates of the nozzles that record the individual pixels respectively on the gradation values of the individual pixels of the image, on the basis of the first nozzle ejection rate determined by the nozzle ejection rate determination unit and the nozzle pattern determined by the nozzle pattern determination unit; and
a halftone processing unit that generates dot data by executing halftone processing to the gradation values of the individual pixels of the image converted by the conversion unit,
wherein the halftone processing unit is configured to perform the halftone processing using a second dither mask generated by reflecting a second nozzle ejection rate corresponding to at least one nozzle in charge of recording at individual pixel positions on thresholds of the individual pixel positions in a first dither mask and converting the thresholds of the individual pixel positions of the first dither mask, and the first dither mask is a dither mask that outputs a dot arrangement of a non-uniform dot density reflecting the second nozzle ejection rate according to the pixel position of the first dither mask for a uniform input value, and wherein the second dither mask is a dither mask that outputs a dot arrangement of the same dot density for the same input value, regardless of the pixel position.

2. The image processing device according to claim 1, wherein, when the individual thresholds of the first dither mask are set, an evaluation index that evaluates graininess of a state of the non-uniform dot density reflecting the second nozzle ejection rate is used for a non-uniform input value reflecting the second nozzle ejection rate, and wherein, for the first dither mask, the thresholds of the individual pixel positions in the first dither mask are determined on the basis of the evaluation index reflecting the second nozzle ejection rate.

3. The image processing device according to claim 1, wherein the plurality of nozzles corresponding to the individual pixels of the second dither mask are present.

4. The image processing device according to claim 1, wherein the first nozzle ejection rate to be reflected on the gradation values of the individual pixels of the image corresponding to the individual pixel positions of the second dither mask differs depending on a position where the second dither mask is arranged on the image after conversion converted by the conversion unit.

5. The image processing device according to claim 1, wherein the first nozzle ejection rate to be reflected on the gradation values of the individual pixels of the image is changed according to at least one of a printing mode, a banding degree and a graininess degree, and the second nozzle ejection rate to be reflected on the second dither mask is the same regardless of at least one of the printing mode, the banding degree and the graininess degree.

6. The image processing device according to claim 1, configured such that, when the second dither mask is applied to the image after conversion converted by the conversion unit and the halftone processing is performed, the second dither mask is position-shifted in a sub scanning direction and arranged, on the image after the conversion, wherein, in the case that m is an integer equal to or larger than 2 and p is an integer equal to or larger than 1 and is smaller than m, a size in the sub scanning direction of the dither mask is m, and a shift amount in the sub scanning direction of the dither mask is p, and wherein p and m-p are different from a nozzle pitch in the sub scanning direction and a divisor of the nozzle pitch.

7. The image processing device according to claim 1, wherein the recording head has a nozzle array formed by arraying the nozzles in a sub scanning direction that is parallel to a conveying direction of a recording medium, and is a serial type recording head that records an image on the recording medium while moving in a main scanning direction that is a width direction of the recording medium which intersects with the sub scanning direction.

8. The image processing device according to claim 7, wherein the nozzle ejection rate determination unit makes the first nozzle ejection rate of the nozzle arranged at an end of the nozzle array lower than the first nozzle ejection rate of the nozzle arranged at a center part of the nozzle array.

9. The image processing device according to claim 7, wherein the nozzle pattern determination unit determines the nozzle pattern on the basis of a scanning pattern when the recording head is moved relatively to the recording medium.

10. An inkjet recording device comprising:
a recording head including a plurality of nozzles that eject ink;
a moving unit that relatively moves a recording medium and the recording head,
the image processing device according to claim 1; and
an ejection control unit that controls ejection of the ink from the nozzles of the recording head, on the basis of the dot data generated in the halftone processing unit.

11. An image processing method comprising:
a nozzle ejection rate determination process of determining a first nozzle ejection rate for each nozzle, in the case of calling information indicating a ratio of recording pixels for which each nozzle ejects ink to record a dot a nozzle ejection rate, in recording attending pixels allocated to each nozzle as pixels for which each of a plurality of nozzles in a recording head having the plurality of nozzles that eject ink is in charge of recording;
a nozzle pattern determination process of determining a nozzle pattern indicating by which of the plurality of nozzles the individual pixels of an image to be recorded on a recording medium by the recording head are to be recorded;
a conversion process of converting gradation values of the individual pixels, reflecting the first nozzle ejection rates of the nozzles that record the individual pixels respectively on the gradation values of the individual pixels of the image, on the basis of the first nozzle ejection rate determined by the nozzle ejection rate determination process and the nozzle pattern determined by the nozzle pattern determination process; and
a halftone processing process of generating dot data by executing halftone processing to the gradation values of the individual pixels of the image converted by the conversion process,
wherein the halftone processing process is a process of performing the halftone processing using a second dither mask generated by reflecting a second nozzle ejection rate corresponding to at least one nozzle in charge of recording at the individual pixel positions on each of thresholds of the individual pixel positions in a first dither mask and thereby converting the threshold of the first dither mask,
wherein the first dither mask is a dither mask that outputs a dot arrangement of a non-uniform dot density reflecting the second nozzle ejection rate according to the pixel position of the first dither mask for a uniform input value, and
wherein the second dither mask is a dither mask that outputs a dot arrangement of the same dot density for the same input value, regardless of the pixel position.

12. A non-transitory computer-readable tangible recording medium including instructions stored thereon, such that when the instructions are read and executed by a computer, the computer realize:
a nozzle ejection rate determination function of determining a first nozzle ejection rate for each nozzle, in the case of calling information indicating a ratio of recording pixels for which each nozzle ejects ink to record a dot a nozzle ejection rate, in recording attending pixels allocated to each nozzle as pixels for which each of a plurality of nozzles in a recording head having the plurality of nozzles that eject ink is in charge of recording;

a nozzle pattern determination function of determining a nozzle pattern indicating by which of the plurality of nozzles the individual pixels of an image to be recorded on a recording medium by the recording head are to be recorded:

a conversion function of converting gradation values of the individual pixels, reflecting the first nozzle ejection rate of the nozzle that records the individual pixels respectively on the gradation values of the individual pixels of the image, on the basis of the first nozzle ejection rate determined by the nozzle ejection rate determination function and the nozzle pattern determined by the nozzle pattern determination function; and a halftone processing function of generating dot data by executing halftone processing to the gradation values of the individual pixels of the image converted by the conversion function, wherein the halftone processing function is a function of performing the halftone processing using a second dither mask generated by reflecting a second nozzle ejection rate corresponding to at least one nozzle in charge of recording at individual pixel positions on each of thresholds of the individual pixel positions in a first dither mask and thereby converting the threshold of the first dither mask, wherein the first dither mask is a dither mask that outputs a dot arrangement of a non-uniform dot density reflecting the second nozzle ejection rate according to the pixel position of the first dither mask for a uniform input value, and wherein the second dither mask is a dither mask that outputs a dot arrangement of the same dot density for the same input value, regardless of the pixel position.

* * * * *